US009261912B2

(12) United States Patent  (10) Patent No.: US 9,261,912 B2
Bell  (45) Date of Patent: Feb. 16, 2016

(54) PORTABLE CASES FOR A TABLET
(71) Applicant: Joel G. Bell, Culver City, CA (US)
(72) Inventor: Joel G. Bell, Culver City, CA (US)
( * ) Notice: Subject to any disclaimer, the term of this patent is extended or adjusted under 35 U.S.C. 154(b) by 0 days.
(21) Appl. No.: 14/586,428
(22) Filed: Dec. 30, 2014
(65) Prior Publication Data
US 2015/0111626 A1  Apr. 23, 2015

Related U.S. Application Data
(63) Continuation-in-part of application No. 13/747,067, filed on Jan. 22, 2013, now Pat. No. 8,931,635.

(51) Int. Cl.
A45C 11/00 (2006.01)
G06F 1/16 (2006.01)
H04M 1/11 (2006.01)
A45F 5/00 (2006.01)
(52) U.S. Cl.
CPC .............. G06F 1/1637 (2013.01); A45C 11/00 (2013.01); A45F 5/00 (2013.01); H04M 1/11 (2013.01); A45C 2011/003 (2013.01); A45F 2200/0525 (2013.01); G06F 2200/1633 (2013.01)
(58) Field of Classification Search
CPC ........ A45C 11/00; A45C 13/26; A45C 13/30; A45C 2011/003; A45F 3/14; B65D 25/10; B65D 25/28; B65D 25/2873; B65D 33/06; B65D 85/00; G01D 11/24; G06F 1/1628; G06F 1/1637; G06F 2200/1633; H04M 1/11
USPC .................. 206/305, 320; 220/754, 756, 772; 150/110; 190/115; 383/8, 15, 16; 224/218, 219, 577
See application file for complete search history.

(56) References Cited
U.S. PATENT DOCUMENTS

| | | | |
|---|---|---|---|
| 1,768,725 A | 7/1930 | White | |
| 1,889,389 A | 11/1932 | Thornhill | |
| 3,507,312 A | 4/1970 | Petersen | |
| 6,321,912 B1 | 11/2001 | Lippert et al. | |
| 7,360,649 B2 | 4/2008 | Swaim et al. | |
| 7,921,997 B2 | 4/2011 | Burns | |
| 8,120,896 B2 * | 2/2012 | Mori ........................ | A45F 3/14 206/320 |
| 8,281,924 B2 | 10/2012 | Westrup | |
| 8,312,991 B2 | 11/2012 | Diebel et al. | |
| 8,328,008 B2 | 12/2012 | Diebel et al. | |

(Continued)

FOREIGN PATENT DOCUMENTS

JP  200014436 A  *  1/2000 ............. A45C 13/30

Primary Examiner — Bryon Gehman
(74) Attorney, Agent, or Firm — Michael W. Goltry; Robert A. Parsons; Parsons & Goltry

(57) ABSTRACT

A portable case for a tablet includes a windowed front superimposed atop a back to define a receiving area for receiving and containing a tablet having a touchscreen, so as to juxtapose the touchscreen with the windowed front to permit viewing and touching the touchscreen. A four-sided perimeter gap to the receiving area is defined between a perimeter of the windowed front and a perimeter of the back. An elastic strap extends across the perimeter gap from a side edge of the perimeter of the windowed front panel to and over an axially-aligned side edge of the perimeter of the back and across an outer surface of the back to an opposed side edge of the perimeter of the back. Connectors extend across the perimeter gap and connect the perimeter of the windowed front to the perimeter of the back along three of the four sides of the perimeter gap.

16 Claims, 54 Drawing Sheets

(56) References Cited

U.S. PATENT DOCUMENTS

| | | |
|---|---|---|
| 8,616,423 B2 | 12/2013 | Wizikowski |
| 8,668,122 B2 | 3/2014 | Case et al. |
| 8,875,879 B2 * | 11/2014 | Diebel ............... A45C 11/00 206/320 |
| 2005/0011920 A1 | 1/2005 | Feng |
| 2005/0045684 A1 | 3/2005 | Ouyang |
| 2005/0236447 A1 | 10/2005 | Monivis |
| 2006/0022003 A1 | 2/2006 | Zheng |
| 2006/0076381 A1 | 4/2006 | Rodarte et al. |
| 2006/0149430 A1 | 7/2006 | Slaton |
| 2007/0120038 A1 | 5/2007 | Wang et al. |
| 2009/0065540 A1 | 3/2009 | Pantoja |
| 2011/0240830 A1 | 10/2011 | Alemozafar et al. |
| 2012/0024917 A1 | 2/2012 | Case et al. |
| 2012/0104059 A1 | 5/2012 | Yen |
| 2013/0001107 A1 | 1/2013 | Armstrong |
| 2013/0134060 A1 | 5/2013 | Li et al. |
| 2015/0265018 A1 * | 9/2015 | Balourdet ............ A45C 11/00 455/575.8 |

* cited by examiner

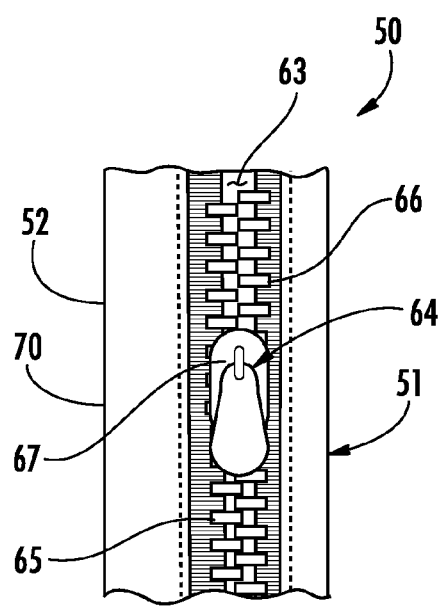
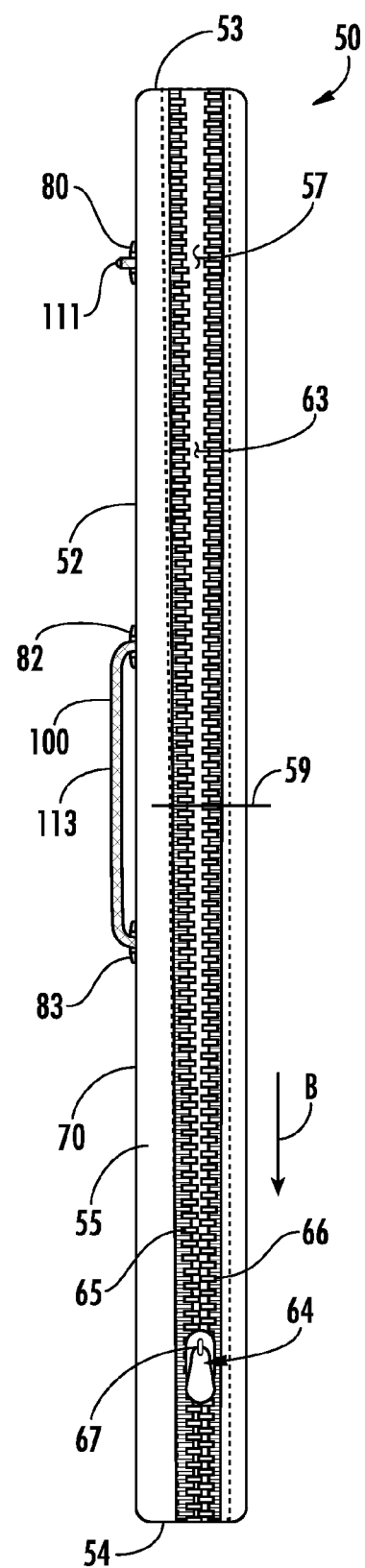
FIG. 8
FIG. 7

PORTABLE CASES FOR A TABLET

FIELD OF THE INVENTION

The present invention relates to tablets, to tablet accessories and, more particularly, to portable tablet cases.

BACKGROUND OF THE INVENTION

Exemplary and well-known tablets, such as tablet computers and electronic readers, are popular devices. Such tablets may be used in a variety of contexts for personal, business, and educational activities. The convenient size, user-friendly touchscreen interface, and ready accessibility of these devices make them popular and highly functional and useful and in a variety of contexts, such as education, business, sales, navigation, etc. Although the durability of these devices is increasing, the tablet is still subject to breakage if dropped or banged against a surface. Although skilled artisans have developed a variety of cases designed protect tablets against such damage, access to the touchscreen of the tablet is often limited by the usage of such cases and require such cases to be opened to allow the tablet to be used. Moreover, although some cases are configured to be secured to other objects when not in use, these cases are complex in structure, expensive to construct, and unwieldy. Accordingly, continued improvement in the art of tablet cases is evident.

SUMMARY OF THE INVENTION

According to the principle of the invention, a tablet accessory for receiving and holding a tablet having a touchscreen consists of a portable case having a back and an opposed windowed front, opposed first and second ends, and opposed first and second sides extending between the opposed first and second ends, and which together define a receiving area of the portable case for receiving and containing the tablet, as for carrying or safekeeping, so as to juxtapose the touchscreen with the windowed front to permit the viewing and the touching of the touchscreen in the operation of the tablet at the windowed front. The back has an inner surface toward the receiving area and an opposed outer surface directed away from the receiving area. The portable case has a first middle between the opposed first and second sides that extends in a direction from the first end to the second end, and a second middle between the opposed first and second ends that extends in a direction from the first side to the second side, and the direction of the first middle is orthogonal with respect to the direction of the second middle. First and second lengths of elasticized material are attached to the back. The first length of elasticized material is juxtaposed along the outer surface of the back near the first end and extends across the outer surface and across the first middle between the first and second sides and in a direction from the first side to the second side. The second length of elasticized material is juxtaposed along the outer surface of the back near the first side and extends across the outer surface and across the second middle between the first and second ends and in a direction from the first side to the second side. The first length of elasticized material is available for suspending the portable case in a direction from the first end of the portable case. The second length of elasticized material is available for suspending the portable case in a direction from the first side of the portable case. The first length of elasticized material is orthogonal with respect to the second length of elasticized material, the first length of elasticized material is equidistant with respect to the opposed first and second sides, and the second length of elasticized material is equidistant with respect to the opposed first and second ends. The first length of elasticized material is parallel with respect to the first end of the portable case and is orthogonal with respect to the first side of the portable case, and the second length of elasticized material is parallel with respect to the first side of the portable case and is orthogonal with respect to the first end of the portable case. An access opening is formed in the second side of the portable case from the first end to the second end of the portable case for admitting the tablet into the receiving area, and there is a closure for opening and closing the access opening. The closure is preferably a slide fastener assembly.

According to the principle of the invention, a tablet accessory for receiving and holding a tablet having a touchscreen consists of a portable case having a back and an opposed windowed front, opposed first and second ends, and opposed first and second sides extending between the opposed first and second ends, and which together define a receiving area of the portable case for receiving and containing the tablet, as for carrying or safekeeping, so as to juxtapose the touchscreen with the windowed front to permit the viewing and the touching of the touchscreen in the operation of the tablet at the windowed front. The back has an inner surface toward the receiving area and an opposed outer surface directed away from the receiving area. The portable case has a first middle between the opposed first and second sides that extends in a direction from the first end to the second end, and a second middle between the opposed first and second ends that extends in a direction from the first side to the second side, and the direction of the first middle is orthogonal with respect to the direction of the second middle. Opposed first and second openings extend through the back from the inner surface to the outer surface and are positioned near the first end of the portable case on either side of the first middle, and the first opening is located between the second side and the first middle and the second opening is located between the first side and the first middle. Opposed third and fourth openings extend through the back from the inner surface to the outer surface and are positioned near the first side of the portable case on either side of the second middle, and the third opening is located between the first end and the second middle and the fourth opening is located between the second end and the second middle. An elongate, elasticized member has opposed first and second extremities. The first extremity of the elasticized member is affixed to the inner surface of the back at a first attachment point near the first end and between the second side and the first opening, and the second extremity of the elasticized member is affixed to the inner surface of the back at a second attachment point near the first side and between the second end and the fourth opening. The elasticized member between the first and second extremities thereof extends concurrently through the first, second, third and fourth openings from the inner surface of the back to the outer surface of the back so as to define a first length of the elasticized member that extends across the inner surface of the back between the first extremity and the first opening, a second length of the elasticized member that extends across the outer surface of the back in a direction from the first side to the second side from the first opening and across the first middle to the second opening, a third length of the elasticized member that extends across the inner surface of the back from the second opening to the third opening, a fourth length of the elasticized member that extends across the outer surface of the back in a direction from the first end to the second end from the third opening and across the second middle to the fourth opening, and a fifth length of the elasticized member that extends across the inner surface of the back from the fourth opening to the second extremity. The second length of the elasticized member is available for suspending the portable case in a direction from the first end of the portable case, and the fourth length of the elasticized member is available for suspending the portable case in a direction from the first side of the portable case. The second length of the elasticized member is orthogonal with respect to the fourth length of the elasticized member, the second length of the elasticized member is equidistant with respect to the opposed first and second sides, and the fourth length of the elasticized member is equidistant with respect to the opposed first and second ends. The second length of the elasticized member is parallel with respect to the first end of the portable case and is orthogonal with respect to the first side of the portable case, and the fourth length of elasticized member is parallel with respect to the first side of the portable case and is orthogonal with respect to the first end of the portable case. Stays are formed in the back, which captively retain the third length of the elasticized member relative to the inner surface of the back. An access opening is formed in the second side of the portable case from the first end to the second end of the portable case for admitting the tablet into the receiving area, and there is a closure for opening and closing the access opening. The closure is preferably a slide fastener assembly.

According to the principle of the invention, a tablet accessory for receiving and holding a tablet having a touchscreen includes a windowed first panel having opposed first and second ends, opposed first and second sides extending between the opposed first and second ends, an inner surface, an opposed outer surface, a first middle between the opposed first and second sides that extends in a direction from the first end to the second end, and a second middle between the opposed first and second ends that extends in a direction from the first side to the second side being orthogonal with respect to the direction of the second middle. First and second lengths of elasticized material are attached to the windowed first panel. The first length of elasticized material extends over the inner surface of the windowed first panel from the first side and across the first middle to the second side between the first end and the second middle of the windowed first panel. The second length of elasticized material extends over the inner surface of the windowed first panel from the first end and across the second middle to the second end between the first side and the first middle of the windowed first panel. A second panel is applied between the first and second lengths of elasticized material so as to define a receiving area between the inner surface of the windowed first panel and the second panel for receiving a tablet so as to juxtapose the touchscreen with the windowed first panel to permit the viewing and the touching of the touchscreen in the operation of the tablet from the windowed first panel. The first length of elasticized material is available for suspending a tablet applied to the receiving area in a direction from the first end of the windowed first panel. The second length of elasticized material is available for suspending a tablet applied to the receiving area in a direction from the first side of the windowed first panel. The first length of elasticized material is affixed to the first and second sides of the windowed first panel between the first end of the windowed first panel and the second middle of the windowed first panel. The second length of elasticized material is affixed to the first and second ends of the windowed first panel between the first side of the windowed first panel and the first middle of the windowed first panel. The first length of elasticized material is orthogonal with respect to the second length of elasticized material. The first length of elasticized material is parallel with respect to the first end of the windowed first panel and is orthogonal with respect to the first side of the windowed first panel, and the second length of elasticized material is parallel with respect to the first side of the windowed first panel and is orthogonal with respect to the first end of the windowed first panel.

According to the principle of the invention, a tablet accessory for receiving and holding a tablet includes a windowed front, and a back. The windowed front includes an inner surface and an opposed outer surface, and a perimeter defined by a first end edge and an opposed second end edge, and a first end edge and an opposed second end edge that extend from the first edge to the second edge of the windowed front. The back includes an inner surface and an opposed outer surface, and a perimeter defined by a first end edge and an opposed second end edge, and a first side edge and an opposed second side edge that extend from the first end edge to the second end edge of the back. The windowed front is superimposed atop the back defining a receiving area between the inner surface of the windowed front and the inner surface of the back for receiving a tablet having a touchscreen so as to juxtapose the touchscreen with the windowed front to permit the viewing and the touching of the touchscreen in the operation of the tablet from the windowed front, the first end edge of the windowed front is axially spaced from the first end edge of the back, the second end edge of the windowed front is axially spaced from the second end edge of the back, the first side edge of the windowed front is axially spaced from the first side edge of the back, and the second side edge of the windowed front is axially spaced from the second side edge of the back. There is a perimeter gap to the receiving area between the perimeter of the windowed front and the perimeter of the back. A first elastic strap is attached to the second side edge of the windowed front and to the first side edge of the back, the first elastic strap extends across the perimeter gap from the second side edge of the windowed front to and over the second side edge of the back and across the outer surface of the back to the first side edge of the back. At least one first connector extends across the perimeter gap between the first end edge of the windowed front and the first end edge of the back and connects the first end edge of the windowed front to the first end edge of the back, at least one second connector extends across the perimeter gap between the second end edge of the windowed front and the second end edge of the back and connects the second end edge of the windowed front to the second end edge of the back, and at least one third connector extends across the perimeter gap between the first side edge of the windowed front and the first side edge of the back and connects the first side edge of the windowed front to the first side edge of the back. Each of the first connector, the second connector, and the third connector is an elastic strap. In an alternate embodiment, spaced apart first connectors extend across the perimeter gap between the first end edge of the windowed front and the first end edge of the back and connect the first end edge of the windowed front to the first end edge of the back, spaced apart second connectors extend across the perimeter gap between the second end edge of the windowed front and the second end edge of the back and connect the second end edge of the windowed front to the second end edge of the back, and spaced apart third connectors extend across the perimeter gap between the first side edge of the windowed front and the first side edge of the back and connect the first side edge of the windowed front to the first side edge of the back. In this alternate embodiment, each of the first connectors, the second connectors, and the third connectors is an elastic strap. A second elastic strap attached to the first end edge of the back and to the second end edge of the back, the second elastic strap extends from the first end edge of the back across the outer surface of the back and to the second end edge of the back. The first elastic strap is perpendicular relative to the second elastic strap. The first elastic strap is closer to the first end edge of each said windowed front and said back than to the second end edge of each said windowed front and said back. The second elastic strap is closer to the first side edge of each said windowed front and said back than to the second side edge of each said windowed front and said back. The first elastic strap is parallel with respect to the first end edge and the second end edge of each said windowed front and said back, and is perpendicular with respect to the first side edge and the second side edge of each said windowed front and said back. The second elastic strap is perpendicular with respect to the first end edge and the second end edge of each said windowed front and said back, and is parallel with respect to the first side edge and the second side edge of each said windowed front and said back.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings:

FIG. 7 is a view like that of FIG. 5 illustrating the slide fastener assembly as it would appear partially open so as to partially open the side of the portable case;

FIG. 8 is an enlarged fragmented view of the slide fastener assembly of FIG. 7;

DETAILED DESCRIPTION

Figure 1:
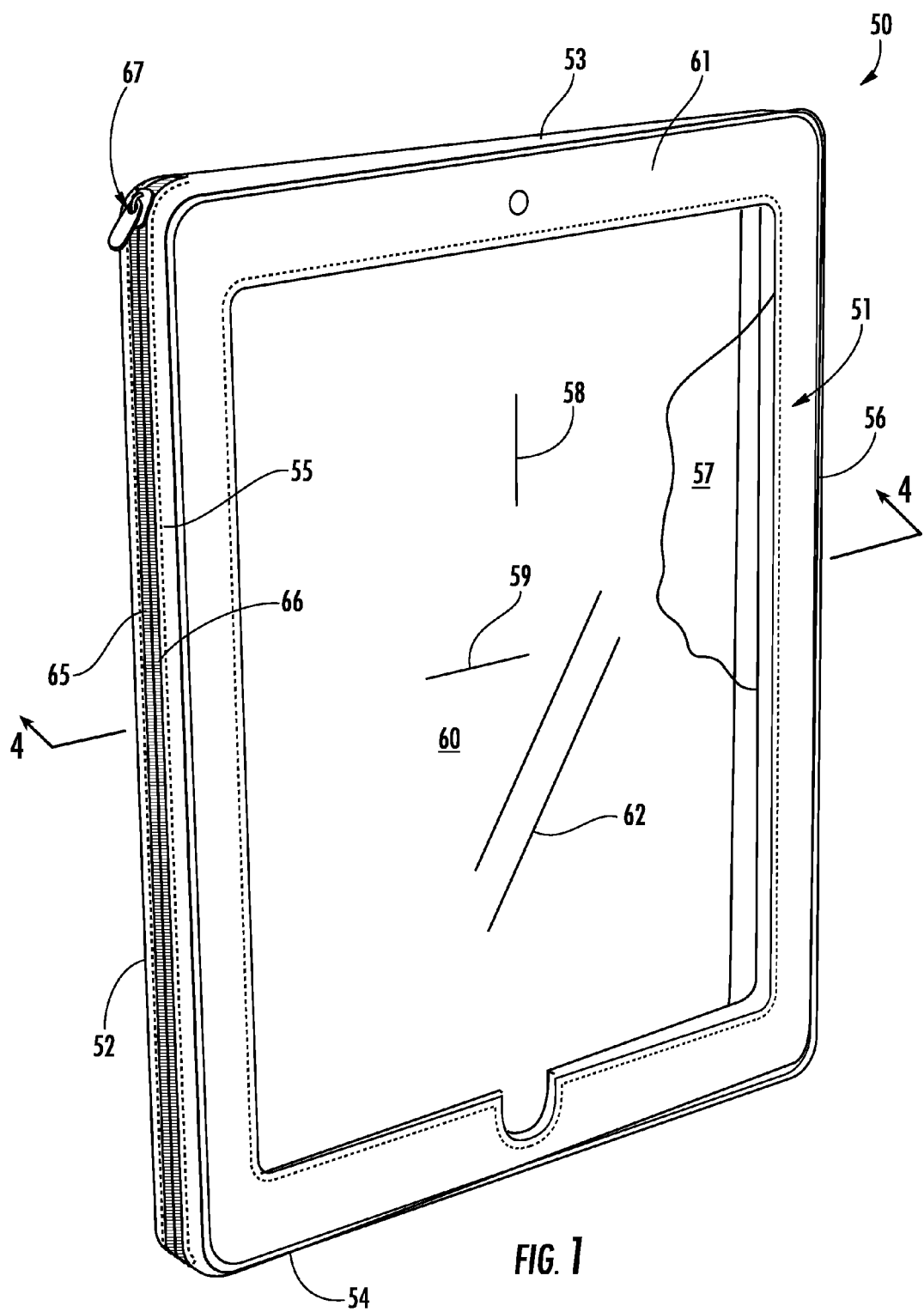
FIG. 1 is a front perspective view of a tablet accessory in the nature of a portable case constructed and arranged in accordance with the principle of the invention with portions thereof being broken away for illustrative purposes, and which is useful for receiving and holding a tablet, as for carrying or safekeeping, and which has a slide fastener assembly for opening and closing the portable case to facilitate the installation and removable of a tablet with respect to the portable case.

Turning now to the drawings, in which like reference characters indicate corresponding elements throughout the several views, attention is first directed to FIG. 1 in which there is seen a tablet accessory in the nature of a portable case 50 for receiving and holding a tablet having a touchscreen, as for carrying or safekeeping. As defined herein, the term "tablet" means an electronic device that uses a touchscreen as its primary input device. Such exemplary and well-known tablets include tablet personal computers and electronic readers. Case 50 is portable in that it is easily carried or conveyed by hand, and is adapted to receive and hold a tablet as defined so as to protect the tablet while allowing a user to view and interface with the operative features of the tablet, including the touchscreen and the tablet's plugs, ports, buttons, camera, and the like.

Figure 2:
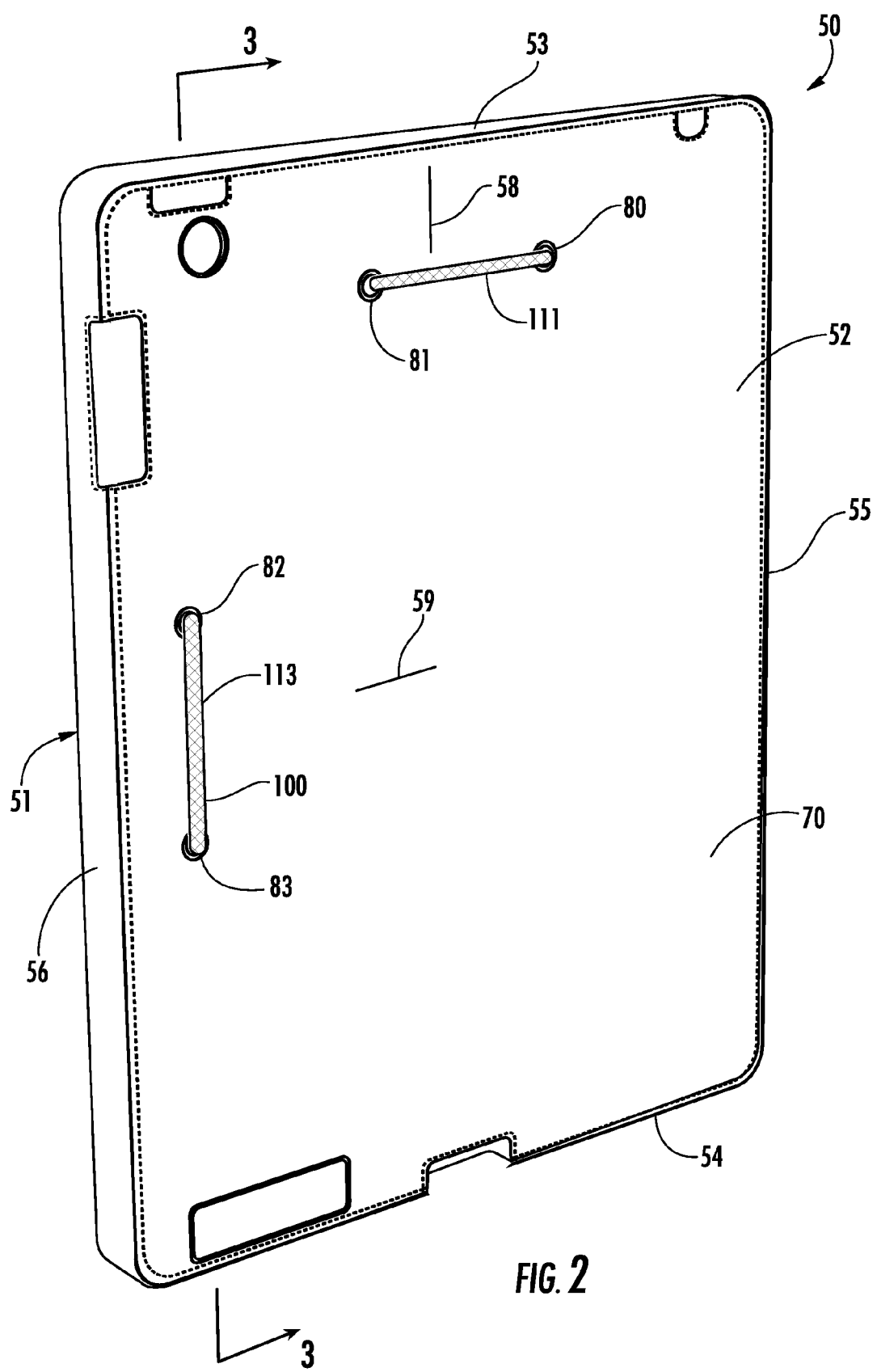
FIG. 2 is rear perspective view of the embodiment of FIG. 1 illustrating lengths of elasticized material formed in the portable case for use in suspending the portable case.
Figure 3:
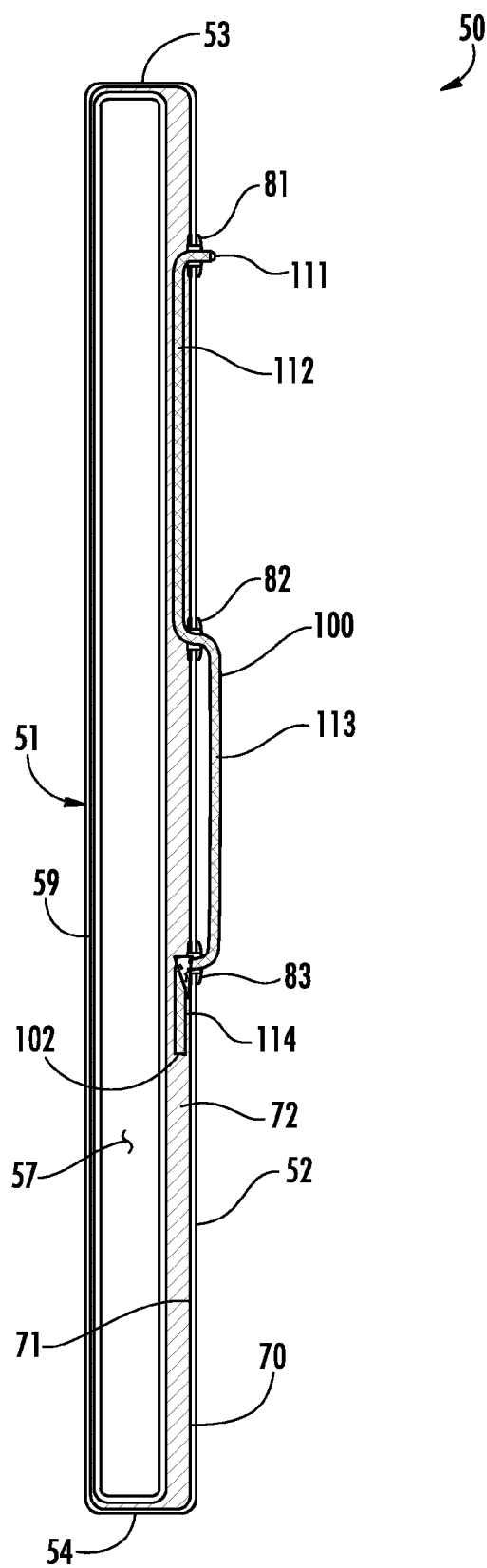
FIG. 3 is a section view taken along line 3-3 of FIG. 2.

Referring in relevant part to FIGS. 1-3, case 50 includes a windowed front 52 and an opposed back 52, opposed ends 53 and 54, and opposed sides 55 and 56 extending between ends 53 and 54, and which together define a receiving area or volume 57 of portable case 50 for receiving and containing a tablet so as to juxtapose the tablet's touchscreen with windowed front 51 to permit the viewing and the touching of the touchscreen in the operation of the tablet via windowed front 51. Case 50 is tablet-shaped in that it is slender and rectangular in overall shape commensurate with the corresponding shape of the given tablet to be used with case 50. Windowed front 51 and back 52 are coextensive, meaning substantially coextensive, and are each flat and rectangular in overall shape, ends 53 and 54 are parallel with respect to each other, and sides 55 and 56 are parallel with respect to each other and are orthogonal with respect to ends 53 and 54. Case 50 has a length from end 53 to end 54 and a width from side 55 to side 56, and the length of case 50 is clearly greater than the width of case 50 characterizing the rectangular shape of case 50. Case 50 has a vertical middle denoted generally at 58, and a horizontal middle denoted generally at 59. Middle 58 is the vertical midsection of case 50 from end 53 to end 54, and middle 29 is the horizontal midsection of case 50 from side 55 to side 56 and is traverse with respect to the vertical direction of middle 28. Middle 28 is between sides 55 and 56, is equidistant with respect to sides 55 and 56, and extends in vertical direction from end 53 to end 54. Middle 59 is between ends 53 and 54, is equidistant with respect to ends 53 and 54, and extends in a horizontal direction from side 55 to side 56. The vertical direction of middle 58 is parallel with respect to sides 55 and 56, is orthogonal with respect to ends 53 and 54, and is orthogonal with respect to the horizontal direction of middle 59. The horizontal direction of middle 59 is parallel with respect to ends 53 and 54, is orthogonal with respect to sides 55 and 56, and is orthogonal with respect to the vertical direction of middle 58.

Windowed front 51 consists of a window 60 framed by a perimeter border or frame 61. Window 60 is fitted with a thin sheet 62 of transparent material. Sheet 62 is thin meaning that it has a thickness of approximately 0.2-0.4 millimeters, and is formed of transparent flexible plastic that is affixed to and held by frame 61, such as by heat bonding, an adhesive, stitching, or the like. Frame 60, back 52, ends 53 and 54, and sides 55 and 56 are formed of leather, tightly woven nylon, or other material or combination of materials having the properties of flexibility, resilience, tear-resistance, and ruggedness, and frame 60, back 52, ends 53 and 54, and sides 55 and 56 are formed together and assembled with stitching, heat bonding, adhesive, or the like.

Figure 5:
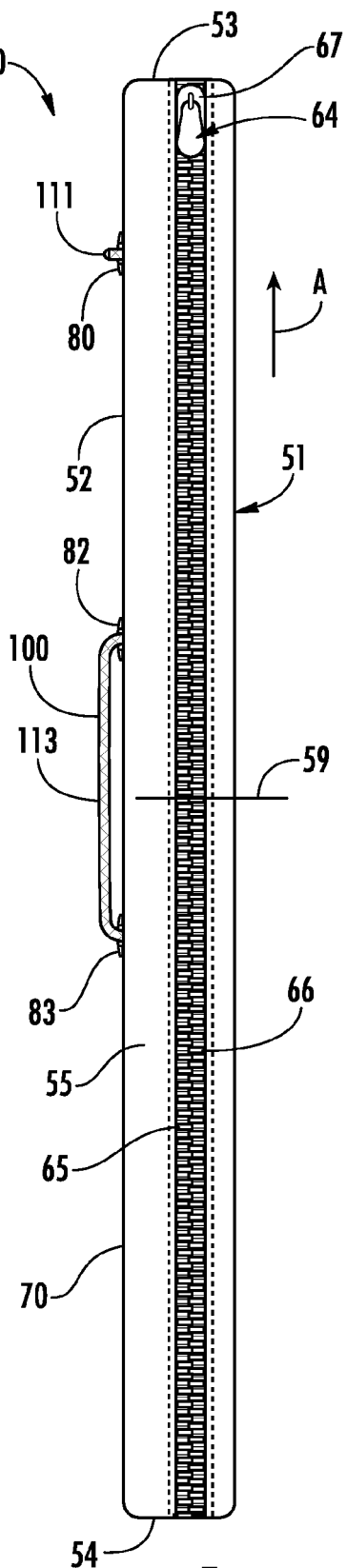
FIG. 5 is a side elevation view of the embodiment of FIG. 1 illustrating the slide fastener assembly as it would appear closed so as to close the side of the portable case.
Figure 12:
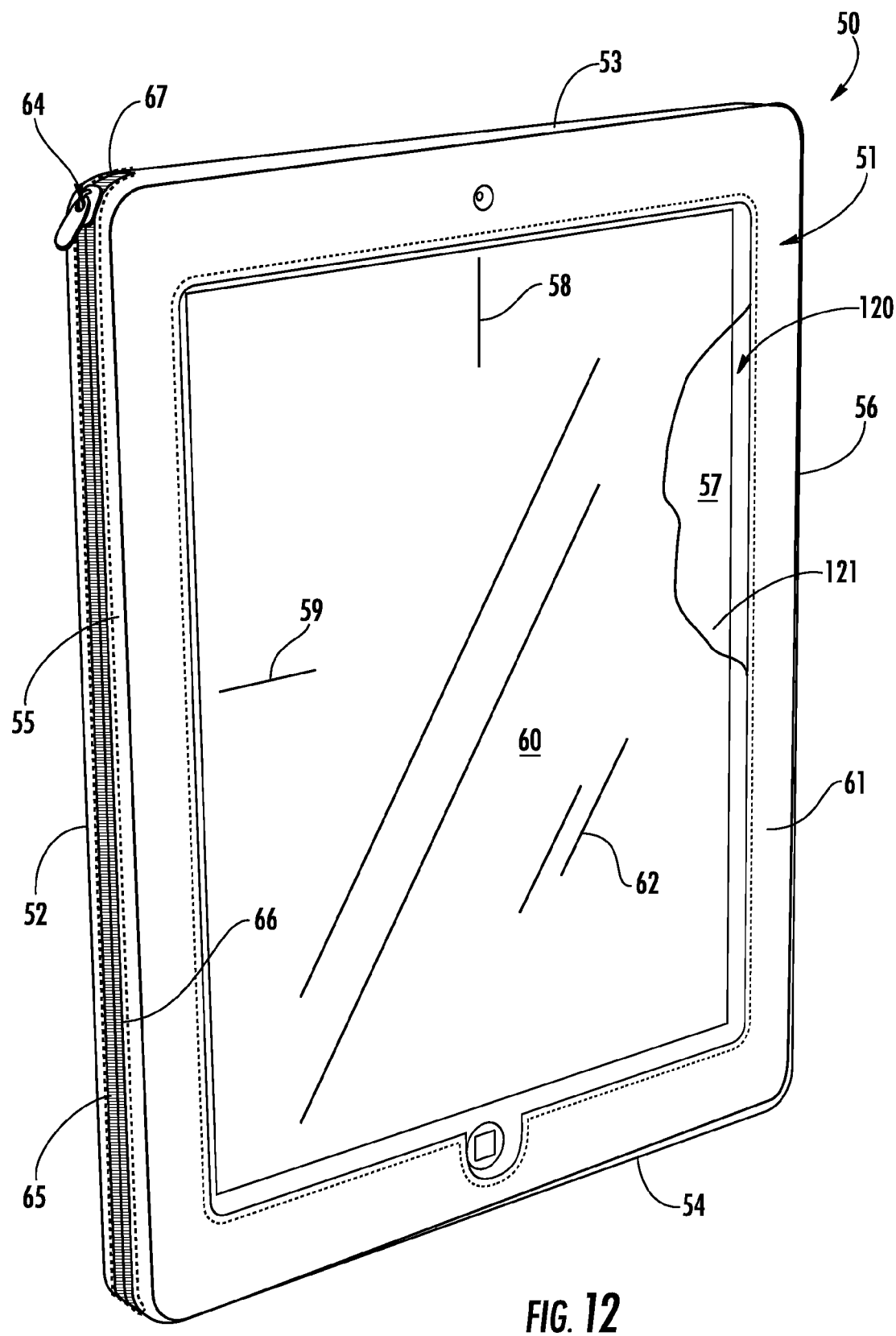

As seen in FIGS. 7-11, case is formed with an access opening 63, which is used to admit a tablet into receiving area 57 in the assembly of a tablet with case 50, and to remove a tablet from receiving area 57 in the disassembly of tablet from case 50. Access opening 63 is formed in side 55 of case 50. Access opening 63 extends along the length of side 55 of case 50 from end 53 to end 54. Side 55 is formed with a closure 64 used to open access opening 63 as shown in FIGS. 7 and 9-11, and to close access opening 63 as shown in FIGS. 1, 5, and 12. Referencing FIGS. 5-8, closure 64 is a conventional zipper or slide fastener assembly consisting opposed, complementing rows 65 and 66 of metal or plastic teeth, and a slider 67. Row 65 of teeth is an element or engagement element of closure 64, and row 66 of teeth is a complementing element or complementing engagement element of closure 64. Slider 67, operated by hand, moves along rows 65 and 66 of teeth and meshes together or separates rows 65 and 66 of teeth depending on the direction of movement. In this example, slider 67 meshes rows 65 and 66 of teeth together to close access opening 63 when moved in the direction indicated by the arrowed line A in FIG. 5 toward end 53 of case 50, and separates rows 65 and 113 of teeth to open access opening 63 when moved in the direction indicated by the arrowed line B in FIG. 17 toward end 54 of case 50. Although access opening 63 and closure 64 are formed in side 55, they can be formed in side 56, end 53, or end 54 without departing from the invention.

Looking to FIG. 3, back 52 has an outer or exterior surface 70 that faces exteriorly away from volume 57, and an opposed inner or interior surface 71 that faces inwardly toward volume 57. In the present embodiment, inner surface 71 of back 52 is lined with padding denoted at 72. Padding 72 is a cushion-like mass of soft material, such as foam or cotton or polyester, used in case 50 for providing protection for a tablet applied to receiving area 57 of case 50. If desired, the entire inner surfaces of case 50 may be lined with padding.

Figure 4:
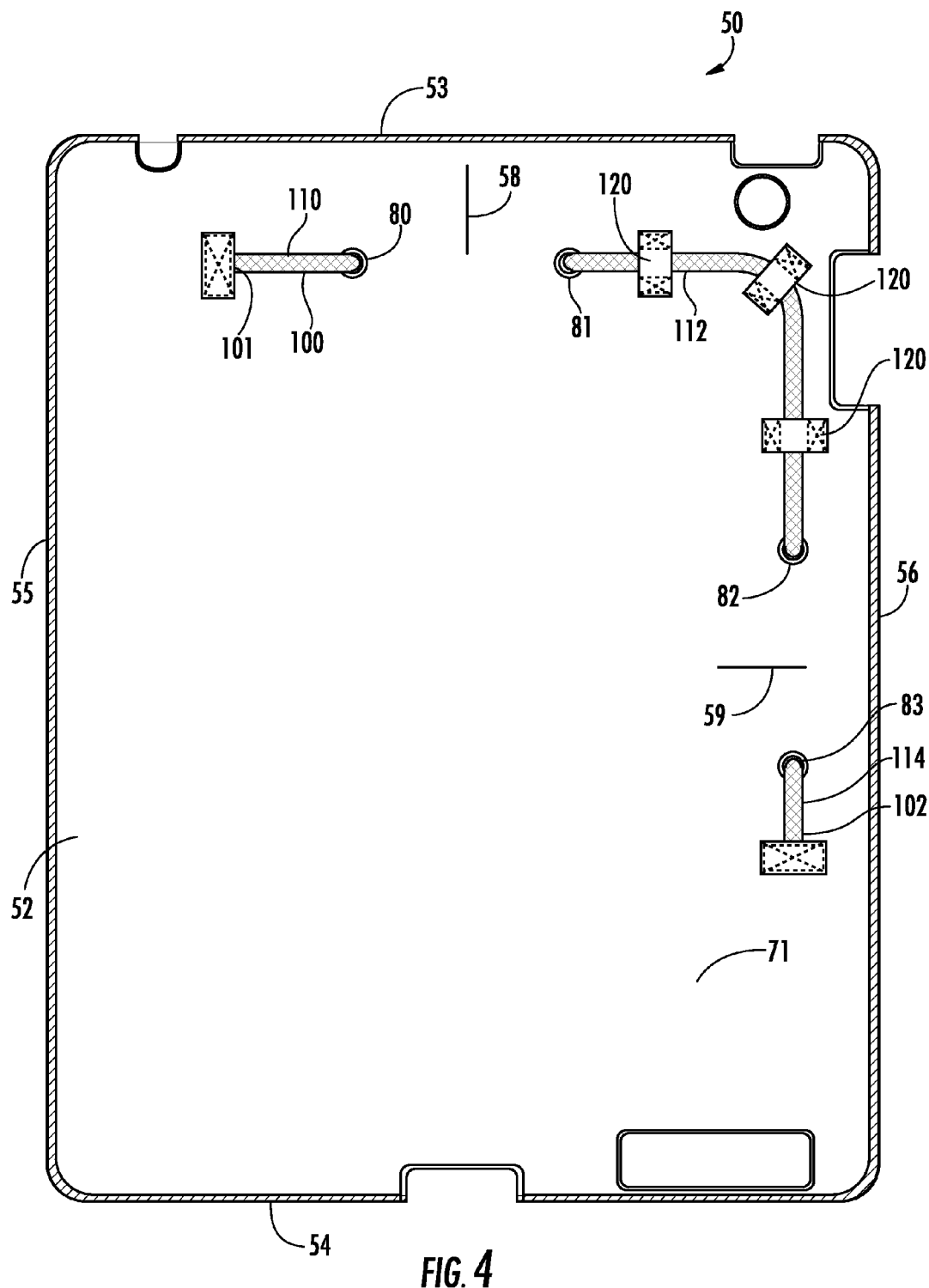
FIG. 4 is a section view taken along line 4-4 of FIG. 1.
Figure 6:
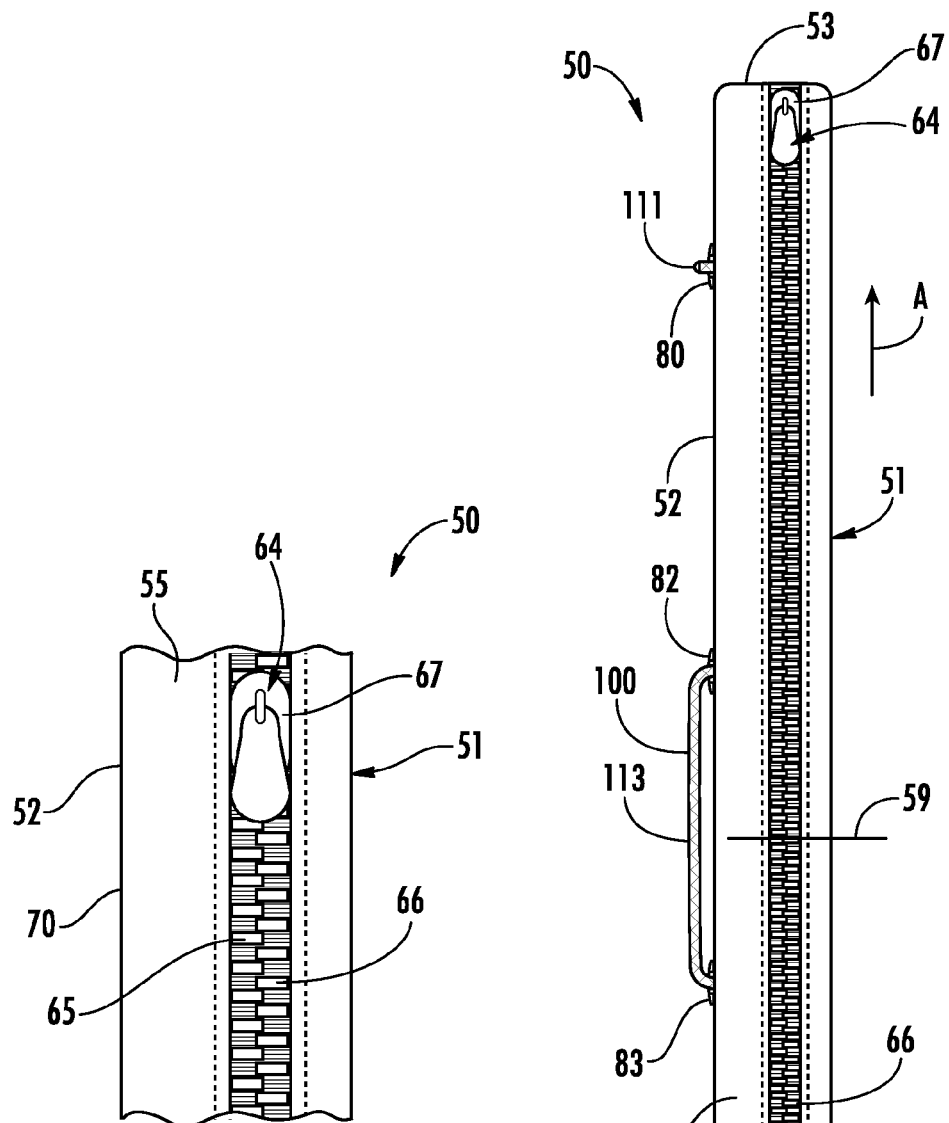
FIG. 6 is an enlarged fragmented view of the slide fastener assembly of FIG. 5.

Referring in relevant part to FIGS. 2-4, openings 80, 81, 82, and 83 are formed in back 52, which extend through back 51 from inner surface 71 to outer surface 70. Openings 80, 81, 82, and 83 are spaced-apart from one another and are conventionally reinforced with metal or plastic hole reinforcements.

Openings 80 and 81 oppose one another and are juxtaposed or otherwise positioned near end 53 of case 50 on either side of vertical middle 58. Opening 80 is located between side 55 and middle 58, and opening 81 is located between middle 58 and side 56. Openings 80 and 81 reside along, or are otherwise aligned along, a horizontal line or plane that is parallel with respect to ends 53 and 54 and the horizontal direction of middle 59, and that is orthogonal with respect to sides 55 and 56 and the vertical direction of middle 58. This characterizes the orientation and alignment of openings 80 and 81.

Openings 82 and 83 oppose one another and are juxtaposed or otherwise positioned near side 56 of case 50 on either side of horizontal middle 59. Opening 82 is located between end 53 and middle 59 and also between opening 81 and side 56, and opening 83 is located between middle 59 and end 54 and also between opening 81 and side 56. Openings 82 and 83 reside along, or are otherwise aligned along, a vertical line or plane that is parallel with respect to sides 55 and 56 and the vertical direction of middle 58, and that is orthogonal with respect to ends 52 and 53 and the horizontal direction of middle 59 and also the horizontal line or plane of openings 80 and 81. This characterizes the orientation and alignment of openings 82 and 83, and relates this orientation and alignment to that of openings 80 and 81.

Back 52 is formed with elongate piece of elasticized material 100. Elasticized material 10 is an elongate elasticized member in the form of a bungee cord having opposed extremities 101 and 102 in this preferred embodiment. Extremity 101 is affixed to inner surface 71 of back 52 at an attachment point near end 53 and between side 55 and opening 80. Extremity 102 is affixed to inner surface 71 of back 52 at an attachment point near side 56 and between end 54 and opening 83. Extremities 101 and 102 are affixed to inner surface 71 of back 52 with stitching, and heat bonding, adhesive, rivets, or the like can be used in alternate embodiments to affix extremities 101 and 102 to inner surface 71 of back 52 so as to attach or couple elasticized material 100 to back 52.

Elasticized material 100 has a length between extremities 101 and 102, and is elasticized in that it stretches and retracts along its length. The length of elasticized material 100 between extremities 101 and 102 extends or otherwise snakes concurrently through openings 80,81,82, and 83 from inner surface 71 to outer surface 70 of back so as to define interior and exterior segments or lengths of elasticized material 100 that are, in turn, attached to back 52 via the attachment of elasticized material 100 to back 52 as described above. These lengths include length 110 of elasticized material 100 that extends across inner surface 71 of back 52 between extremity 101 and opening 80, length 111 of elasticized material 100 that extends across outer surface 70 of back 52 in a direction from side 55 to side 56 from opening 80 and across vertical middle 58 to opening 81, length 112 of elasticized material 100 that extends across inner surface 71 of back 52 from opening 81 to opening 82, length 113 of elasticized material 100 that extends across outer surface 70 of back 52 in a direction from end 53 to end 54 from opening 82 and across horizontal middle 59 to opening 83, and length 114 of elasticized material 100 that extends across inner surface 71 of back 52 from opening 83 to extremity 102. Lengths 110, 112, and 114 are juxtaposed along inner surface 71 of back 52 and are thus interior lengths of elasticized material 100. Lengths 111 and 113 are juxtaposed along outer surface 70 of back 52 and are thus exterior lengths of elasticized material 100, which are available for suspending case 50. At opening 80, elasticized material 100 extends through opening 80 in a direction from length 110 at inner surface 71 of back 52 to length 111 at outer surface 70 of back 52. At opening 81, elasticized material 100 extends through opening 80 in a direction from length 111 at outer surface 70 of back 52 to length 112 at inner surface 71 of back 52. At opening 82, elasticized material 100 extends through opening 80 in a direction from length 112 at inner surface 71 of back 52 to length 113 at outer surface 70 of back 52. At opening 83, elasticized material 100 extends through opening 80 in a direction from length 113 at outer surface 70 of back 52 to length 114 at inner surface 71 of back 52. Stays 120 affixed to inner surface 71 of back 52 captively retain length 112 of elasticized material 100 relative to inner surface 71 of back 52. In this embodiment, stays 120 are lengths of fabric that are applied across length 112, and the ends of which are affixed to inner surface 71 of back 52, such as with sewing, adhesive, heat bonding, or the like.

FIG. 2 shows the exterior lengths of elasticized material 100, being lengths 111 and 113, applied across outer surface 70 of back 52 in the manner discussed above. As seen in FIG. 2, length 111 of elasticized material 100 that is parallel to and juxtaposed near end end 53 of case 50 is a horizontal exterior length of elasticized material 100 extending in a direction from side 55 to side 56, and length 113 of elasticized material 100 that is parallel to and juxtaposed near side 56 of case 50 is a vertical exterior length of elasticized material 100 extending in a direction from end 53 to end 54. Length 111 of elasticized material 100 is a horizontal length in that it extends along the horizontal line or plane along which openings 80 and 81 are aligned in a direction from side 55 to side 56 and is parallel with respect to ends 53 and 54 and horizontal middle 59, and is orthogonal with respect to sides 55 and 56 and vertical middle 58 and length 113 of elasticized material 100. Length 113 of elasticized material 100 is a vertical length in that it extends along the vertical line or plane along which openings 82 and 83 are aligned in a direction from end 53 to end 54 and is orthogonal with respect to ends 53 and 54 and horizontal middle 59 and length 111 of elasticized material, and is parallel with respect to sides 55 and 56 and vertical middle 58. Length 111 of elasticized material 100 juxtaposed near end 53 and is equidistant with respect to sides 55 and 56. Length 113 of elasticized material 100 juxtaposed near side 56 and is equidistant with respect to ends 53 and 54. Length 111 of elasticized member 100 is available for suspending case 50 in a direction from end 53 of case 50, and length 113 of elasticized material 100 is available for suspending case 50 in direction from side 56 of case 50.

Figure 9:
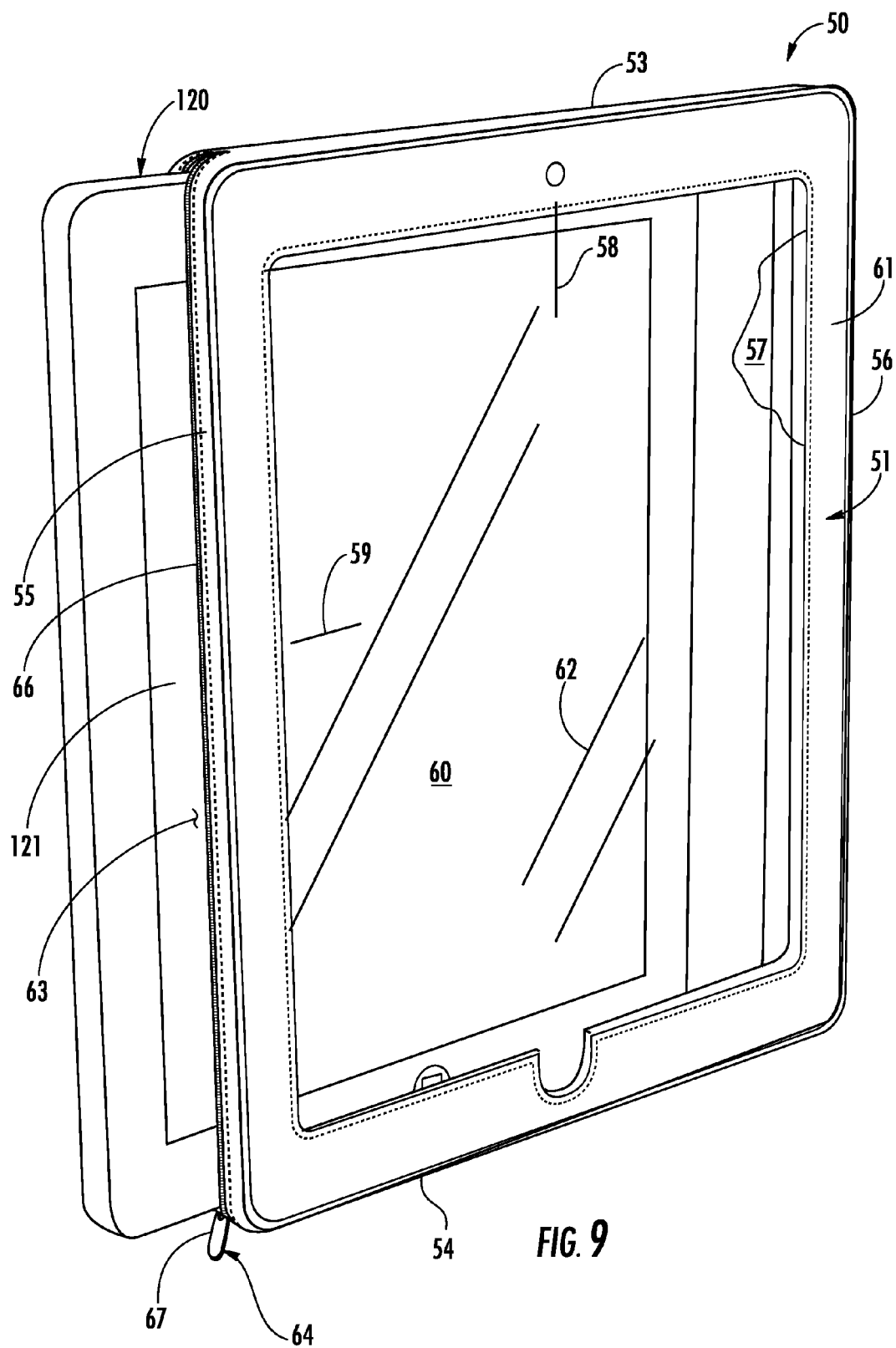
FIGS. 9-12 illustrate a sequence of steps for assembling the tablet and the portable case of FIG. 1 so as to form a cased tablet as shown in FIG. 12.
Figure 10:
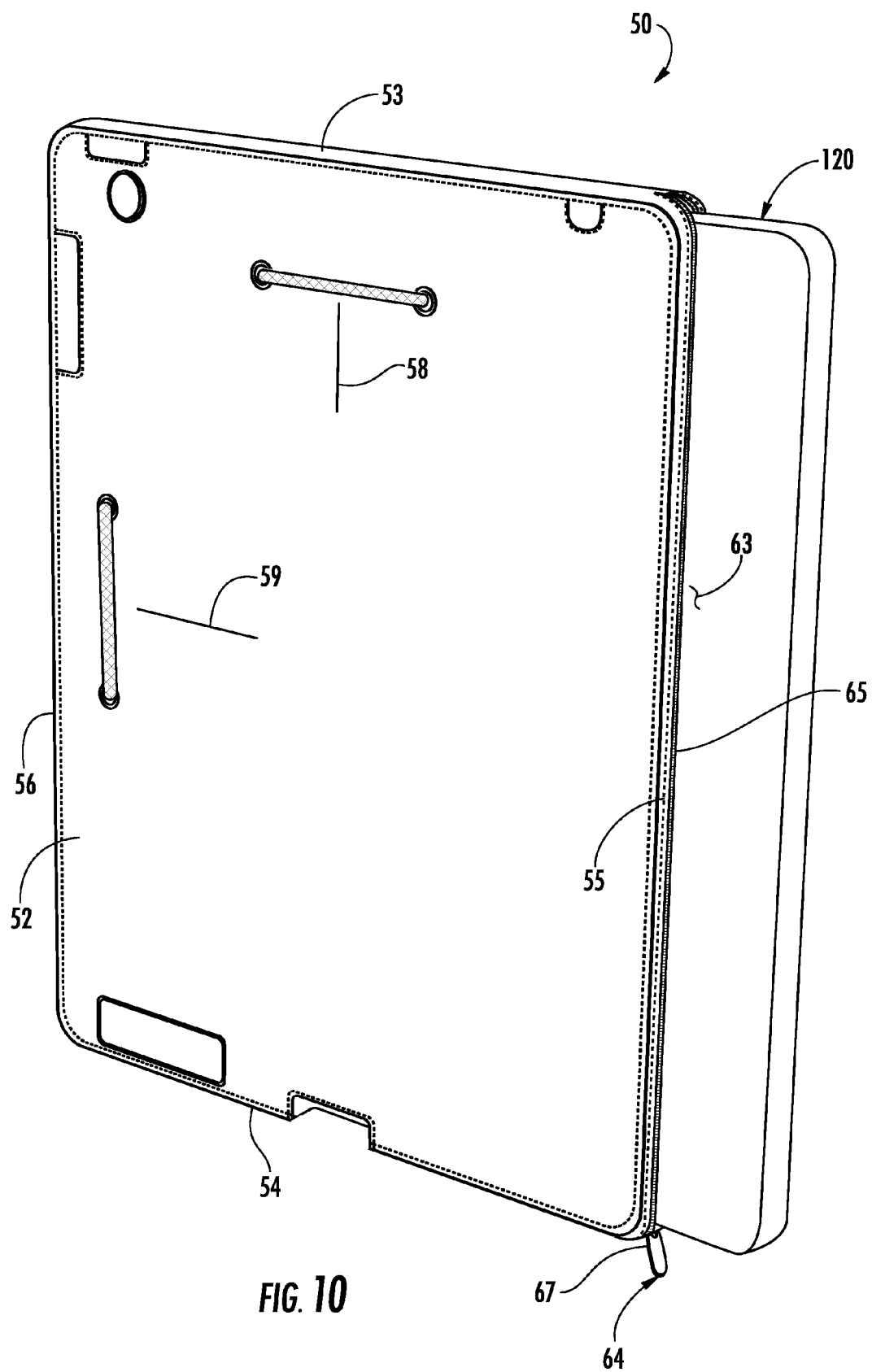
Figure 11:
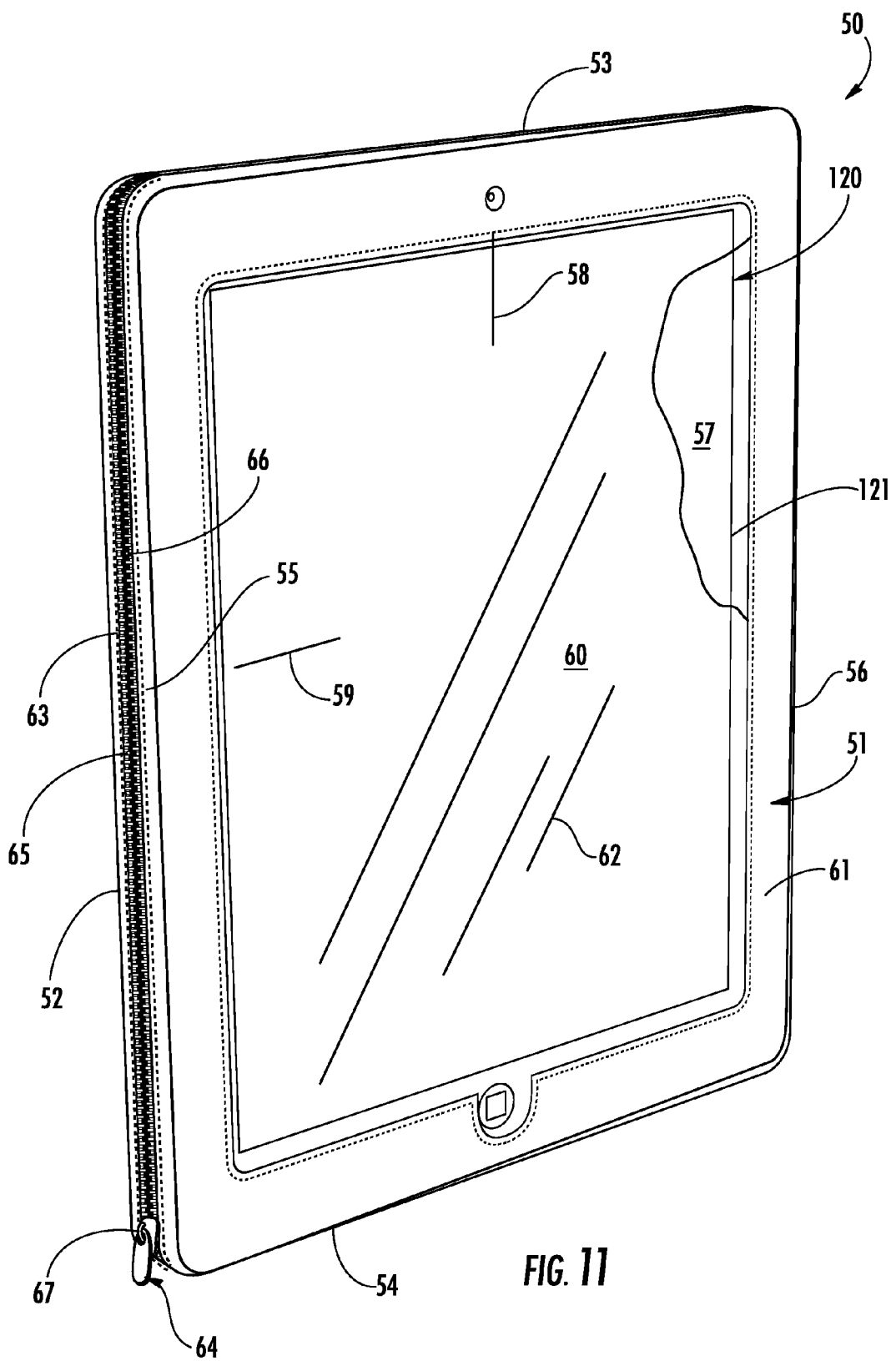

To employ case 50 with a tablet as the term is defined above, case 50 is taken up and opened by taking up slider 67, such as by hand, and moving slider 67 in the direction of arrowed line B as in FIG. 7 from end 53 of case 50 to end 54 of case 50 to open access opening 63, and thus case 50, at side 55 of case 50 preparatory to installing a tablet into case 50. Once opened as shown in FIGS. 9 and 10, tablet 120 with touchscreen 121 as shown in FIGS. 9 and 10 is taken up, such as by hand, and applied one side first in this example into receiving area 57 through access opening 63 so as to juxtapose the ends of tablet 120 with ends 53 and 54 of case 50 from within receiving area 57, to juxtapose the sides of tablet 120 with sides 55 and 56 of case 50 from within receiving area 57, to juxtapose the back of tablet 120 with the back 52 of case from within receiving area 57, and to juxtapose touchscreen 121 of tablet 120 with windowed front 51 of case 50 from within receiving area 57 so as to permit the viewing and the touching of touchscreen 121 in the operation of tablet via sheet 62 of transparent material of windowed front 51 overlying touchscreen 121. Once fully inserted into receiving area 57 of case 50 as in FIG. 11, access opening 63 is closed by taking up slider 67, such as by hand, and moving slider 67 in the direction of arrowed line B as in FIG. 5 from end 54 of case 50 to end 53 of case so as to close access opening 63, and thus case 50, at side 55 of case 50, which encloses tablet 120 in case 50 so as to form a cased tablet 120 as in FIG. 12 as for carrying or safekeeping. The size and shape of receiving area 57 of case 50 closely relates to, or otherwise coincides with, the size and shape of tablet 120, and tablet 120 is inserted into receiving area 57 through access opening 63 so as to snuggly fit tablet 120 into receiving area 57 of case 50 to cause tablet 120 to be snuggly held by and within case 50 and juxtapose touchscreen 121 with sheet 62 of transparent material of windowed front 51 in order to permit the viewing and the touching of touchscreen 121 via sheet 62 of transparent material to provide for the normal operation and viewing of touchscreen 121. Case 50 is formed with an array of port/button openings, clearly shown in FIGS. 1 and 2, to allow power cords and other devices to be plugged into tablet 120, to provide user access to the various operating buttons of tablet 120, and to allow certain features of tablet 120 to be used without interference from case 50, including the camera of tablet 120. The array of port/button openings and the like formed in case 50 are set forth as a matter of example, and are chosen to relate to the operative features of the given tablet.

Figure 17:
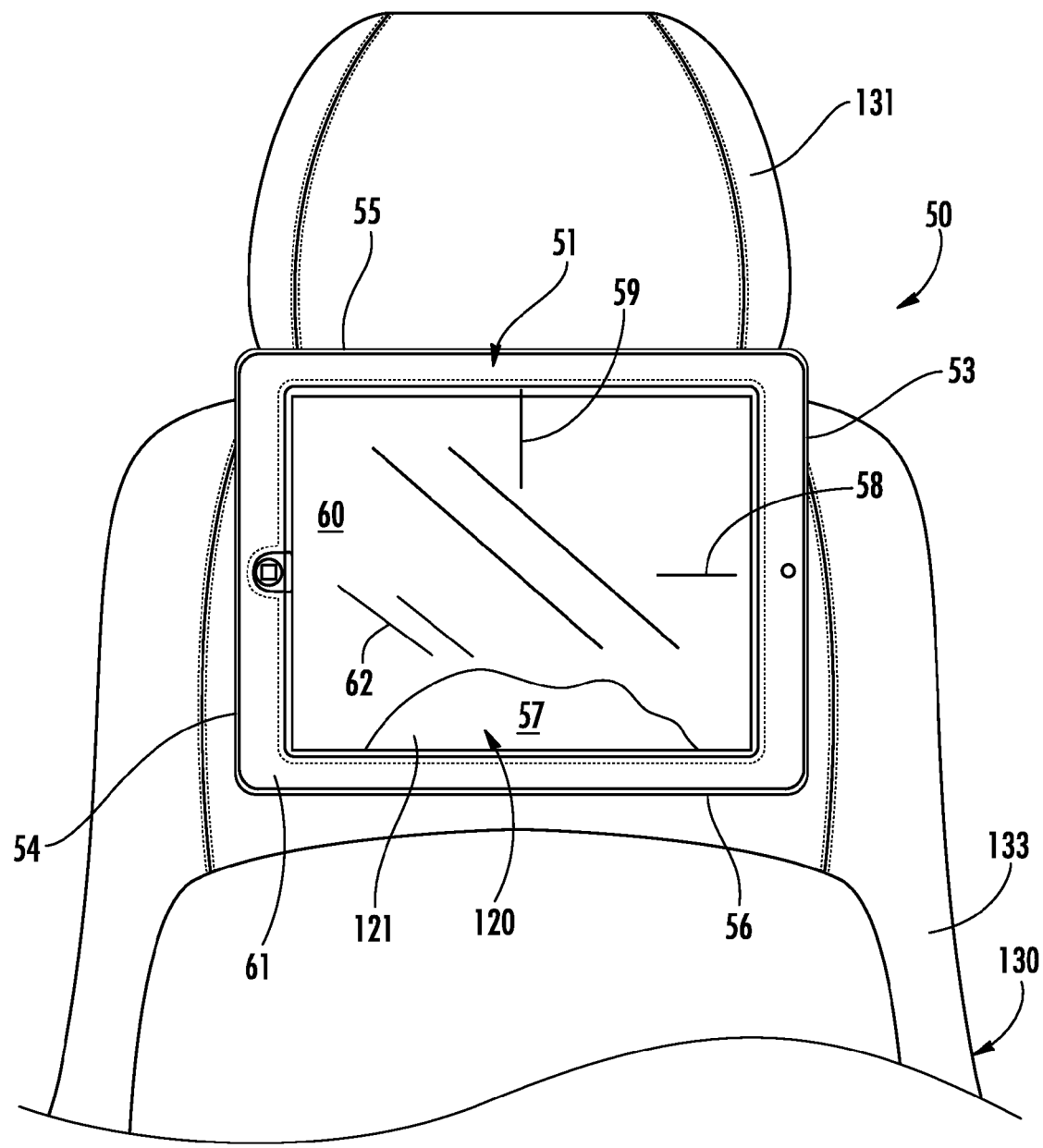

Case 50 is useful for holding and containing tablet 120, as for carrying or safekeeping. Lengths 111 and 113 of elasticized material 100 attached to back 52 of case 50 are useful for suspending case 50, and tablet 120 contained therein, in a vertical/upright direction from end 54 of case 50 to end 53 of case 50 for narrow or vertical screen operation/viewing of tablet 120, and in a vertical/upright direction from side 55 of case 50 to side 56 of case 50 for horizontal or widescreen operation/viewing of tablet, and this provides for convenient use and viewing of tablet 120 held in case 50 while so suspended. Touchscreen 121 of tablet 120, like conventional tablets, is configured to adjust or rotate the display for viewing in response to rotation of the tablet between a narrow screen orientation of the display extending upright from end 54 to end 53, and a widescreen orientation viewing of the display extending upright from side 55 to side 56. This is a common feature among tablet devices. Depending on which way a user desires to view the touchscreen of a tablet held by case 50 in the use of tablet 120, length 111 of elasticized member 100 is useful for suspending case 50 in a vertical direction of the tablet touchscreen from end 53 of case 50 as in FIG. 14 for narrow screen viewing, and length 113 of elasticized material 100 is useful for suspending case 50 in a vertical direction of the tablet touchscreen from side 56 of case 50 as shown in FIG. 17 for widescreen viewing.

Figure 13:
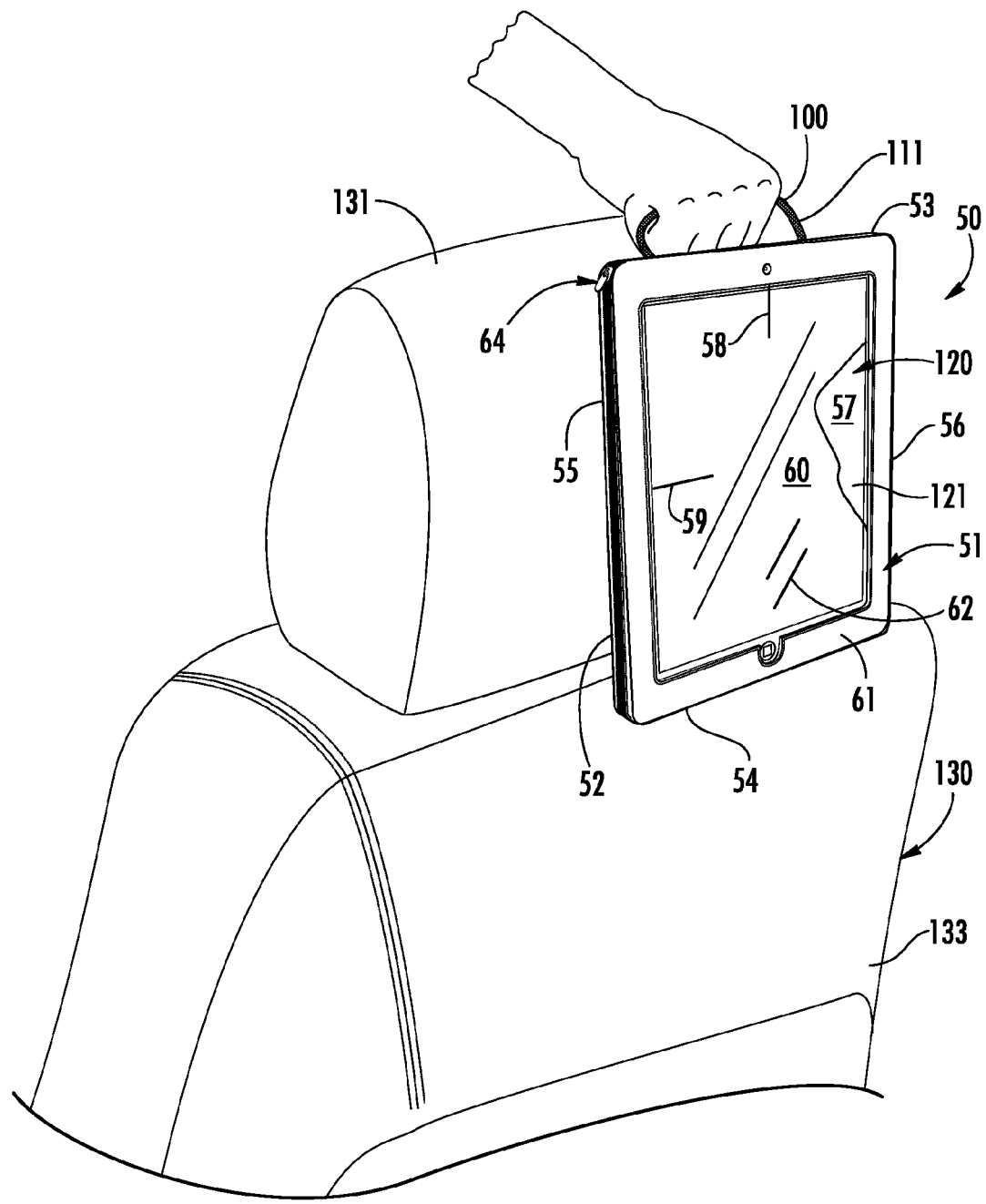
FIGS. 13-15 illustrate a sequence of steps for suspending the embodiment of FIG. 12 at an elevated location for viewing using one of the lengths of elasticized material first illustrated in FIG. 2.
Figure 16:
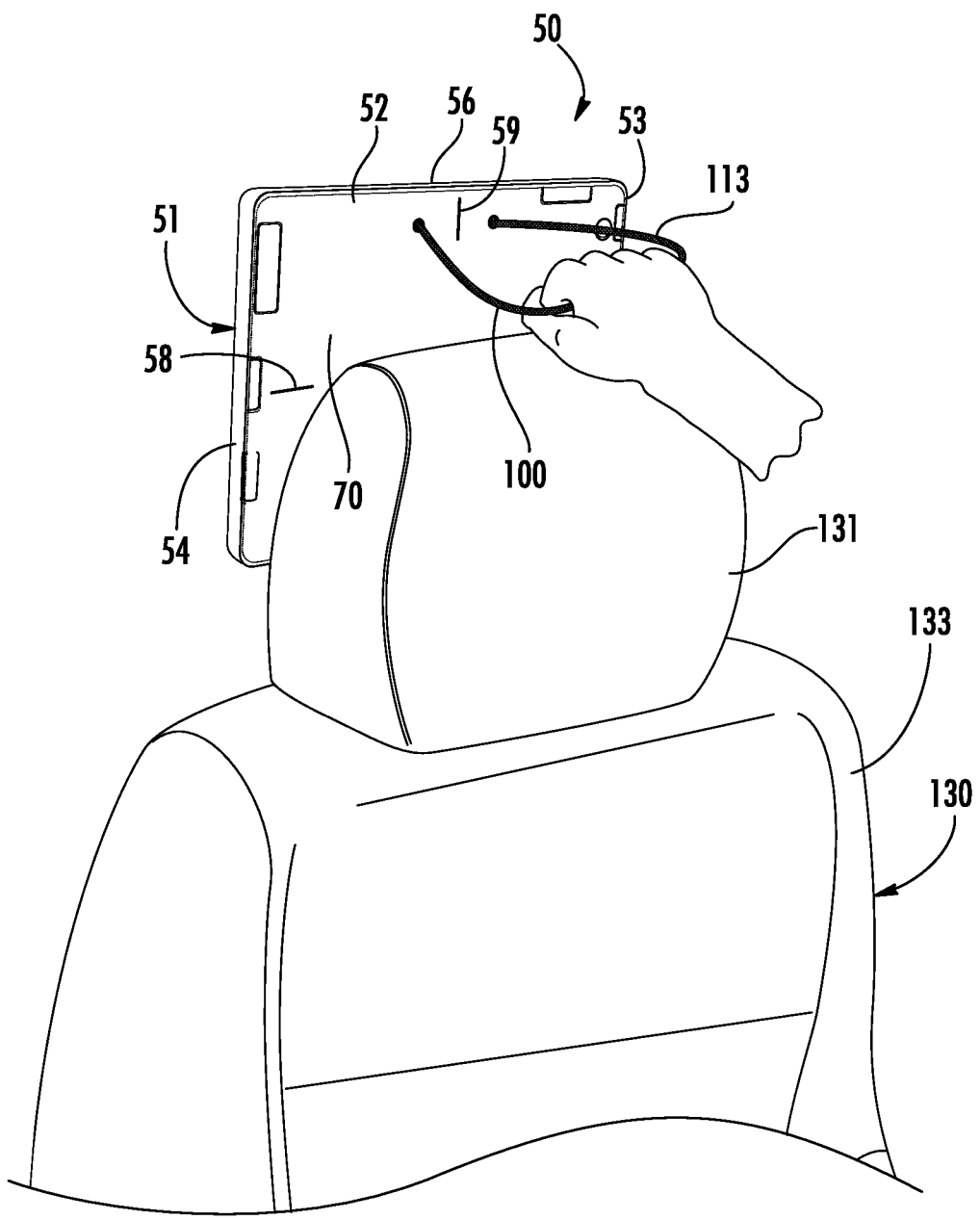
FIGS. 16-18 illustrate another sequence of steps for suspending the embodiment of FIG. 12 at an elevated location for viewing using another one of the lengths of elasticized material first illustrated in FIG. 2.

In the vertical direction of case 50 from end 54 to end 53, the length of case 50 extends vertically upright from end 54 to end 53, and length 111 of elasticized material 100 is used to suspend case 50 in this vertical direction from back 52 simply by taking up length 111 by hand as shown in FIG. 13 and hooking over the object from which case 50 is to be suspended. The stretchability of elasticized material 100 between extremities 101 and 102 allows length 111 between openings 80 and 81 to be stretched as needed to facilitate the stretching application of length 111 over an object or thing from which one desires to suspend case 50. The juxtaposition of length 111 of elasticized material 100 near end 53 of case 50 between sides 55 and 56 ensures that when length 111 is used to suspend case 50 that case 50 will naturally tend to hang downwardly in a vertical direction from end 534 to end 54 and is resistant to tipping downwardly from end 53. In the vertical direction of case 50 from side 55 to side 56, the width of case 50 extends vertically upright from side 55 to side 56, and length 113 of elasticized material 100 is used to suspend case 50 in this direction from back 52 simply by taking up length 113 by hand as shown in FIG. 16 and hooking over the object from which case 50 is to be suspended. The stretchability of elasticized material 100 between extremities 101 and 102 allows length 113 between openings 82 and 83 to be stretched as needed to facilitate the stretching application of length 113 over an object or thing from which one desires to suspend case 50. The juxtaposition of length 113 of elasticized material 100 near side 56 of case 50 between ends 53 and 54 ensures that when length 113 is used to suspend case 50 that case 50 will naturally tend to hang downwardly in a vertical direction from side 56 to side 55 and is resistant to tipping downwardly from side 56.

Figure 14:
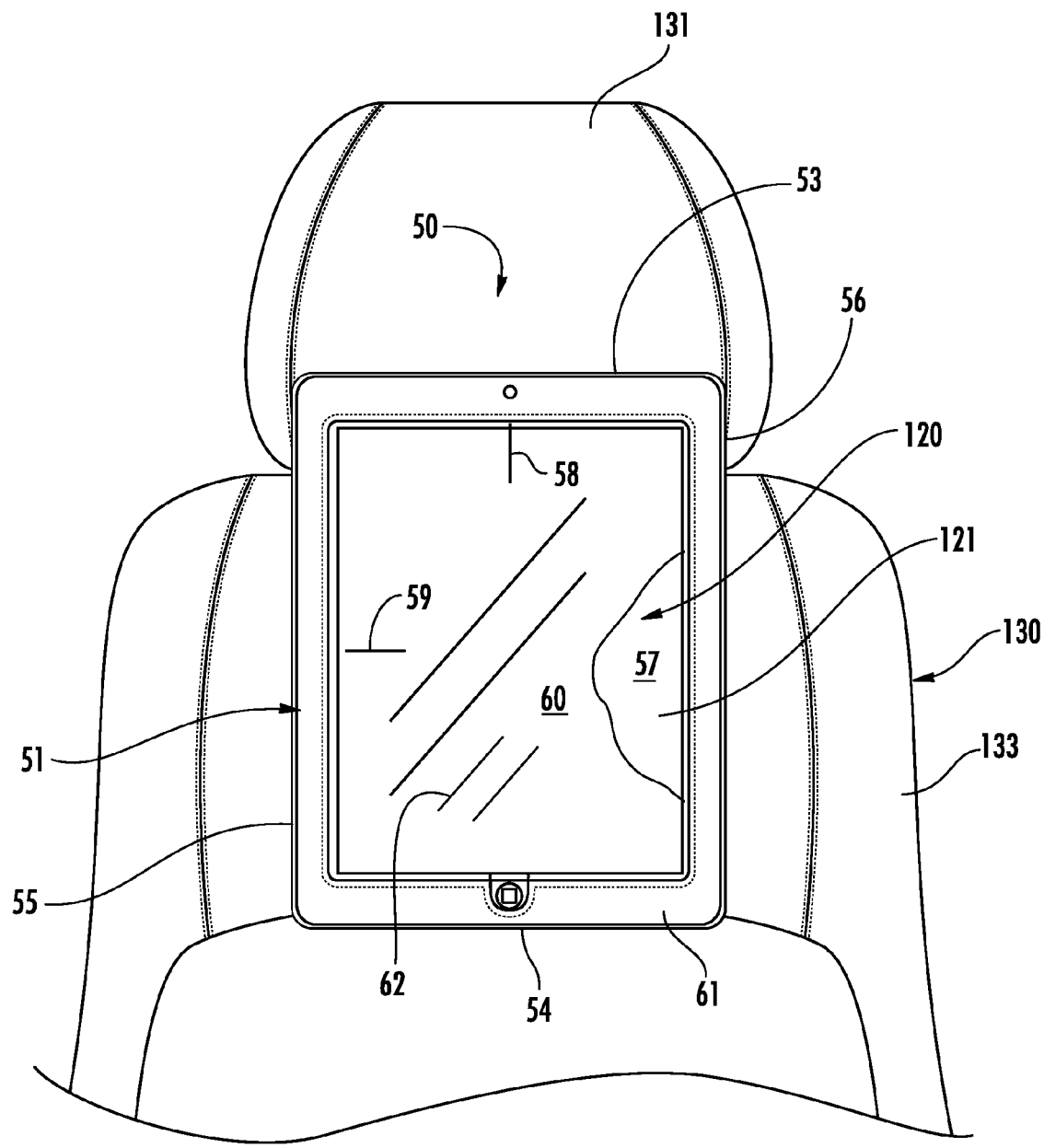
Figure 15:
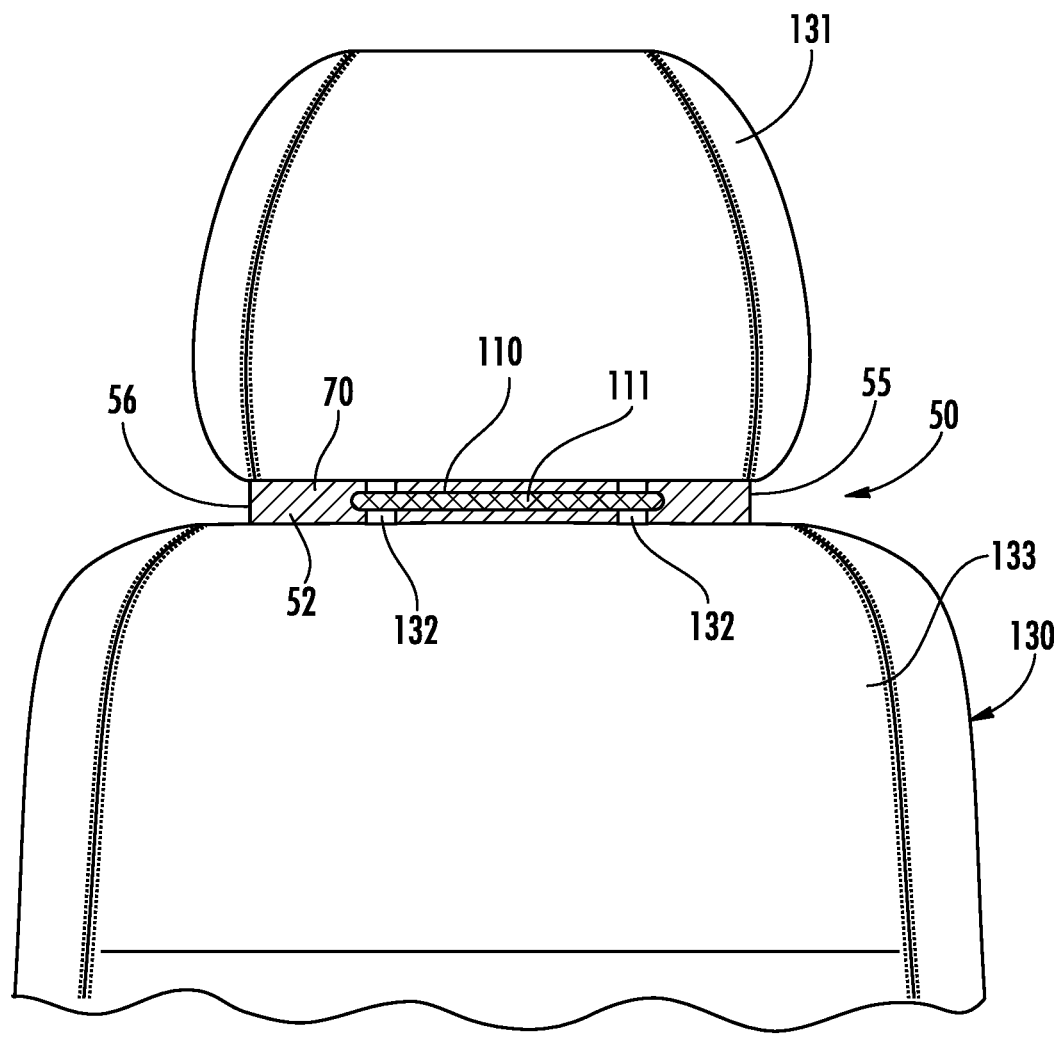
Figure 18:
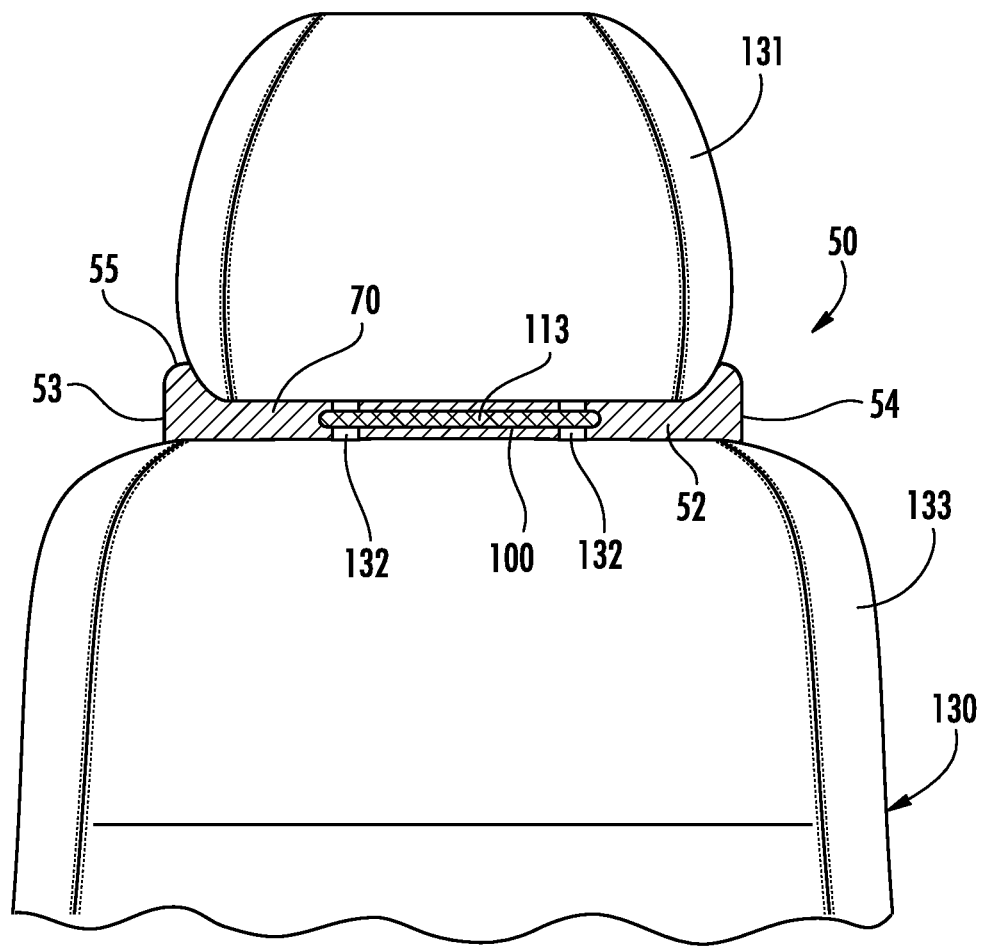

As a matter of illustration and reference, FIG. 13 illustrates a car seat 130 including a head rest 131 attached to the top of a seat 133 with support posts 132 shown and referenced in FIG. 15. To install case 50 with length 111 of elasticized material 100 so as to suspend case 50 in a vertical direction from end 54 to end 53, length 111 is taken up by hand as shown in FIG. 13 and is stretched downwardly over the head rest 131 and is looped over support posts 132 as in FIG. 15 to suspend case 50 along the back of car seat 130 from support posts 132 as shown in FIG. 14, whereby case 50 extends vertically upright from end 54 to end 53 to provide a narrow screen view of the touchscreen of a tablet applied to case 50 in a direction toward the windowed front 51 of case 50, such as from a seated position behind the back of car seat 130. To install case 50 with length 113 of elasticized material 100 in conjunction with car seat 130 as a matter of example, length 113 is taken up by hand as shown in FIG. 16 and then is stretched downwardly over the head rest 131 and is looped over support posts 132 as in FIG. 18 to suspend case 50 along the back of car seat 130 from support posts 132 as shown in FIG. 17, whereby case 50 extends vertically upright from side 55 to side 56 to provide a widescreen view of the touchscreen of a tablet applied to case 50 in a direction toward the windowed front 51 of case 50, such as from a seated position behind the back of car seat 130.

Figure 19:
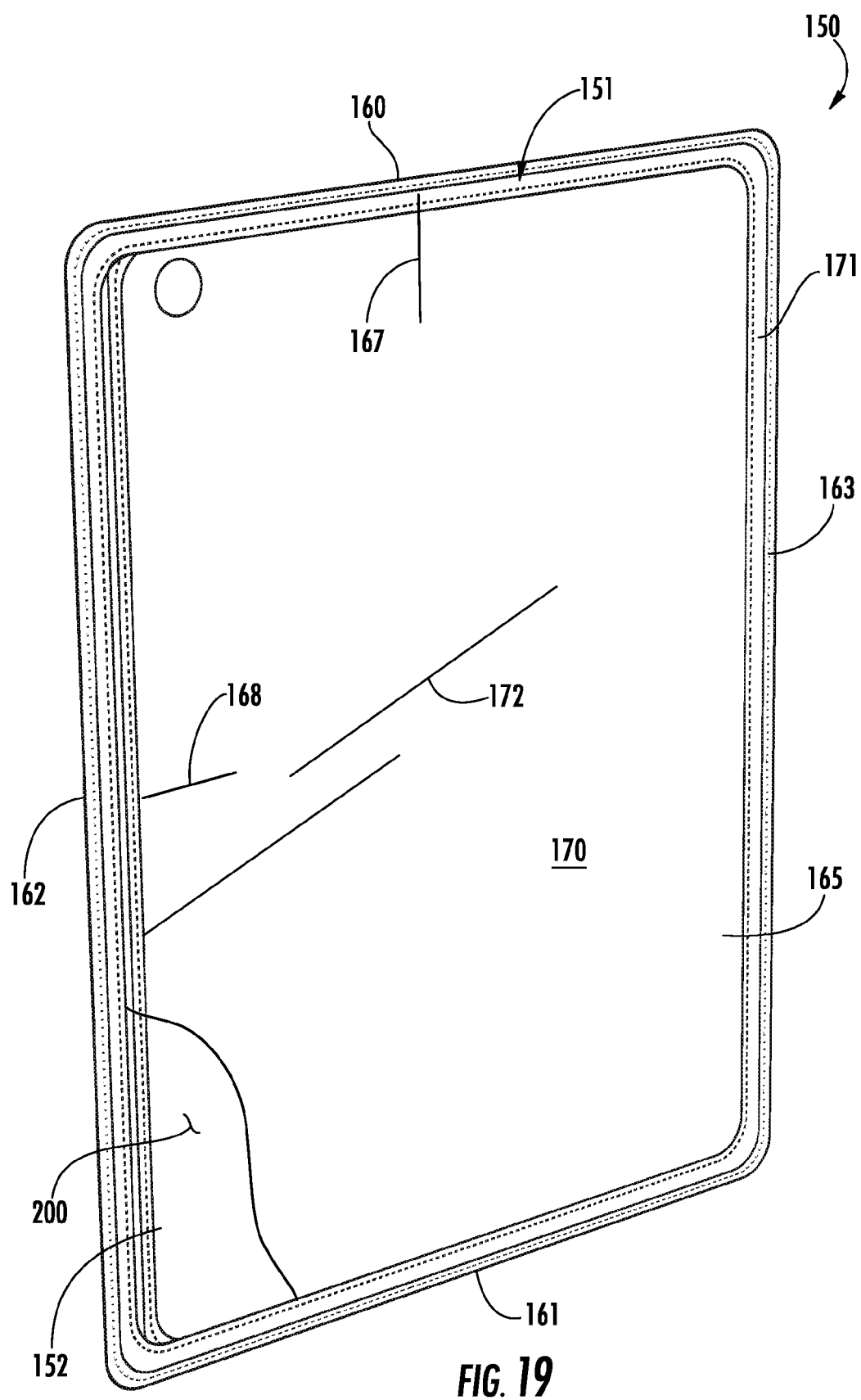
FIG. 19 is a front perspective view of a tablet accessory in the nature of an alternate embodiment of a portable case constructed and arranged in accordance with the principle of the invention with portions thereof being broken away for illustrative purposes, and which is useful for receiving and holding a tablet, as for carrying or safekeeping, and which has a back panel seen through a windowed front panel.

Reference is now directed to FIG. 19 in which there is seen a tablet accessory in the nature of a portable case 150 constructed and arranged in accordance with an alternate embodiment and which, like case 50, is for receiving and holding a tablet having a touchscreen, as for carrying or safekeeping. As defined above, a tablet is an electronic device that uses a touchscreen as its primary input device. Exemplary and well-known tablets include tablet personal computers and electronic readers. Like case 50, case 150 is portable in that it is easily carried or conveyed by hand, and is adapted to receive and hold a tablet as defined so as to protect the tablet while allowing a user to view and interface with the operative features of the tablet, including the touchscreen and the tablet's plugs, ports, buttons, camera, and the like.

Figure 20:
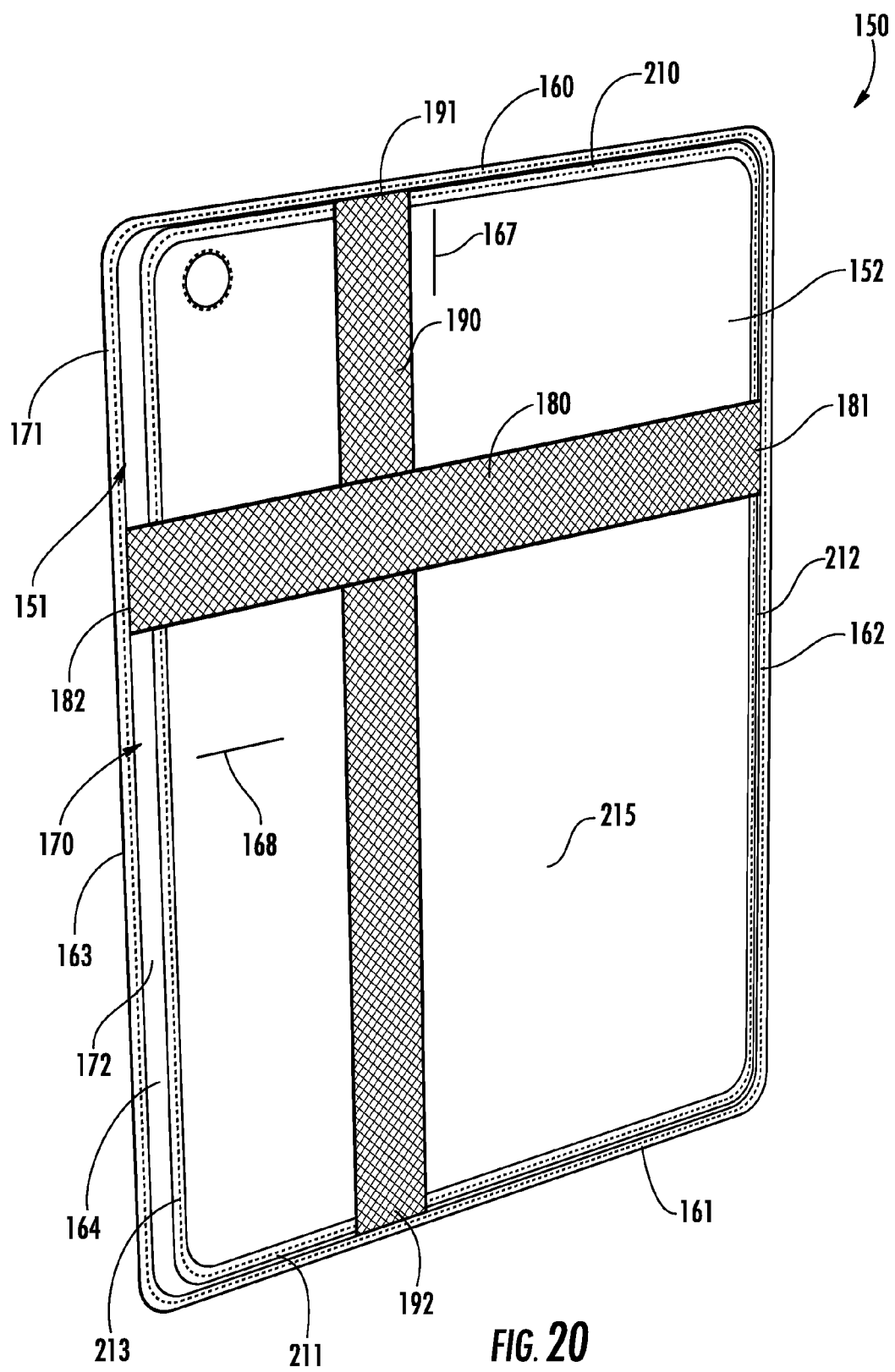
FIG. 20 is rear perspective view of the embodiment of FIG. 19 illustrating lengths of elasticized material attached to a front panel, and a back panel, which is show as it would appear captured between the lengths of elasticized material and the front panel.
Figure 21:
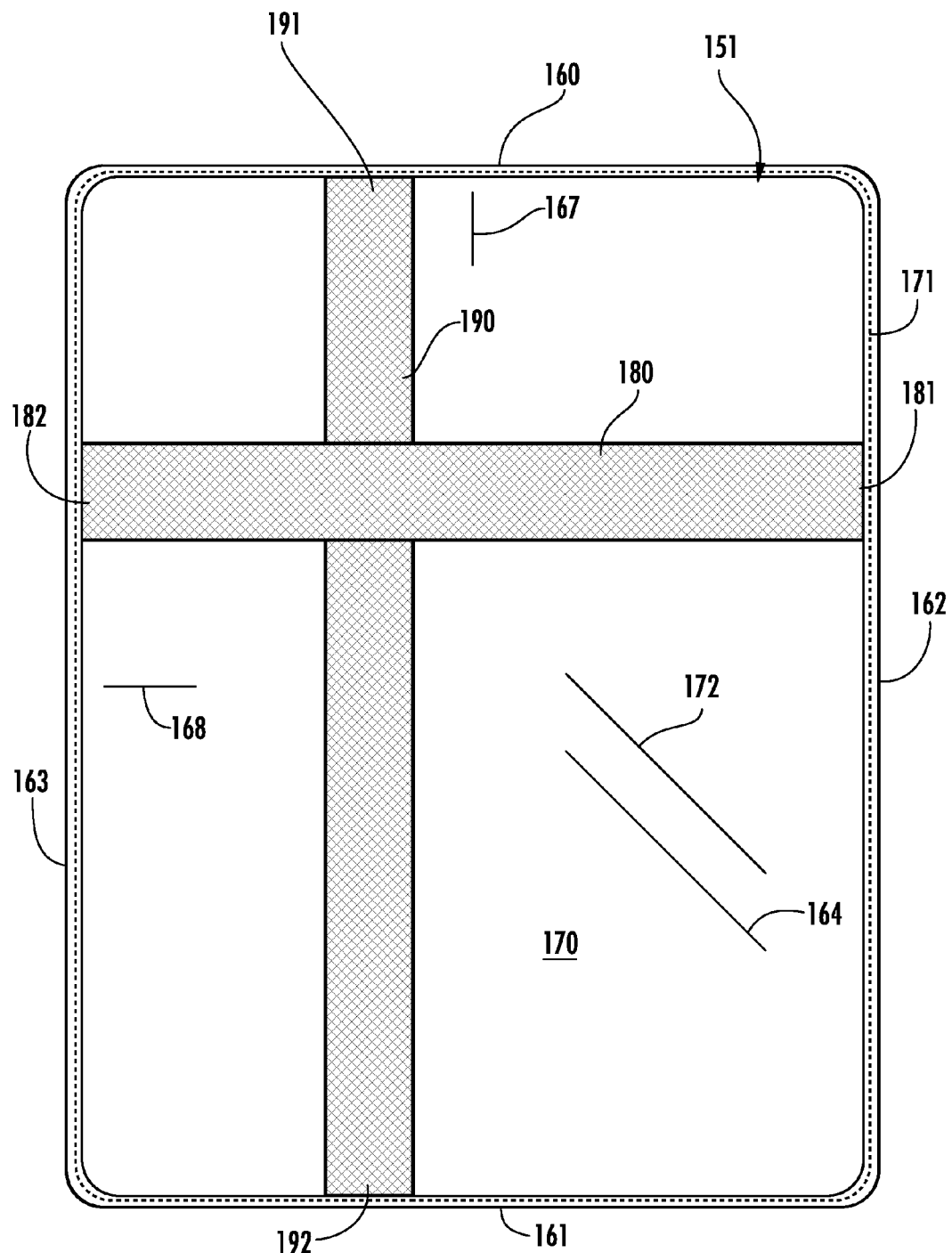
FIG. 21 is a rear elevation view of the windowed front panel of FIG. 19.

Referring in relevant part to FIGS. 19-21, case 150 includes opposed panels, including a windowed panel 151 and another separate panel 152. Windowed panel 151 is the front of case 150 and may be referred to as the windowed front or the windowed front panel of case 150, and panel 152 is the back of case 150 and may be referred to as the back or the back panel of case 150. Windowed panel 151 has opposed ends 160 and 161, opposed sides 162 and 163 extending between ends 160 and 161, an inner face/surface denoted at 164 in FIGS. 20 and 21, and an opposed outer face/surface denoted at 165 in FIG. 19. Windowed panel 151 is flat and rectangular in overall shape. Ends 160 and 161 are parallel with respect to each other, and sides 162 and 163 are parallel with respect to each other and are orthogonal with respect to ends 160 and 161. Windowed panel 151 has a length from end 160 to end 161 and a width from side 162 to side 163, and the length of windowed panel 151 is clearly greater than the width of width of windowed panel 151 characterizing the rectangular shape of windowed panel 151. Windowed panel 151 has a vertical middle denoted generally at 167, and a horizontal middle denoted generally at 168. Middle 167 is between sides 162 and 163, is equidistant with respect to sides 162 and 163, and extends in vertical direction from end 160 to end 161. Middle 168 is between ends 160 and 161, is equidistant with respect to ends 160 and 161, and extends in a horizontal direction from side 162 to side 163. The vertical direction of middle 167 is parallel with respect to sides 162 and 163, is orthogonal with respect to ends 160 and 161, and is orthogonal with respect to the horizontal direction of middle 168. The horizontal direction of middle 168 is parallel with respect to ends 160 and 161, is orthogonal with respect to sides 162 and 163, and is orthogonal with respect to the vertical direction of middle 167.

Windowed panel 151 consists of a window 170 framed by a perimeter border or frame 171. Window 170 is fitted with a thin sheet 172 of transparent material. Sheet 172 is thin in that it has a thickness of approximately 0.2-0.3 millimeters, and is formed of transparent flexible plastic that is affixed to and held by frame 171, such as by heat bonding, an adhesive, stitching, or the like. Frame 171 is formed of leather, tightly woven nylon, or other material or combination of materials having the properties of flexibility, resilience, tear-resistance, and ruggedness.

Windowed panel 151 is formed with lengths 180 and 190 of elasticized material, as shown in FIG. 21. Lengths 180 and 190 of elasticized material are each preferably an elongate elasticized member in the form of a bungee strap, and are attached to windowed panel 151. Length 180 has opposed extremities 181 and 182, and length 190 has opposed extremities 191 and 192. Extremity 181 of length 180 of elasticized material is affixed to side 162 of frame 171 between horizontal middle 168 and end 160, extremity 182 of length 180 of elasticized material is affixed to side 163 of frame 171 between horizontal middle 168 and end 160, and length 180 of elasticized material extends over and across inner face/surface 164 of windowed panel 151 from side 162 and across vertical middle 167 to side 163 between end 160 and horizontal middle 168 of windowed panel 151 and is juxtaposed or otherwise positioned near end 160. Extremity 191 of length 190 of elasticized material is affixed to end 160 of frame 171 between vertical middle 167 and side 163, extremity 192 of length 190 of elasticized material is affixed to end 161 of frame 171 between vertical middle 167 and side 163, and length 190 of elasticized material extends over and across inner face/surface 164 of windowed panel 151 from end 160 and across length 180 of elasticized material and then across horizontal middle 168 to end 161 between vertical middle 167 and side 163 of windowed panel 151 and is juxtaposed or otherwise positioned near side 163. At the intersection of lengths 180 and 190, length 180 extends over length 190, and this can be reversed if so desired. Length 180 of elasticized material extending across inner surface 164 of windowed panel 151 from side 162 to side 163 between end 160 and horizontal middle 168 is parallel with respect to ends 160 and 161 and also horizontal middle 168, and is orthogonal with respect to sides 162 and 163 and also vertical middle 167 and length 190 of elasticized material. Length 190 of elasticized material extending across inner surface 164 of windowed panel 151 from end 160 to end 161 between side 163 and vertical middle 167 is parallel with respect to sides 162 and 163 and also vertical middle 167, and is orthogonal with respect to ends 160 and 161 and also vertical middle 167 and length 180 of elasticized material.

Figure 22:
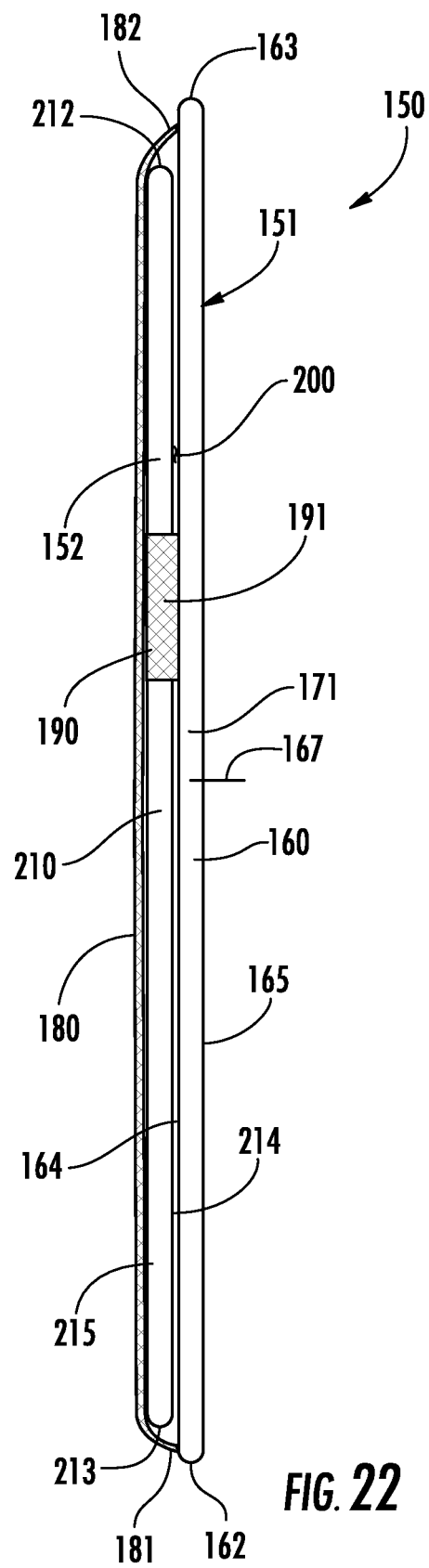
FIG. 22 is a top plan view of the embodiment of FIG. 19.
Figure 23:
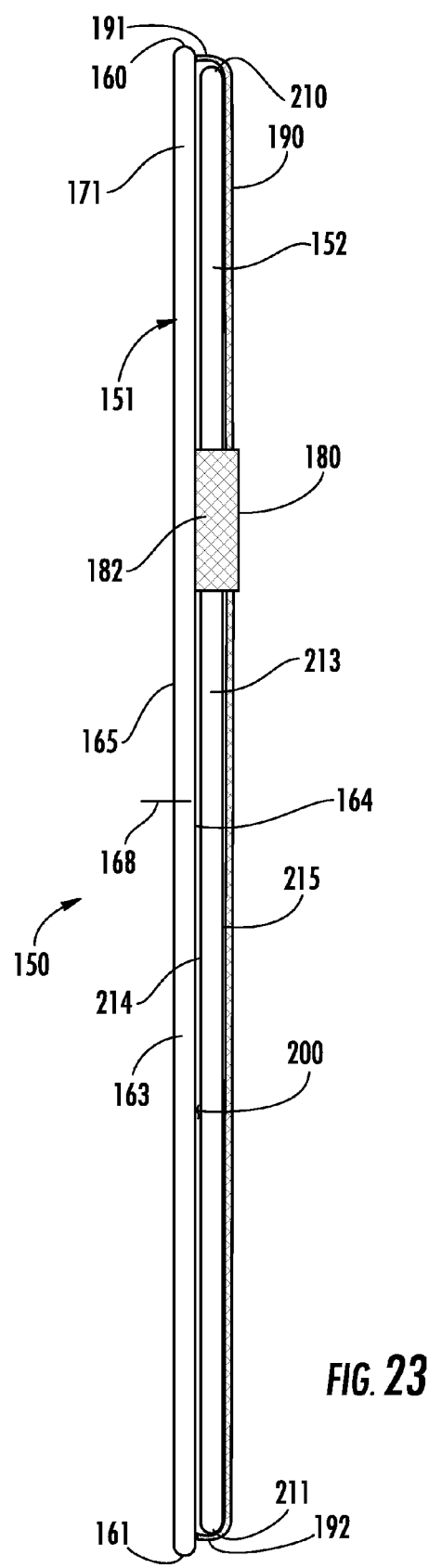
FIG. 23 is a left side elevation view of the embodiment of FIG. 19, the opposing right side elevation view being the same thereof.

Panel 152 is applied between lengths 180 and 181 of elasticized material and inner face/surface 164 of windowed panel 151 as shown in FIGS. 20, 22, and 23, so as to captively retain panel 152 by and between lengths 180 and 190 of elasticized material and inner face/surface 164 of windowed panel 151 and so as to define a receiving area 200 between inner face/surface 164 of windowed panel and panel 152 for receiving a tablet so as to juxtapose the touchscreen with the windowed panel 152 to permit the viewing and the touching of the touchscreen at window 170 via sheet 172 of transparent material in the operation of the tablet from windowed panel 151. Length 180 of elasticized material is available for suspending case 150 and a tablet applied to receiving area 200 in a direction from end 160 of windowed panel 151, and length 190 of elasticized material is available for suspending case 150 and a tablet applied to receiving area 200 in a direction from side 163 of windowed panel 151.

Referring in relevant part to FIGS. 20, 22, and 23, panel 152 is substantially or otherwise nearly coextensive with respect to windowed panel 151 being no more than 5-15 percent lesser in size and shape than windowed panel 151 in the present embodiment, and has opposed ends 210 and 211, opposed sides 212 and 213 extending between ends 210 and 211, an inner face/surface denoted at 214 in FIGS. 22 and 23, and an opposed outer face/surface denoted at 215 in FIGS. 20, 22, and 23. Like windowed panel 151, panel 152 is flat and rectangular in overall shape. Ends 210 and 211 are parallel with respect to each other, and sides 212 and 213 are parallel with respect to each other and are orthogonal with respect to ends 210 and 211. In the application of panel 152 between lengths 180 and 181 of elasticized material and inner face/surface 164 of windowed panel 151 as shown in FIGS. 20, 22, and 23, inner surface 154 of panel 152 is applied against inner surface 164 of windowed panel 151, end 210 of panel 152 is juxtaposed along end 160 of windowed panel 151, end 211 of panel is juxtaposed along end 161 of windowed panel 151, side 212 of panel 152 is juxtaposed along the side 162 of windowed panel 151, side 213 of panel 152 is juxtaposed along the side 163 of windowed panel 151, and receiving area 200 is formed and defined between inner face/surface 164 of windowed panel 151 and inner face/surface 214 of back 152. Length 180 of elasticized material extends across outer surface 215 of panel 152 from end 210 of panel 152 to end 211 of panel 152, and length 190 of elasticized material extends across outer surface 215 of panel 152 from side 212 of panel 152 to side 213 of panel 152, and panel 152 is captured by and between inner face/surface 164 of windowed panel 151 and lengths 180 and 190 of elasticized material.

Figure 24:
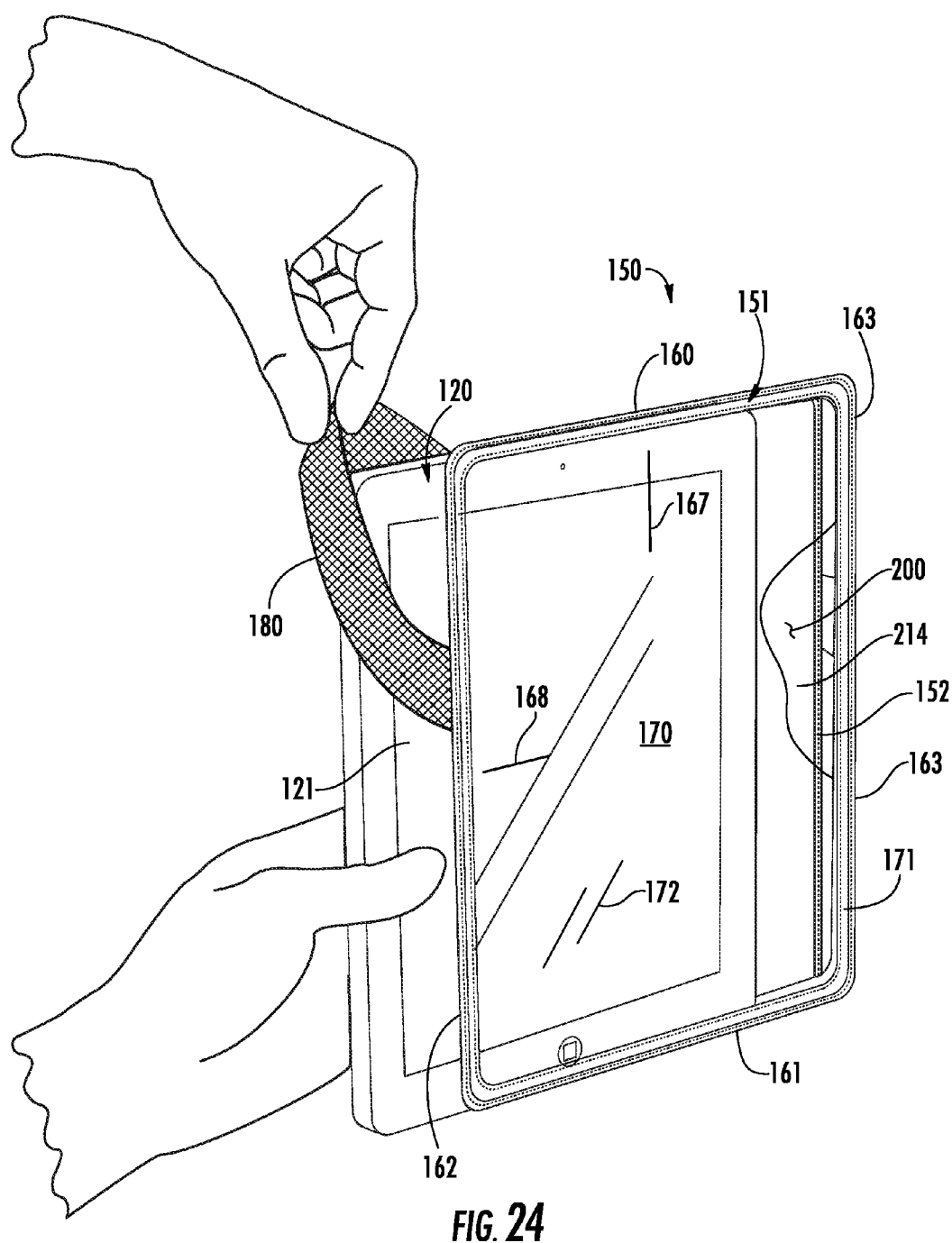
FIGS. 24 and 25 are front and rear perspective views, respectively, of the embodiment of FIG. 19 and a tablet shown as the would appear being assembled.
Figure 25:
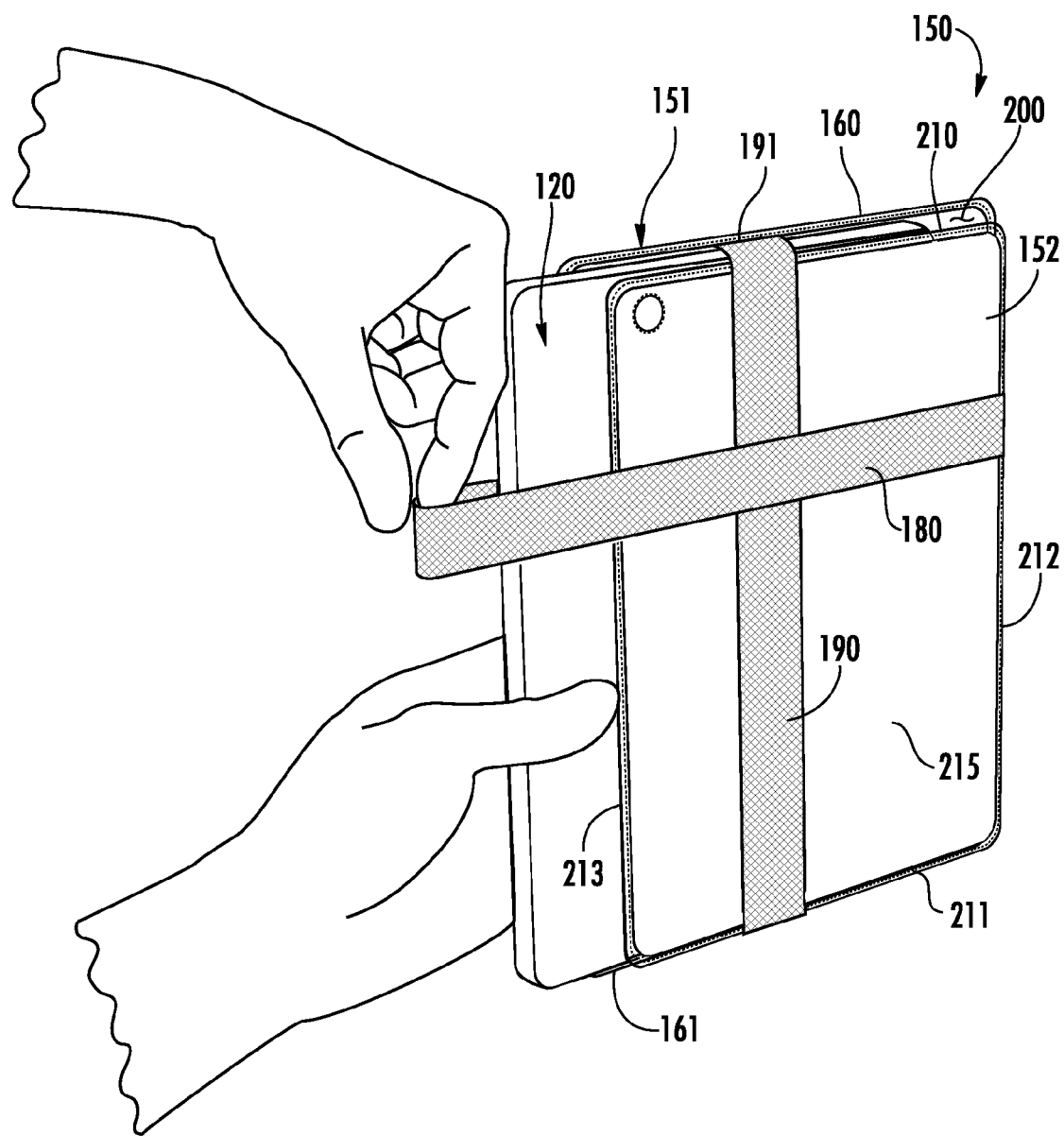
Figure 26:
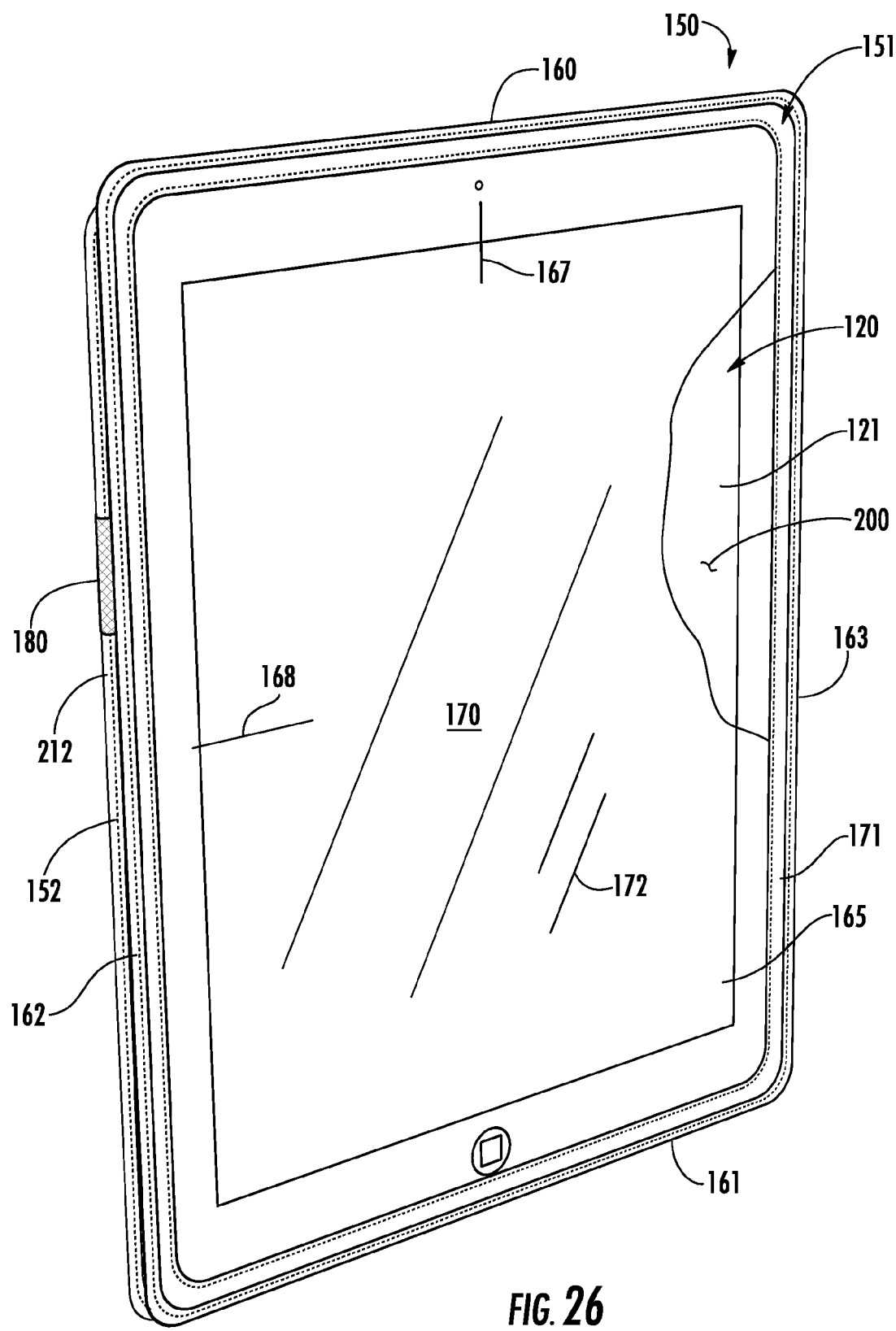
FIG. 26 is a perspective view of a tablet and the embodiment of FIG. 19 shown as they would appear assembled so as to form a cased tablet.

To employ case 150 with a tablet as the term is defined above, case 150 and tablet 120 with touchscreen 121 are taken up, such as by hand, and assembled as in FIG. 26 so as to form a cased tablet. Tablet 120 with touchscreen 121 as shown in FIGS. 24 and 25 is taken up, such as by hand, and applied into receiving area 200 between windowed panel 151 and panel 152, moving lengths 180 and 190 out of the way as necessary, so as to juxtapose touchscreen 121 with windowed panel 151 to permit the viewing and the touching of touchscreen 121 in the operation of tablet via sheet 172 of transparent material of windowed front 151. Once fully inserted into receiving area 200 of case 150 as in FIGS. 26 and 26, windowed panel 151 and panel 152 are separated from one another so as to enlarge receiving area 200 to permit the reception of tablet 120 between inner face/surface 164 of windowed panel 151 and inner face/surface 214 of panel 152. The elasticity of lengths 180 and 190 of elasticized material allow them to be stretched and moved out of the way to permit the reception of tablet 120 at receiving area 200 between inner face/surface 164 of windowed panel 151 and inner face/surface 214 of panel 152. Tablet 120 is oriented in place so as to juxtapose touchscreen 121 with windowed panel 151 to permit the viewing and touching of touchscreen 121 in the operation of tablet 120 via sheet 172 of transparent material. More specifically, tablet 120 is oriented in place at receiving area 200 to orient the rectangular shape of tablet 120 to coincide or otherwise relate to the corresponding rectangular shapes of panel 152 and windowed panel 151 so as to juxtapose the ends of tablet 120 with ends 160 and 161 of windowed panel 151 and the ends 210 and 211 of panel 152 from within receiving area 200, to juxtapose the sides of tablet 120 with sides 162 and 163 of windowed panel 151 and sides 212 and 213 of panel 152 from within receiving area 200, to juxtapose the back of tablet 120 with panel 152 from within receiving area 200, and, of course, to juxtapose touchscreen 121 of tablet 120 with windowed panel 151 from within receiving area 200 to permit the viewing and the touching of touchscreen 121 in the operation of tablet via sheet 172 of transparent material of windowed panel 151. All this means is that when tablet 120 and case 150 are assembled as in FIG. 26, they relate to one another so as to fit together, and the elasticity of lengths 180 and 190 of elasticized material acts between windowed panel 151 and panel 152 across outer face/surface 214 of panel 152 so as to pull windowed panel 151 and panel 152 together constrictively capturing tablet 120 between inner face/surface 164 of windowed panel 151 and inner face/surface 214 of panel 152. The perimeter of tablet 120 is exposed at receiving area 200 between windowed panel 151 and panel 152 to all power cords and other devices to be plugged into tablet 120, to provide user access to the various operating buttons of tablet 120, and to allow certain features of tablet 120 to be used without interference from case 150. Panel 152 is formed with a conventional camera opening to relate to a camera lens of tablet 120. Lengths 180 and 190 of elasticized material extend between windowed panel 151 and panel 152 traversing receiving area 200 across the ends and sides of tablet 120 and this retains tablet 120 at receiving area 200 to prevent tablet 120 from slipping and falling out from receiving area 200.

Case 150 is useful for holding and containing tablet 120, as for carrying or safekeeping. Lengths 180 and 190 of elasticized material attached to windowed panel 151 of case 150 are useful for suspending case 150, and tablet 120 contained therein, in a vertical/upright direction from end 161 of case 150 to end 160 of case 150 for narrow or vertical screen operation/viewing of tablet 120, and in a vertical/upright direction from side 162 of case 150 to side 163 of case 150 for horizontal or widescreen operation/viewing of tablet, and this provides for convenient use and viewing of tablet 120 held in case 150 while so suspended. Touchscreen 121 of tablet 120, like conventional tablets, is configured to adjust or rotate the display for viewing in response to rotation of the tablet between a narrow screen orientation of the display extending upright from end 161 of case 150 to end 160 of case 150, and a widescreen orientation viewing of the display extending upright from side 162 of case 150 to side 163 of case 150. This is a common feature among tablet devices. Depending on which way a user desires to view the touchscreen of a tablet held by case 150 in the use of tablet 120, length 180 of elasticized member is useful for suspending case 150 in a vertical direction of the tablet touchscreen from end 160 of windowed panel 151 of case 150 for narrow screen viewing, and length 190 of elasticized material is useful for suspending case 150 in a vertical direction of the tablet touchscreen from side 162 of case 150 for widescreen viewing.

In the vertical direction of case 150 from end 161 to end 160, the length of case 150 extends vertically upright from end 161 to end 160, and length 180 of elasticized material 100 is used to suspend case 150 in this vertical direction from windowed panel 151 simply by taking up length 180 by hand and hooking over the object from which case 150 is to be suspended. The stretchability of length 180 of elasticized material allows length 180 to be stretched as needed to facilitate the application of length 180 over an object or thing from which one desires to suspend case 150. The juxtaposition of length 180 of elasticized material near end 160 of case 150 between sides 162 and 163 ensures that when length 180 is used to suspend case 150 that case 150 will naturally tend to hang downwardly in a vertical direction from end 160 to end 161 and is resistant to tipping downwardly from end 160. In the vertical direction of case 150 from side 162 to side 163, the width of case 150 extends vertically upright from side 162 to side 163, and length 190 of elasticized material 100 is used to suspend case 150 in this direction from windowed panel 151 simply by taking up length 190 by hand and hooking over the object from which case 150 is to be suspended. The stretchability of length 190 of elasticized material allows length 190 to be stretched as needed to facilitate the application of length 190 over an object or thing from which one desires to suspend case 150. The juxtaposition of length 190 of elasticized material near side 163 of case 150 between ends 160 and 161 ensures that when length 190 is used to suspend case 150 that case 150 will naturally tend to hang downwardly in a vertical direction from side 163 to side 162 and is resistant to tipping downwardly from side 163.

Figure 28:
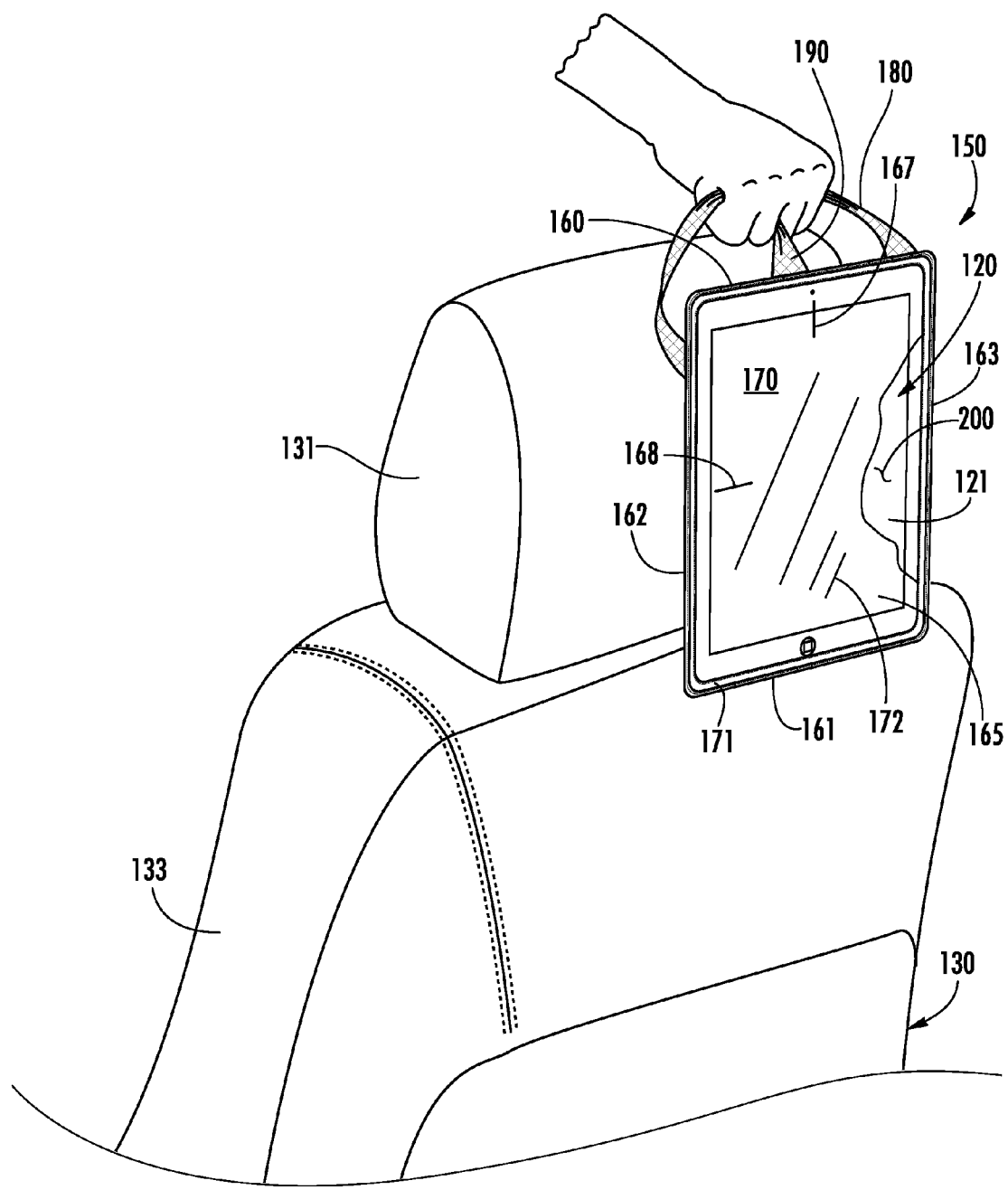
FIG. 28 is a perspective view of the cased tablet of FIGS. 26 and 27 shown as it would appear in the process of being suspended in a first configuration at an elevated location using the lengths of elasticized material first illustrated in FIG. 20.
Figure 29:
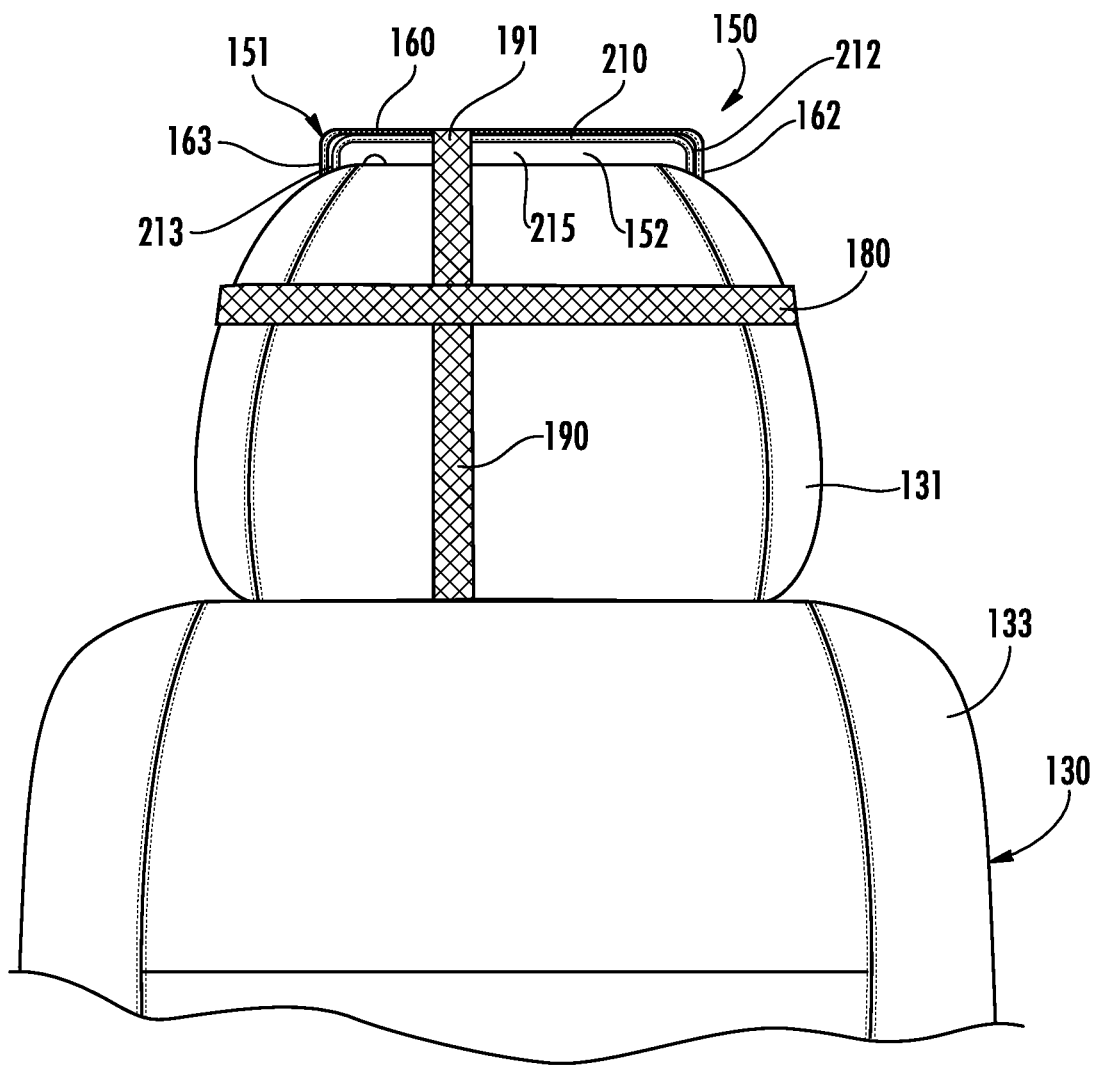
FIG. 29 is a rear elevation view of the cased tablet of FIGS. 26 and 27 shown as it would appear suspended in a first configuration at an elevated location for viewing using the lengths of elasticized material first illustrated in FIG. 20.
Figure 30:
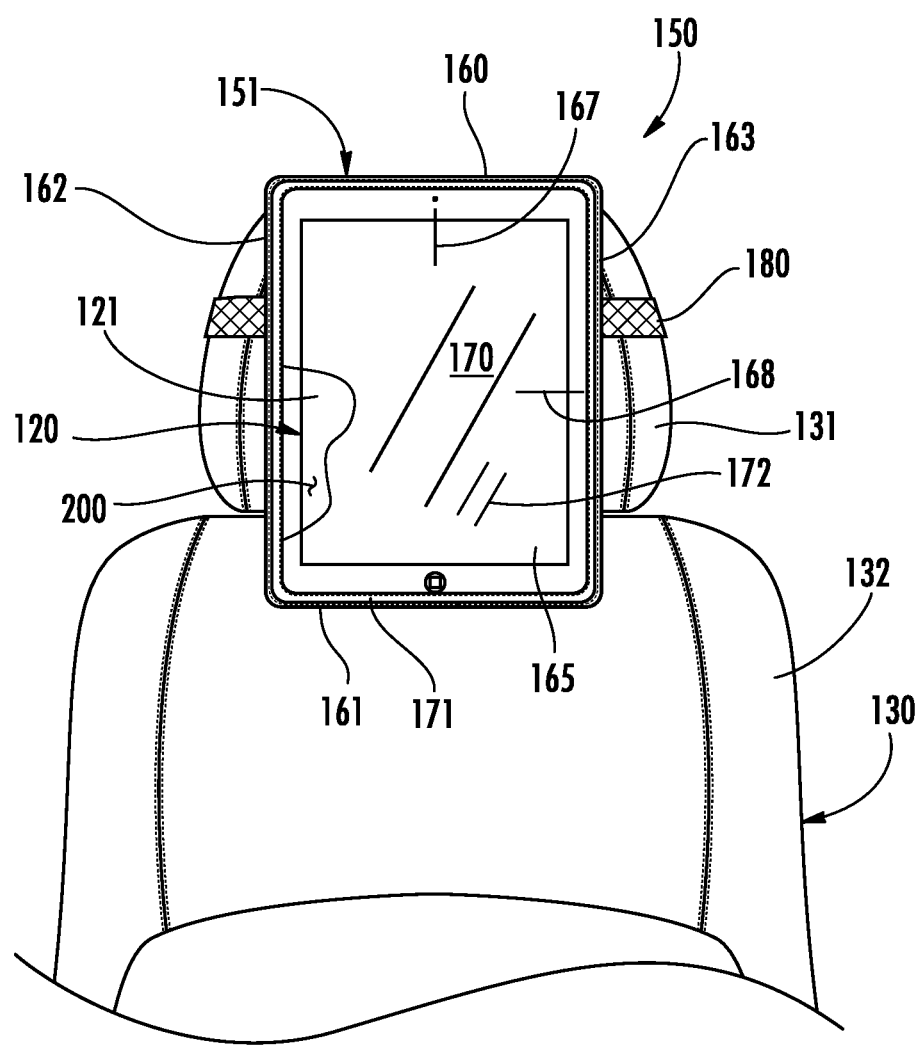
FIG. 30 is a front elevation view of the embodiment of FIG. 29.
Figure 33:
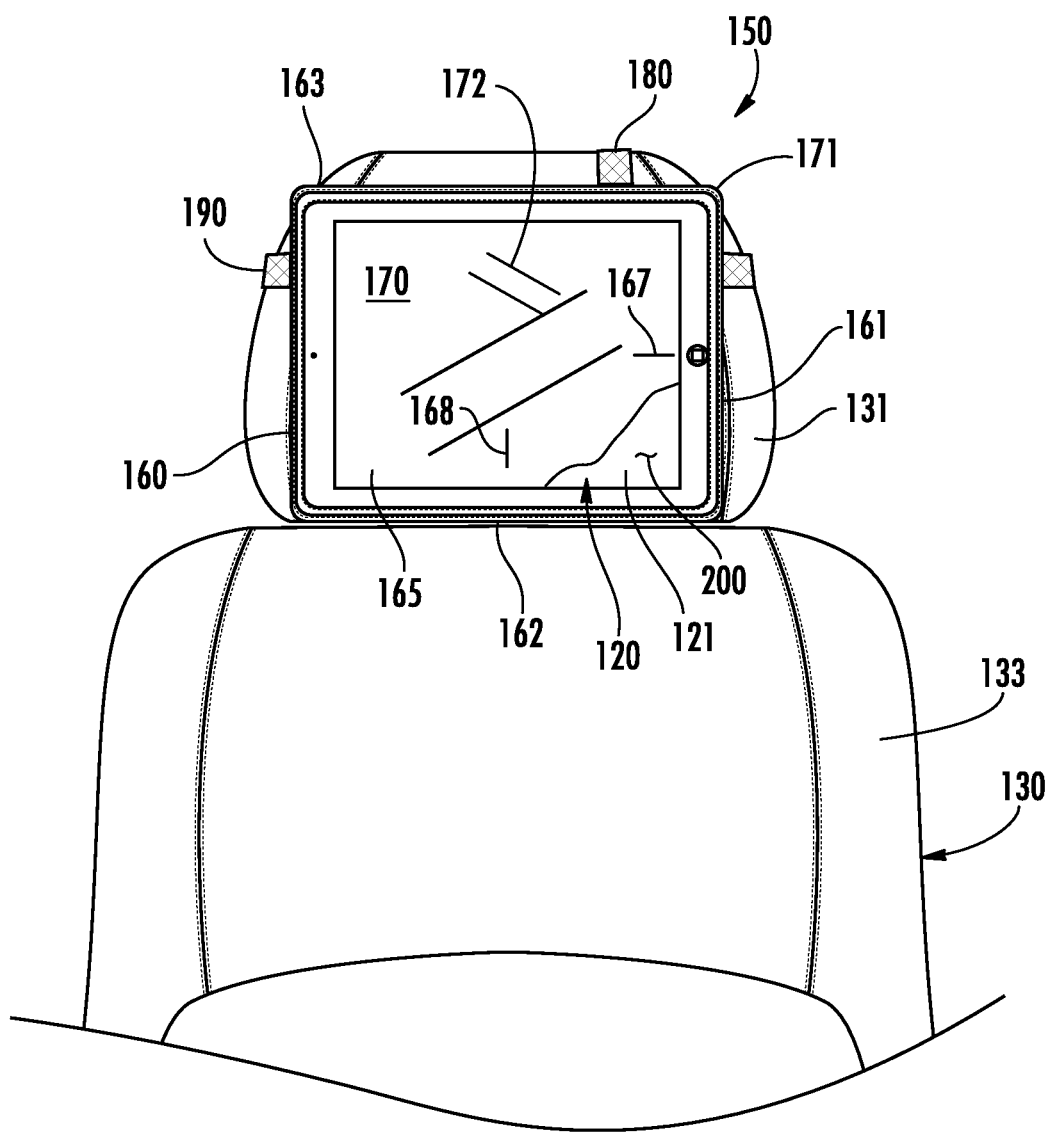
FIG. 33 is a front elevation view of the embodiment of FIG. 32.

Lengths 180 and 190 provide for flexibility in suspending case 150 in a vertical direction from end 161 to end 160 of windowed panel 151, as in FIG. 30, and in a vertical direction from side 162 to side 163 of windowed panel 151, as in FIG. 33, and may be used concurrently in these ways. As a matter of illustration and reference, FIG. 28 illustrates car seat 130 including head rest 131 attached to the top of seat 133. To install case 150 with lengths 180 and 190 of elasticized material so as to suspend case 150 from car seat 130 in a vertical direction from end 161 to end 160, lengths 180 and 190 are taken up by hand, as in FIG. 28, and stretched over the head rest 131 so as to loop length 180 of elasticized material horizontally around the width of head rest 131 and to loop length 190 of elasticized material vertically around the height of head rest 131 as shown in FIG. 29. Panel 152 is, in turn, applied to the back of head rest 131 and the elasticity of lengths 180 and 190 of elasticized material act on windowed front 151 drawing it toward panel 152 clamping and securing the tablet applied between windowed panel 151 and panel 152. This suspends case 150 along the back of head rest 131 of car seat 130 as shown in FIG. 30, whereby case 150 extends vertically upright from end 161 to end 160 to provide a narrow screen view of the touchscreen of a tablet applied to case 150 in a direction toward the windowed panel 151 of case 150, such as from a seated position behind the back of car seat 130.

Figure 31:
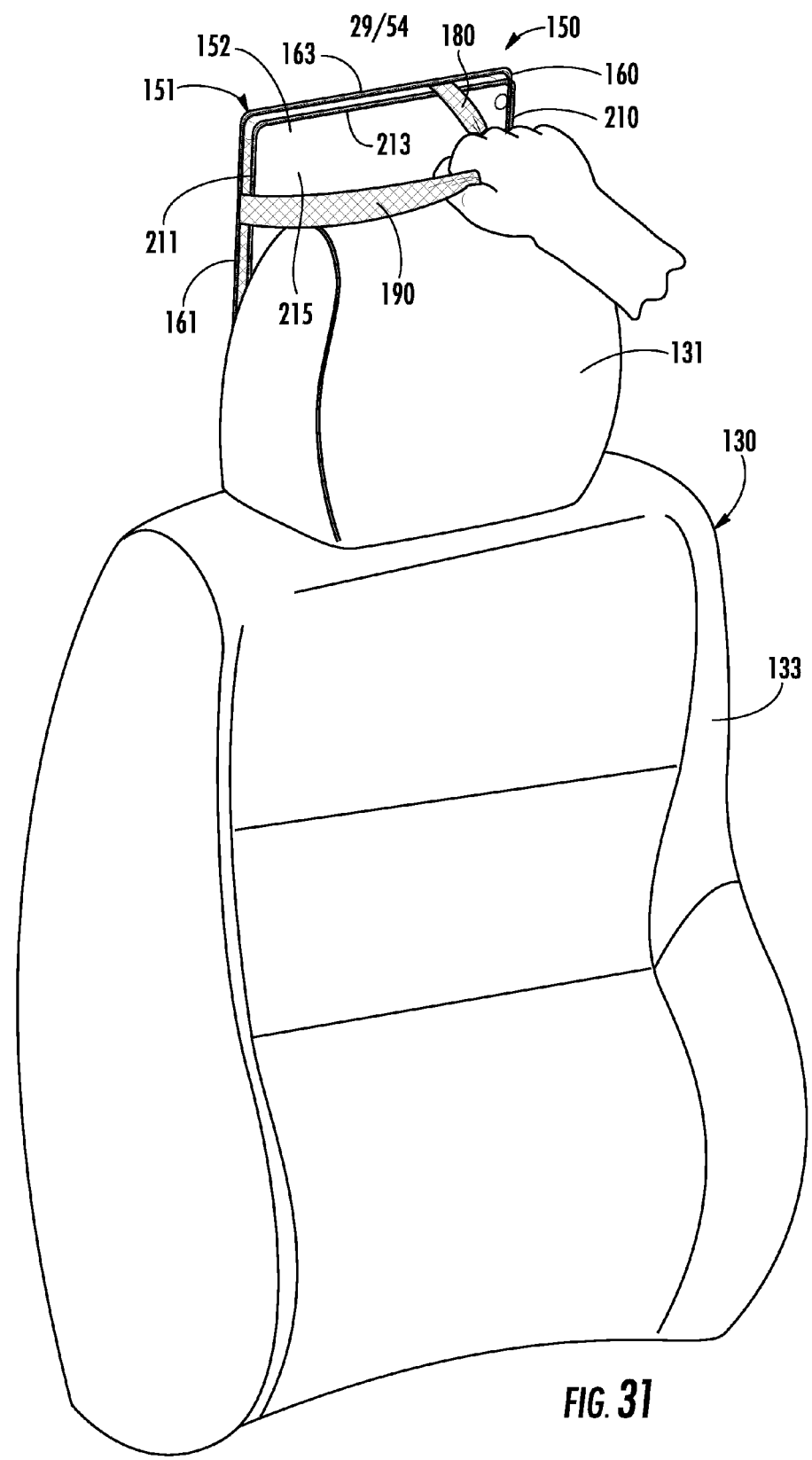
FIG. 31 is a perspective view of the cased tablet of FIGS. 26 and 27 shown as it would appear in the process of being suspended in a second configuration at an elevated location using the lengths of elasticized material first illustrated in FIG. 20.
Figure 32:
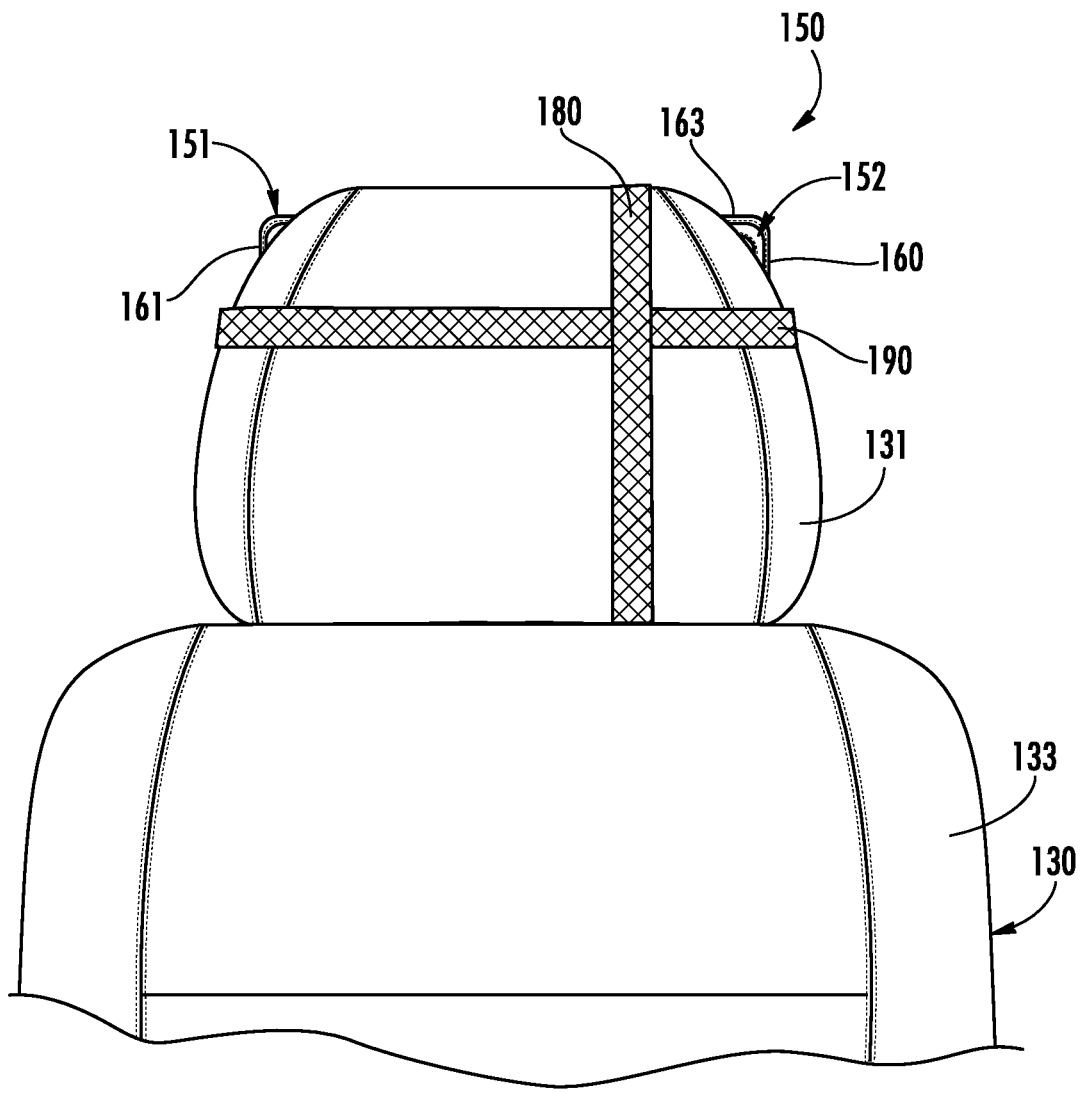
FIG. 32 is a rear elevation view of the cased tablet of FIGS. 26 and 27 shown as it would appear suspended in a second configuration at an elevated location for viewing using the lengths of elasticized material first illustrated in FIG. 20.

To install case 150 with lengths 180 and 190 of elasticized material so as to suspend case 150 from car seat 130 in a vertical direction from side 162 to side 163, lengths 180 and 190 are taken up by hand, as in FIG. 31, and stretched over the head rest 131 so as to loop length 190 of elasticized material horizontally around the width of head rest 131 and to loop length 180 of elasticized material vertically around the height of head rest 131 as shown in FIG. 31. Panel 152 is, in turn, applied to the back of head rest 131 and the elasticity of lengths 180 and 190 of elasticized material act on windowed front 151 drawing it toward panel 152 clamping and securing the tablet applied between windowed panel 151 and panel 152. This suspends case 150 along the back of head rest 131 of car seat 130 as shown in FIG. 33, whereby case 150 extends vertically upright from side 162 to side 163 to provide a widescreen view of the touchscreen of a tablet applied to case 150 in a direction toward the windowed panel 151 of case 150, such as from a seated position behind the back of car seat 130.

Figure 27:
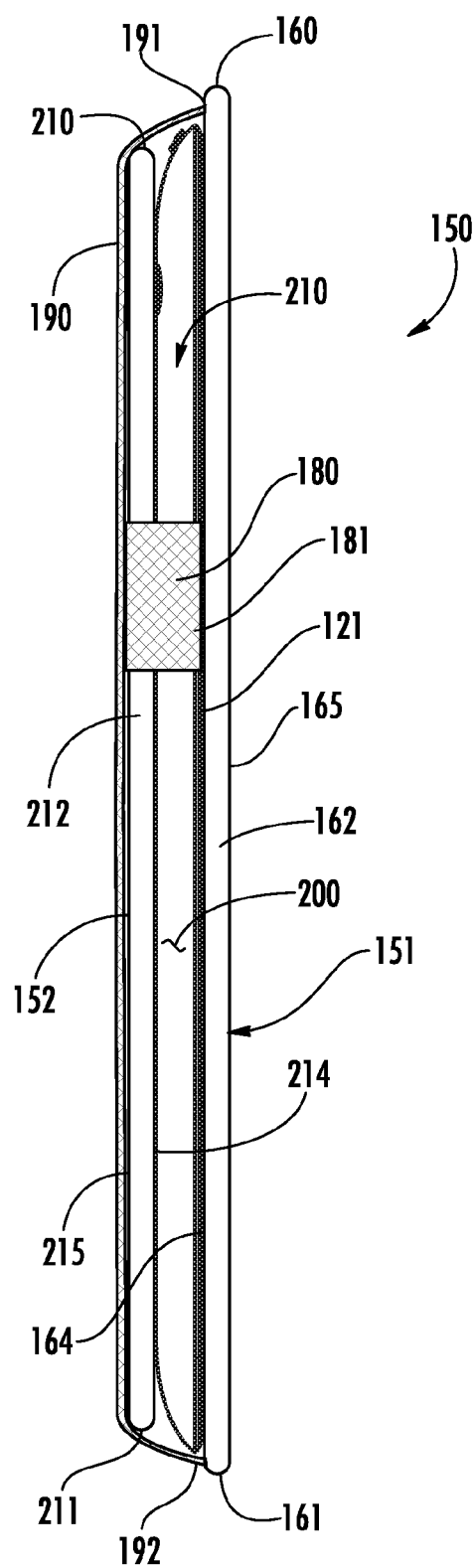
FIG. 27 is a right side elevation view of the cased tablet of FIG. 26, the opposite left side elevation view being substantially the same thereof.
Figure 34:
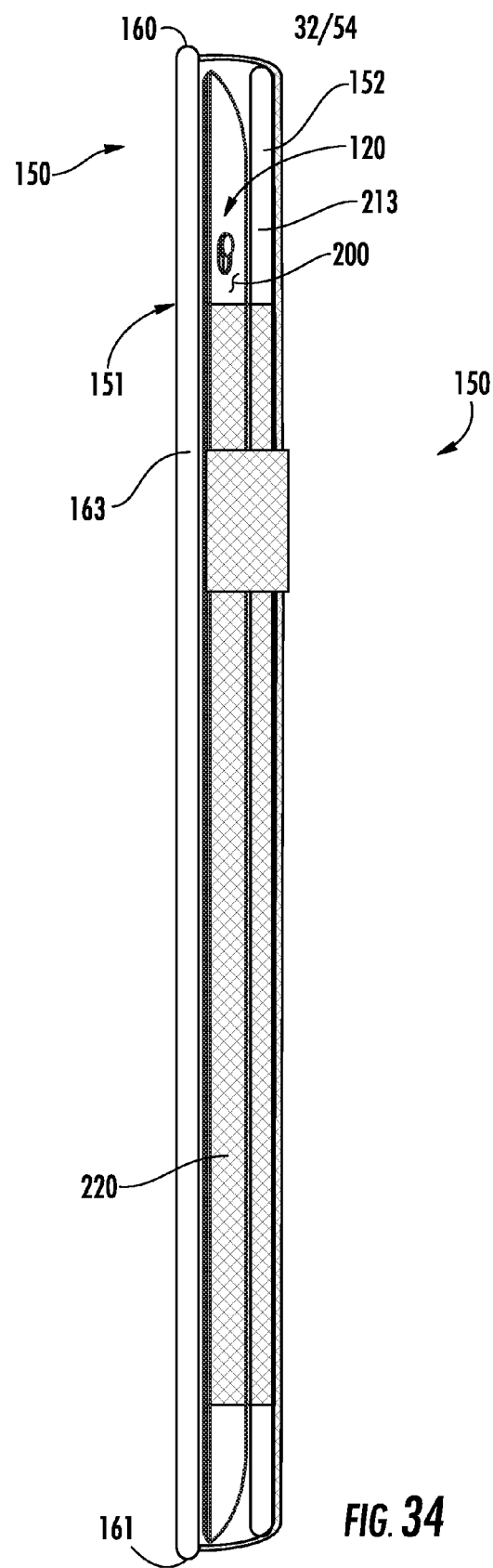
FIG. 34 is a left side view of the embodiment of FIG. 27, and further illustrating an elasticized coupling coupled between the back panel and the windowed front panel and being different from the lengths of elasticized material.
Figure 35:
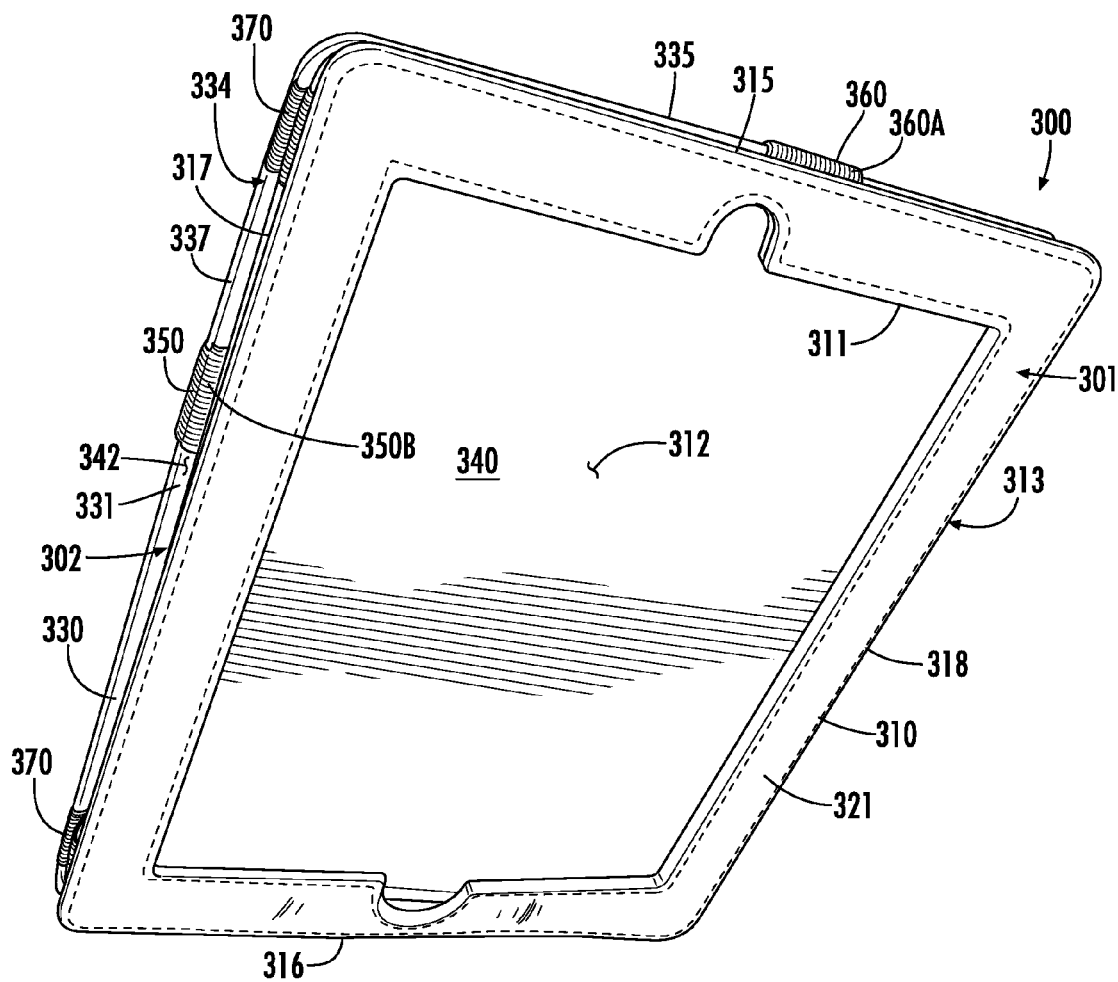
FIG. 35-38 are perspective views of a tablet accessory being yet another alternate embodiment of a portable case constructed and arranged in accordance with the principle of the invention, and which is useful for receiving and holding a tablet, as for carrying or safekeeping, and which has a back panel, a windowed front panel, and elastic straps coupling the back panel to the windowed front panel.
Figure 36:
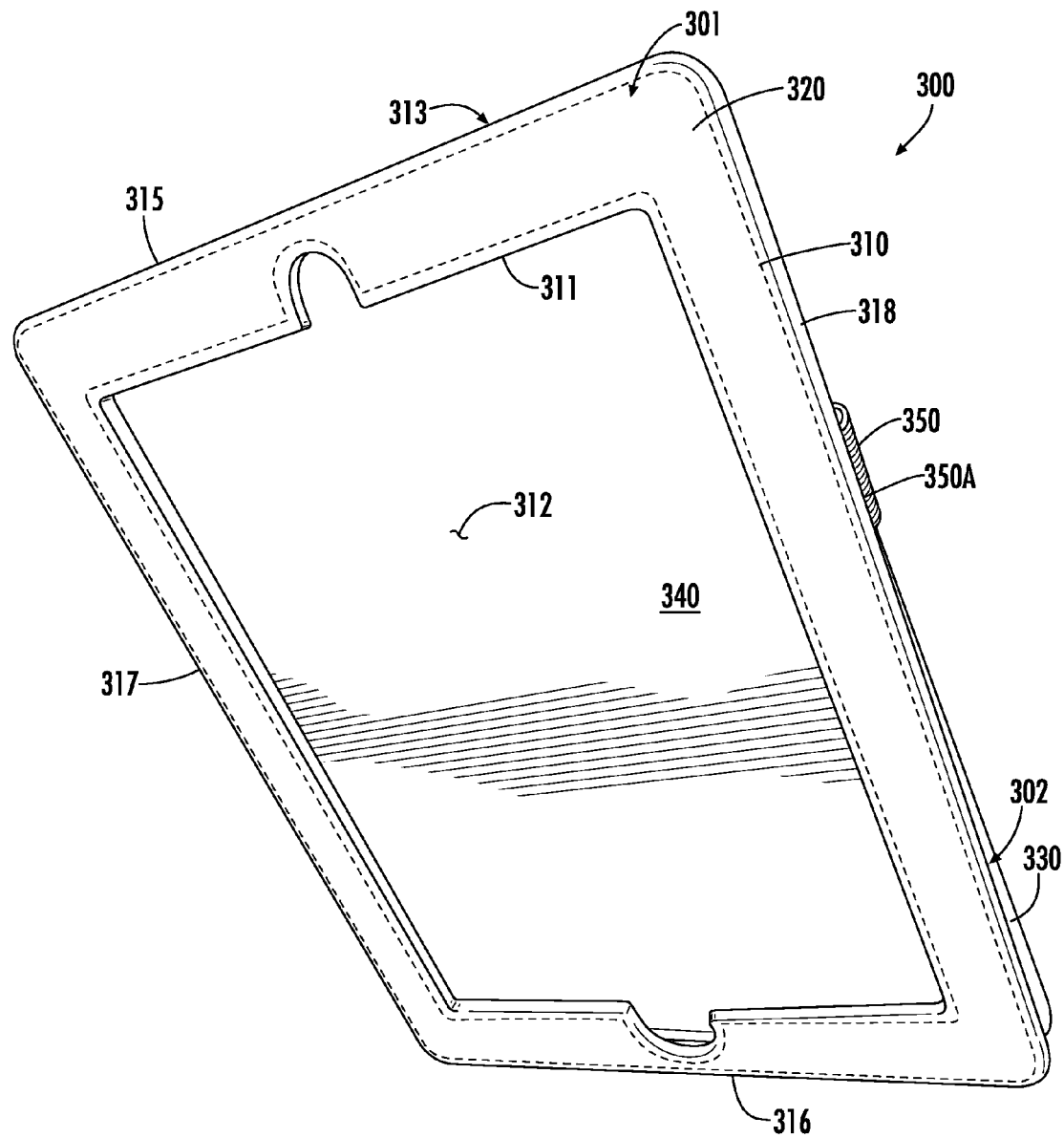

FIG. 34 is a left side elevation view of the embodiment of FIG. 27 illustrating tablet 120 applied to receiving area 200 between windowed panel 151 and panel 152 of case 150. The embodiment of FIG. 27 is modified as in FIG. 34 with the addition of an elasticized coupling 220 coupled between panel 152 and windowed panel 151. Elasticized coupling 220 is an elongate piece of elasticized fabric that is located between ends 160 and 161 of windowed panel 151 and which is attached to windowed panel 151 and panel 152 with stitching, heat bonding, adhesive, or the like. The application of elasticized coupling 220 between windowed panel 151 and panel 152 couples windowed panel 151 to panel 152, and also elastically acts between windowed panel 151 and panel 152 pulling windowed panel 151 and panel 152 together so as to clamp and secure tablet 120 therebetween applied to receiving area 200. If desired, the opposed side of case 150 may be formed with a similar elasticized coupling.

Reference is now directed to FIGS. 35-44 in which there is seen a tablet accessory being a portable case 300 constructed and arranged in accordance with an alternate embodiment and which, like cases 50 and 150, is for receiving and holding a tablet having a touchscreen, as for carrying or safekeeping. As defined above, a tablet is an electronic device that uses a touchscreen as its primary input device. Exemplary and well-known tablets include tablet personal computers and electronic readers. Like cases 50 and 150, case 300 is portable in that it is easily carried or conveyed by hand, and is adapted to receive and hold a tablet as defined so as to protect the tablet while allowing a user to view and interface with the operative features of the tablet, including the touchscreen and the tablet's plugs, ports, buttons, camera, and the like.

Case 300 includes a windowed front 301, and a back 302. Windowed front 301 and back 302 are separate parts. Windowed front 301 is a windowed panel and can be referred to as a windowed front panel, and back 302 is a panel and can be referred to as a back panel. Windowed front 301 is the front of case 300, and back 302 is the back of case 300.

Referring to FIGS. 35-44 in relevant part, windowed front 301 is flat and rectangular in overall shape. Windowed front 301 is a perimetric frame 310 that includes continuous inner edge 311 that encircles and defines opening or window 312, which is rectangular in shape, and perimetric edge or perimeter 313. Perimeter 313 is defined by opposed end edges 315 and 316, and opposed side edges 317 and 318 extending between end edges 315 and 316, an inner face/surface 320, and an opposed outer face/surface 321. End edges 315 and 316 are parallel with respect to each other, and side edges 317 and 318 are parallel with respect to each other and are orthogonal with respect to end edges 315 and 316. Frame 310 has a length from end edge 315 to end edge 316 and a width from side edge 317 to side edge 318. The length of frame 310 is clearly greater than the width of frame 310, characterizing the rectangular shape of windowed front 301. Frame 310 is formed of leather, tightly woven nylon, or other material or combination of materials having the properties of flexibility, resilience, tear-resistance, and ruggedness.

Back 302 is flat and, like windowed front 301, rectangular in overall shape, and is substantially or otherwise nearly coextensive with respect to windowed front 301. Back 302 is a panel 330 having inner surface 331, outer surface 332, and perimetric edge or perimeter 334. Perimeter 334 is defined by opposed end edges 335 and 336, and opposed side edges 337 and 338 extending between end edges 335 and 336. End edges 335 and 336 are parallel with respect to each other, and side edges 337 and 338 are parallel with respect to each other and are orthogonal with respect to end edges 335 and 336. Panel 330 has a length from end edge 335 to end edge 336 and a width from side edge 337 to side edge 338. The length of panel 330 is clearly greater than the width of panel 330, characterizing the rectangular shape of back 302. Like frame 310, panel 330 is formed of leather, tightly woven nylon, or other material or combination of materials having the properties of flexibility, resilience, tear-resistance, and ruggedness.

Windowed front 301 is superimposed atop back 302 and is axially spaced apart and substantially parallel relative to back 302. A receiving 340 area is defined between inner surface 320 of windowed front 301 and inner surface 331 of back 302 for receiving a tablet having a touchscreen so as to juxtapose the touchscreen with window 312 of windowed front 301 to permit the viewing and the touching of the touchscreen in the operation of the tablet from window 312 of windowed front 301. End edge 315 of windowed front 301 is axially spaced from end edge 335 of back 302, end edge 316 of windowed front 301 is axially spaced from end edge 36 of back 302, side edge 317 of windowed front 301 is axially spaced from side edge 337 of back 302, and side edge 318 of windowed front 301 is axially spaced from side edge 338 of back 302. Perimeter gap 342 to receiving area 340 is between perimeter 313 of windowed front 301 and perimeter 334 of back 302. In other words, perimeter gap 342 to receiving area 340 is defined between edges 315-318 of windowed front 301 and edges 335-338 of back 302. Perimeter gap 342 has four sides, one between end edges 315 and 335, one between end edges 316 and 336, one between side edges 317 and 337, and the final one between side edges 318 and 338.

Figure 37:
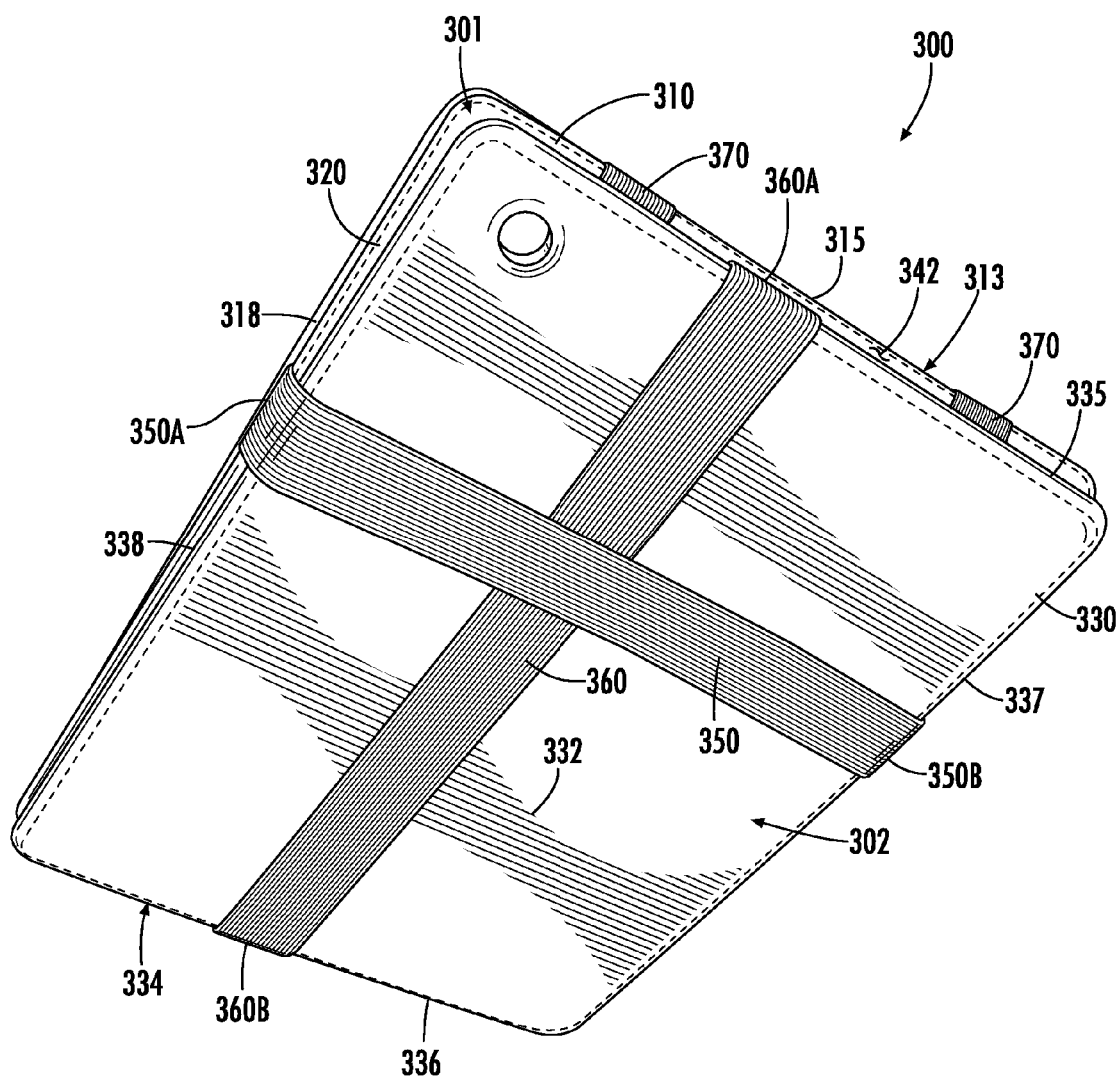
Figure 38:
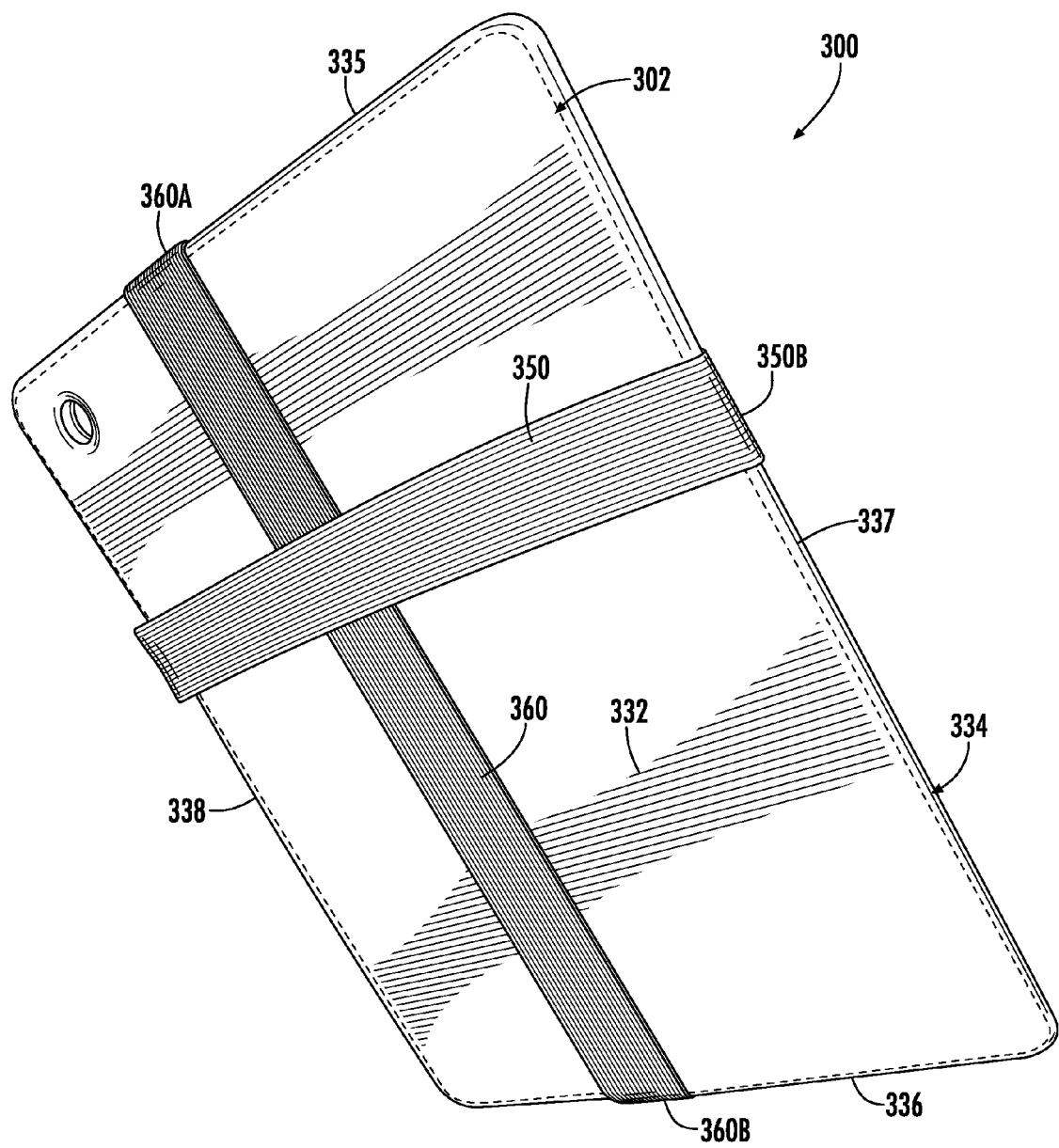
Figure 39:
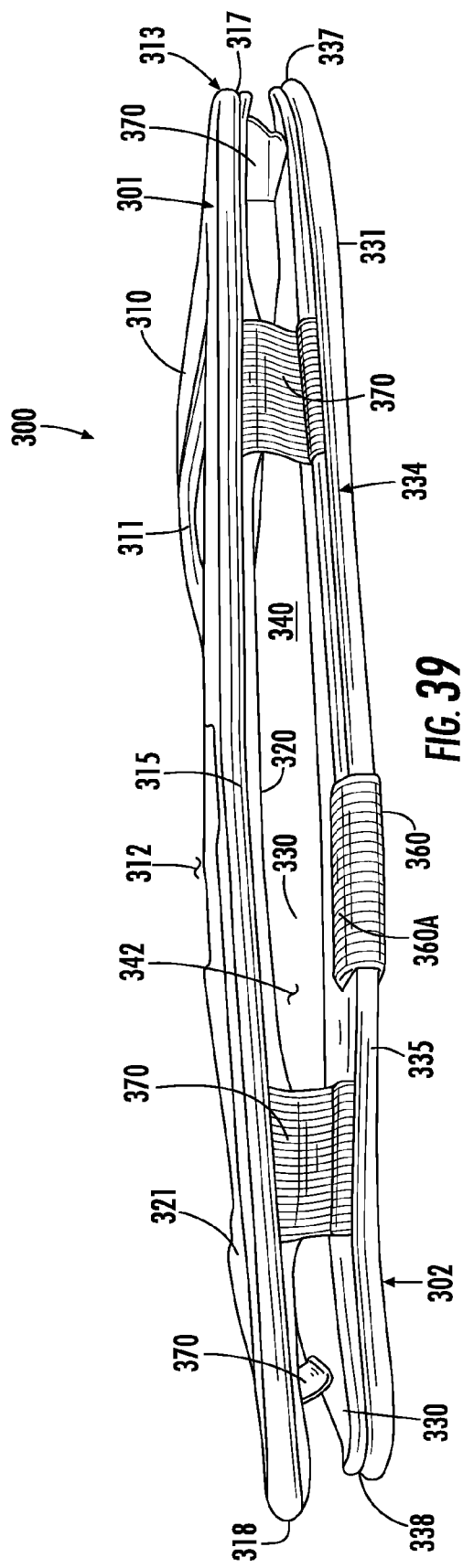
FIG. 39 is an upper end elevation view of the embodiment of FIGS. 35-38.
Figure 40:
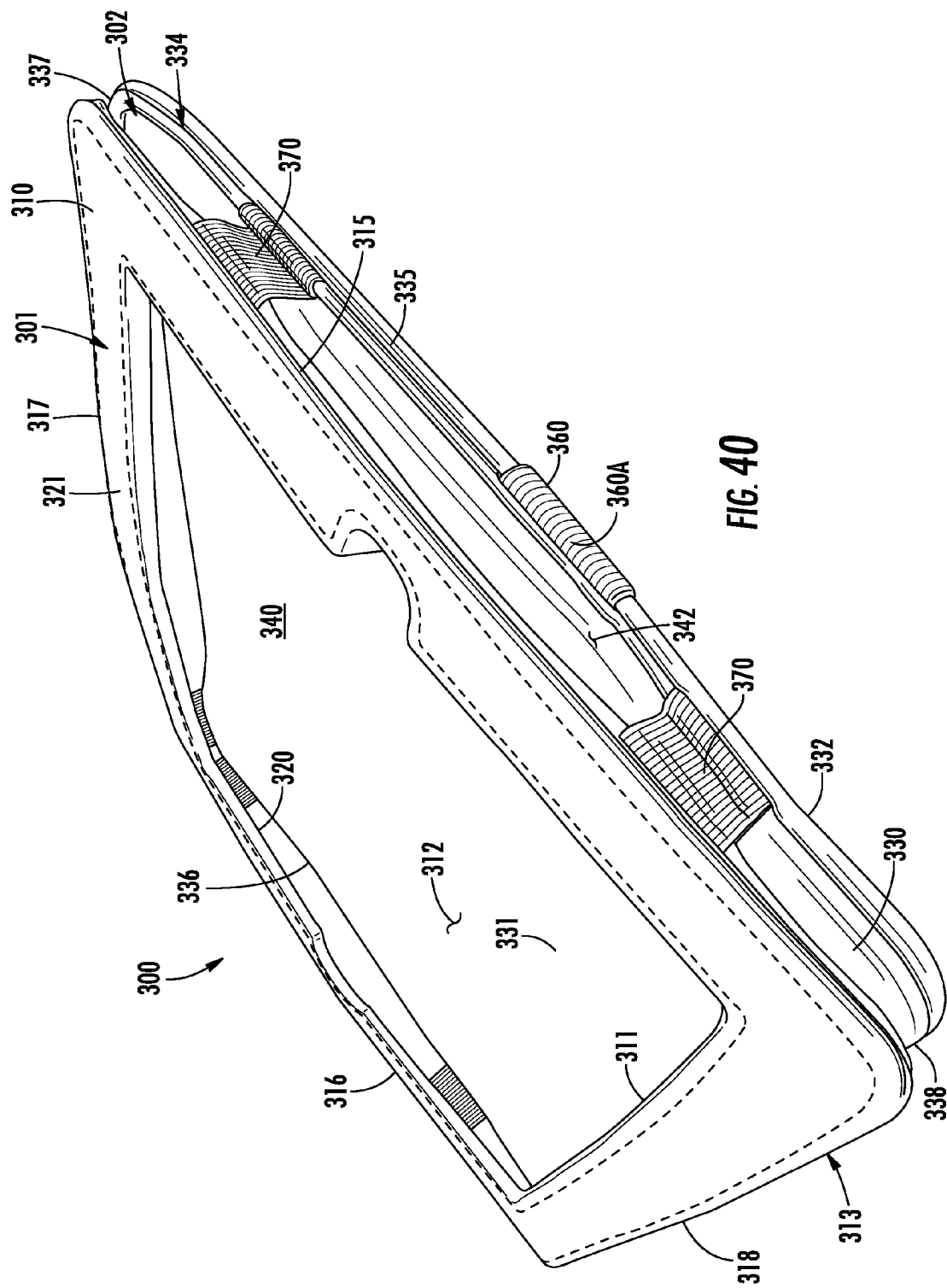
FIG. 40 is a perspective view of the embodiment of FIGS. 35-38 looking from an upper end thereof.
Figure 41:
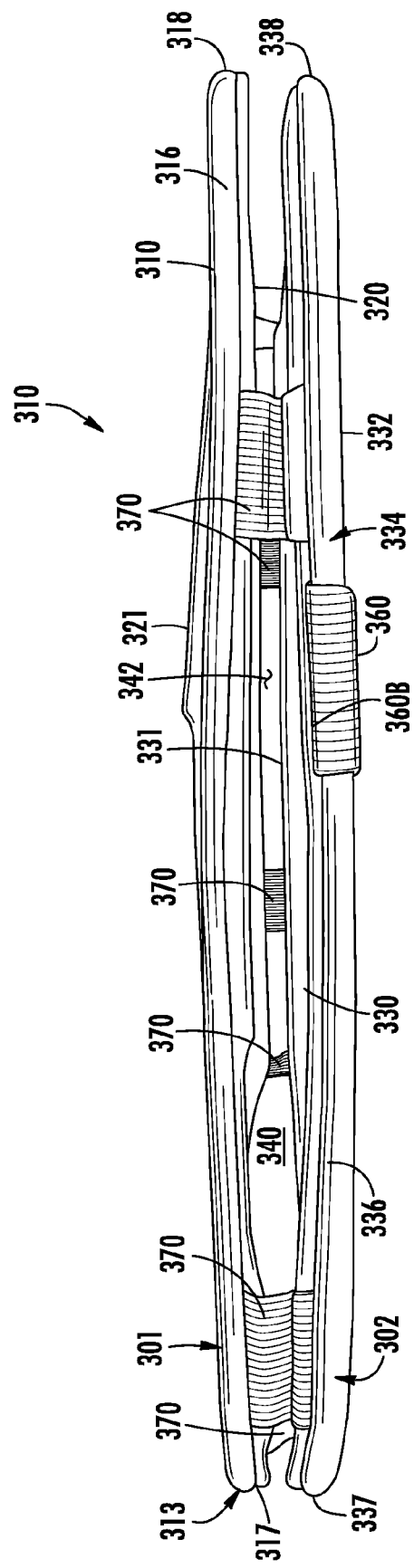
FIG. 41 is a lower end elevation view of the embodiment of FIGS. 35-38.
Figure 42:
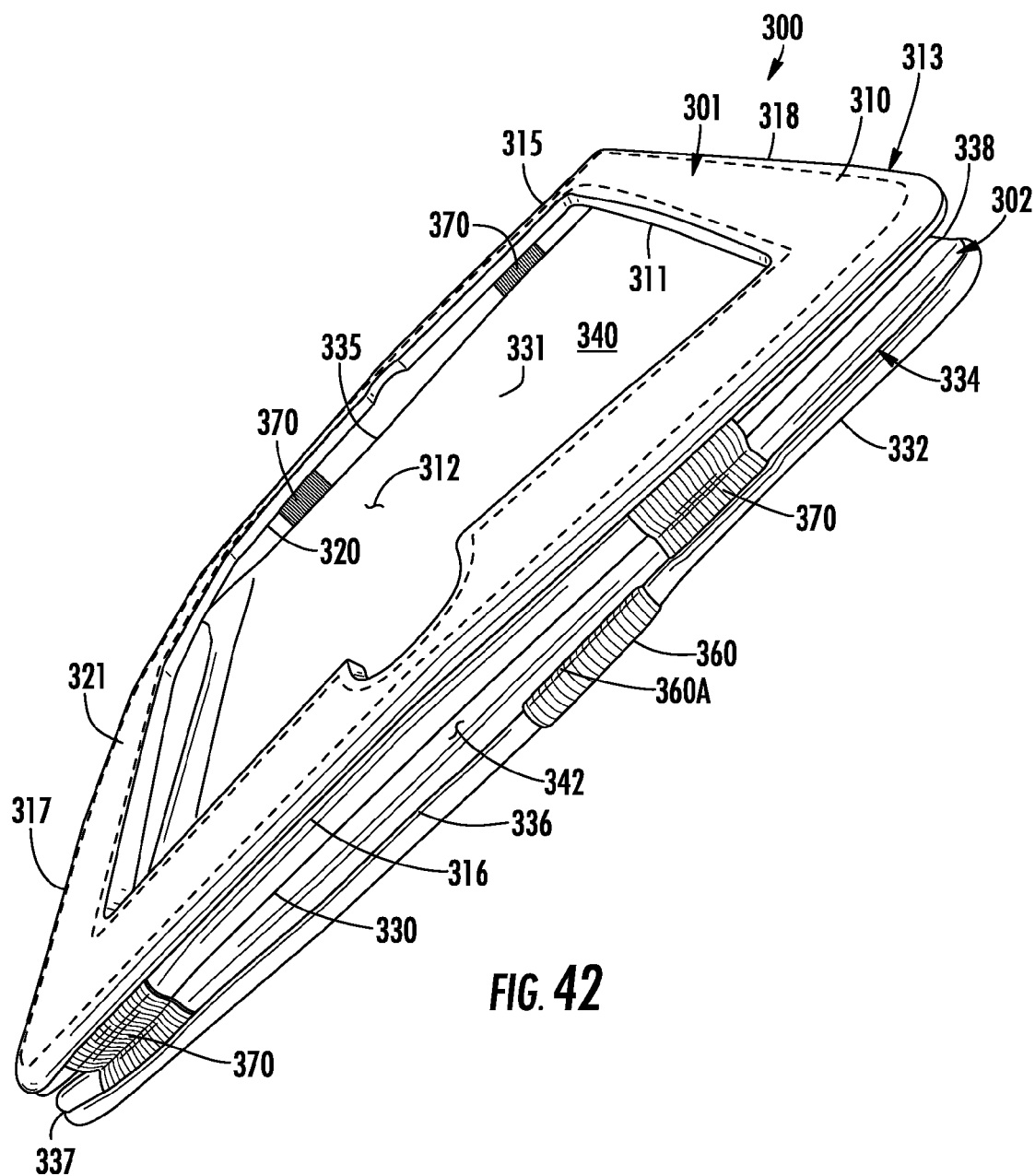
FIG. 42 is a perspective view of the embodiment of FIGS. 35-38 looking from a lower end thereof.
Figure 43:
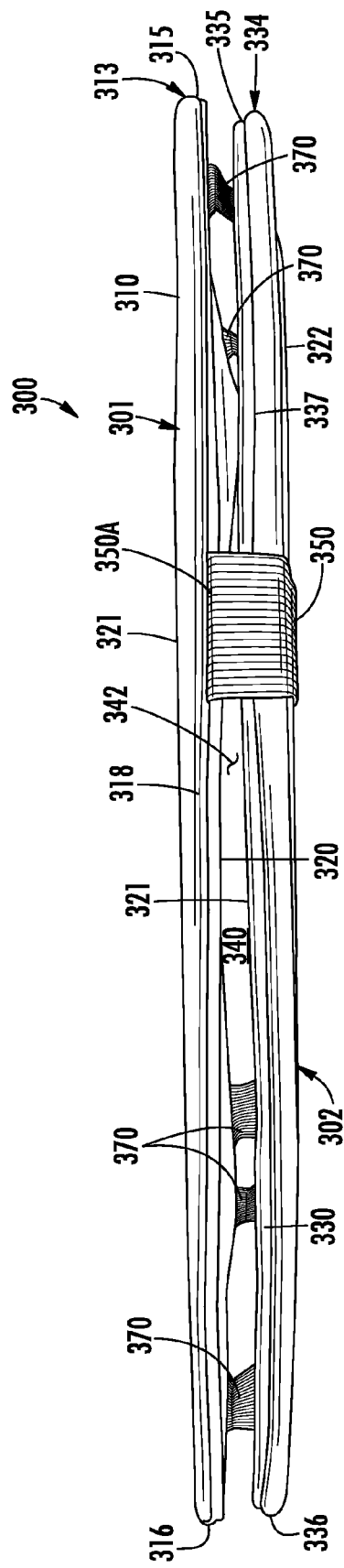
FIG. 43 is a right side elevation view of the embodiment of FIGS. 35-38.
Figure 44:
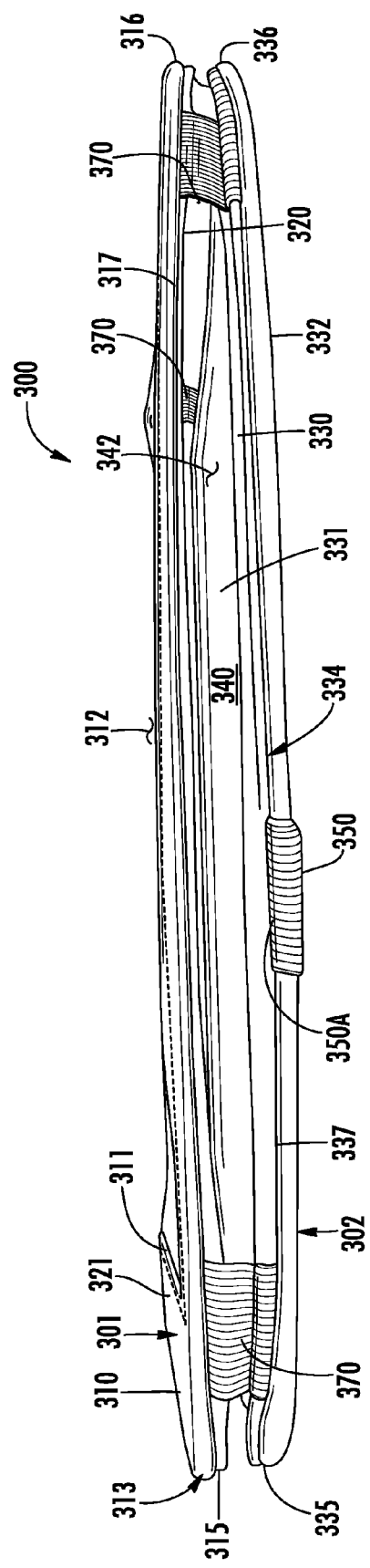
FIG. 44 is a left side elevation view of the embodiment of FIGS. 35-38.

Case 300 includes elastic strap 350 and elastic strap 360. Elastic strap 350 has end 350A attached via sewing to side edge 318 of frame 310 of windowed front 301, and end 350B attached via sewing to side edge 337 of back 302. Elastic strap 350 extends across perimeter gap 342 from end 350A attached to side edge 318 of frame 310 of windowed front 31 to side edge 338 and passes over side edge 338 of back and then extends across outer surface 332 of back 302 to end 350B attached to side edge 337 of back 302. Elastic strap 360 has end 360A attached via sewing to end edge 335 of back 302, and end 360B attached via sewing to end edge 336 of back 302. Elastic strap 360 extends from end 360A attached to end edge 335 of back 302 across outer surface 332 of back 302 and under elastic strap 350 to end 360B attached to end edge 336 of back 302. Elastic strap 360 crosses under elastic strap 350 in this embodiment, and can cross over elastic strap 350 in an alternate embodiment. In FIGS. 37 and 38, elastic strap 350 is perpendicular relative to elastic strap 360. Elastic strap 350 is closer to end edges 315 and 335 of windowed front 301 and back 302, respectively, than to end edges 316 and 336 of windowed front 301 and back 302, respectively. Elastic strap 360 is closer to side edges 318 and 338 of windowed front 301 and back 302, respectively, than to side edges 317 and 337 of windowed front 301 and back 302, respectively. Elastic strap 350 is parallel with respect to end edges 315 and 335 of windowed front 301 and back 302, respectively, and with respect to end edges 316 and 336 of windowed front 301 and back 302, respectively. Elastic strap 350 is perpendicular with respect to side edges 317 and 337 of windowed front 301 and back 302, respectively, and with respect to side edges 318 and 338 of windowed front 301 and back 302, respectively. Elastic strap 360 is perpendicular with respect to end edges 315 and 335 of windowed front 301 and back 302, respectively, and with respect to end edges 316 and 336 of windowed front 301 and back 302, respectively. Elastic strap 360 is parallel with respect to side edges 317 and 337 of windowed front 301 and back 302, respectively, and with respect to side edges 318 and 338 of windowed front 301 and back 302, respectively. Connectors 370 extend across perimeter gap 342 and connect perimeter 313 of windowed front 301 to perimeter 334 of back 302 along three of the four sides of perimeter gap 342 near the corners of case 300. Connectors 370 between windowed front 301 and back 302 hold windowed front 301 and back 302 in the axially spaced apart and substantially parallel relationship. Specifically, two spaced apart connectors 370 extend across perimeter gap 342 between from end edge 315 to end edge 335 and are connected to end edges 315 and 335 via sewing, two spaced apart connectors 370 extend across perimeter gap 342 from end edge 316 to end edge 336 and are connected to end edges 316 and 336 via sewing, and two spaced apart connectors 370 extend across perimeter gap 342 from side edge 317 to side edge 337 and are connected to side edges 317 and 337 via sewing. Gap 342 between side edges 318 and 338 is free of such connectors. Each connector 370 is an elastic strap. Connectors 370 elastically retain back 302 to windowed front 301.

Figure 45:
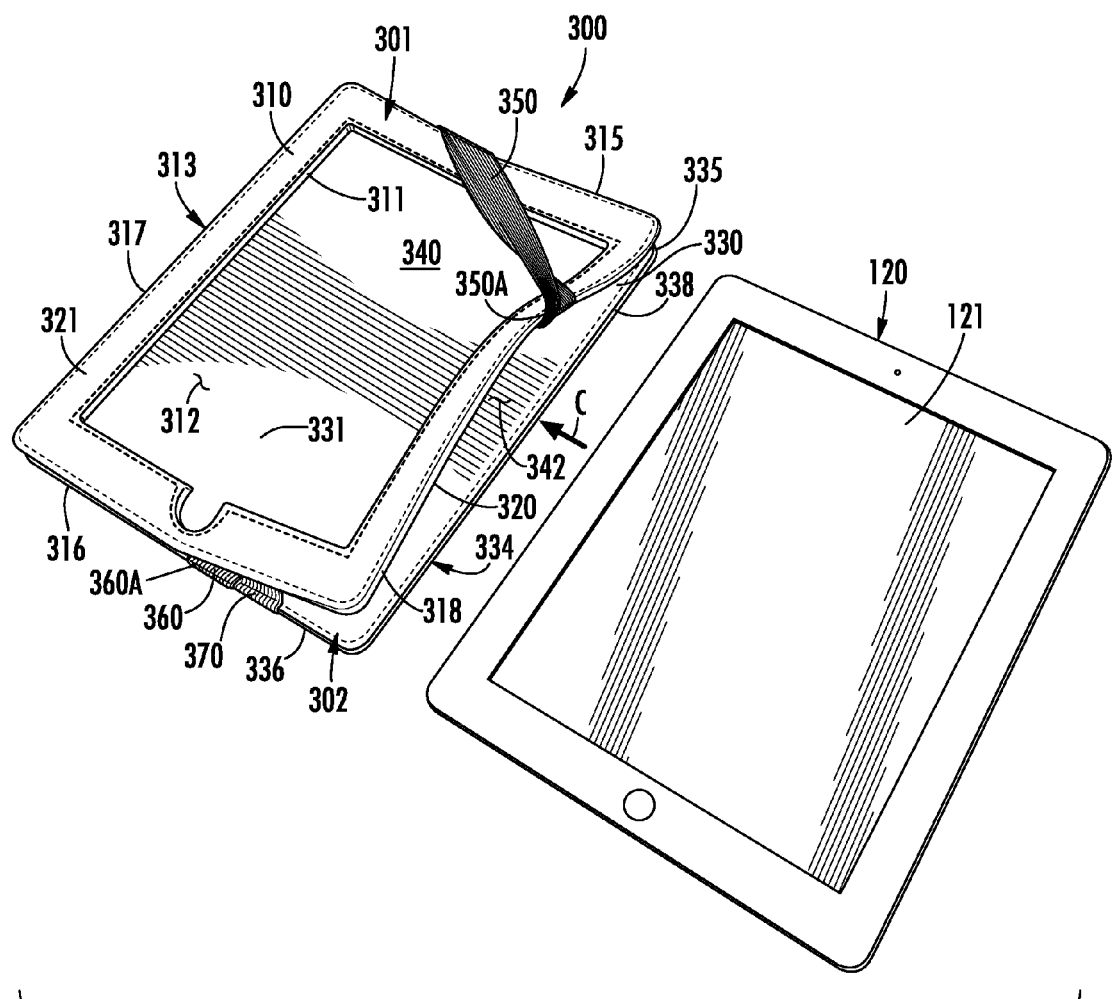
FIGS. 45-48 illustrate a sequence of steps for assembling a tablet and the portable case of FIGS. 35-38 so as to form a cased tablet as shown in FIG. 48.
Figure 46:
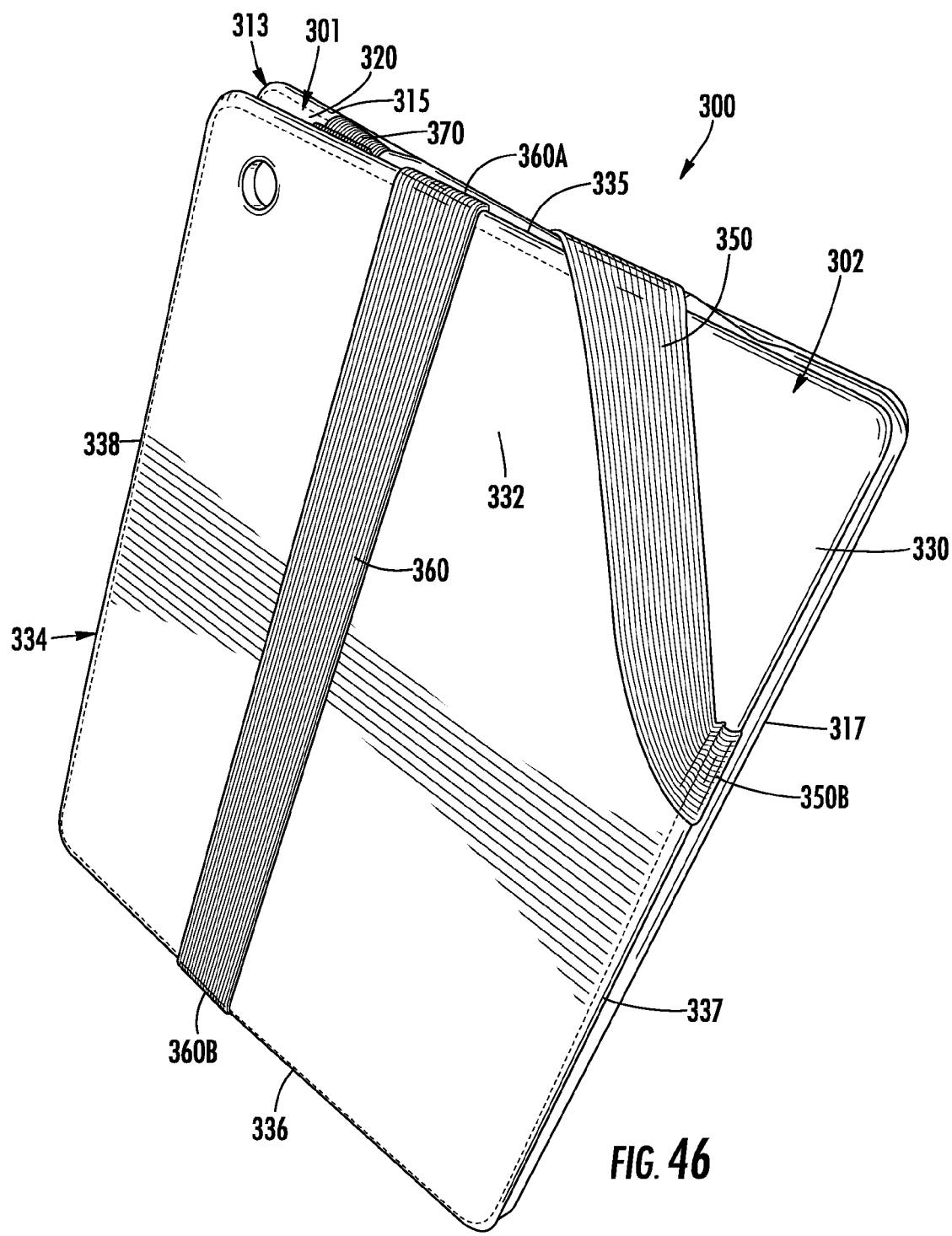
Figure 47:
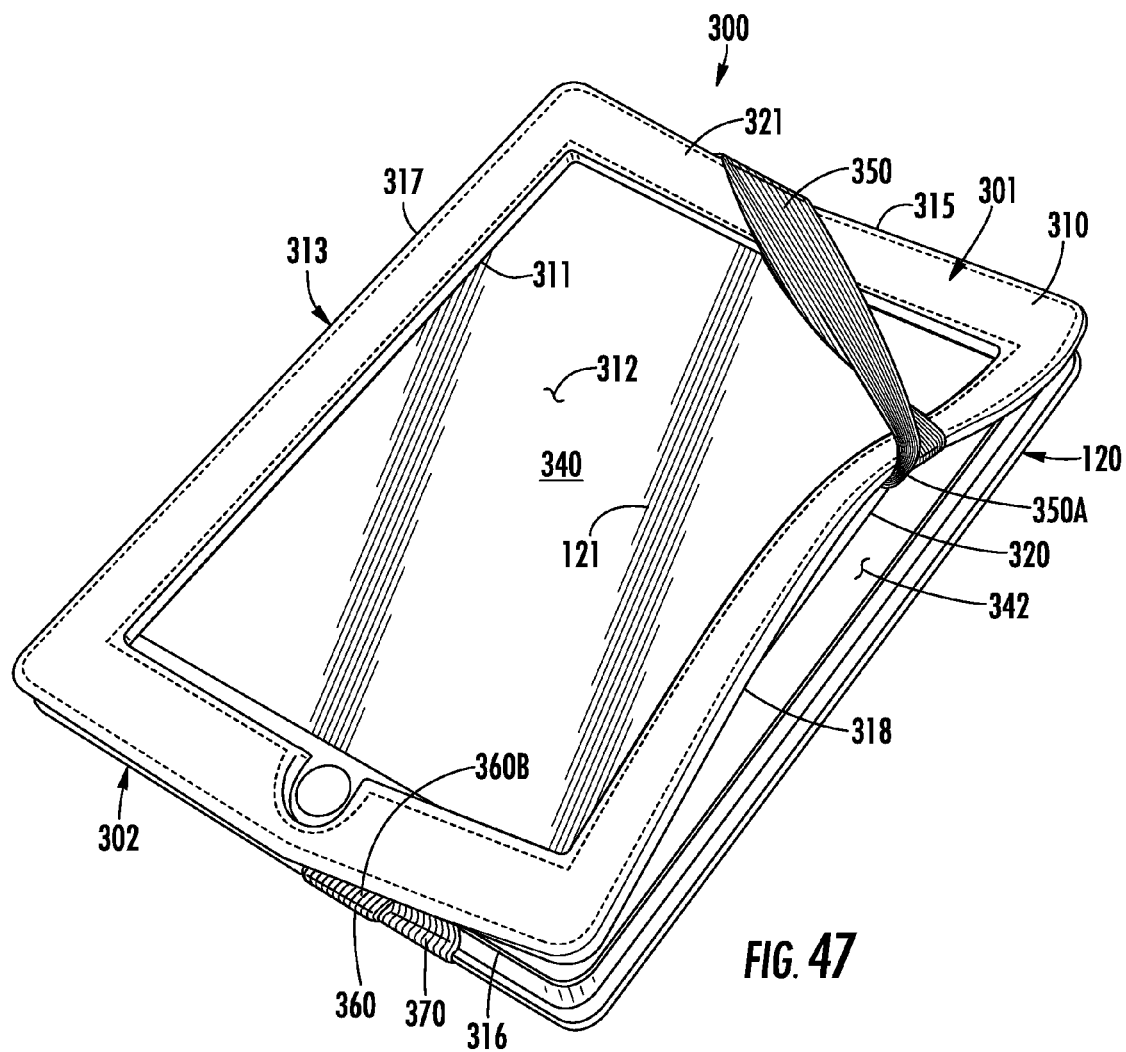
Figure 48:
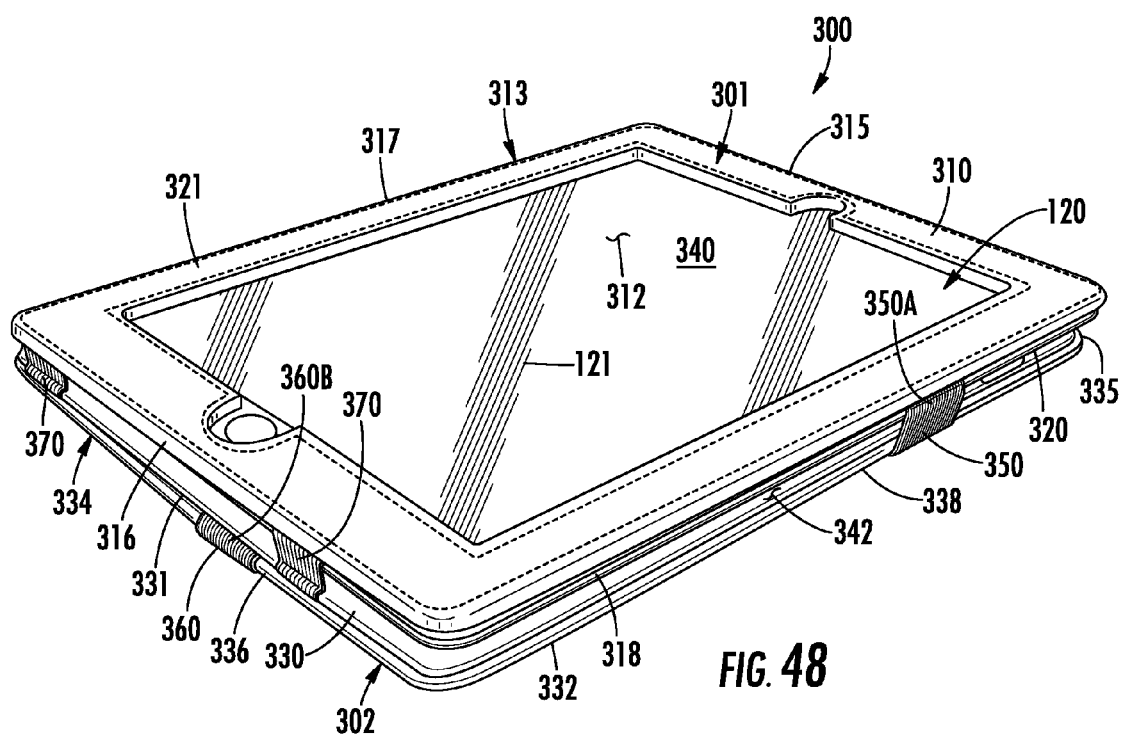
Figure 49:
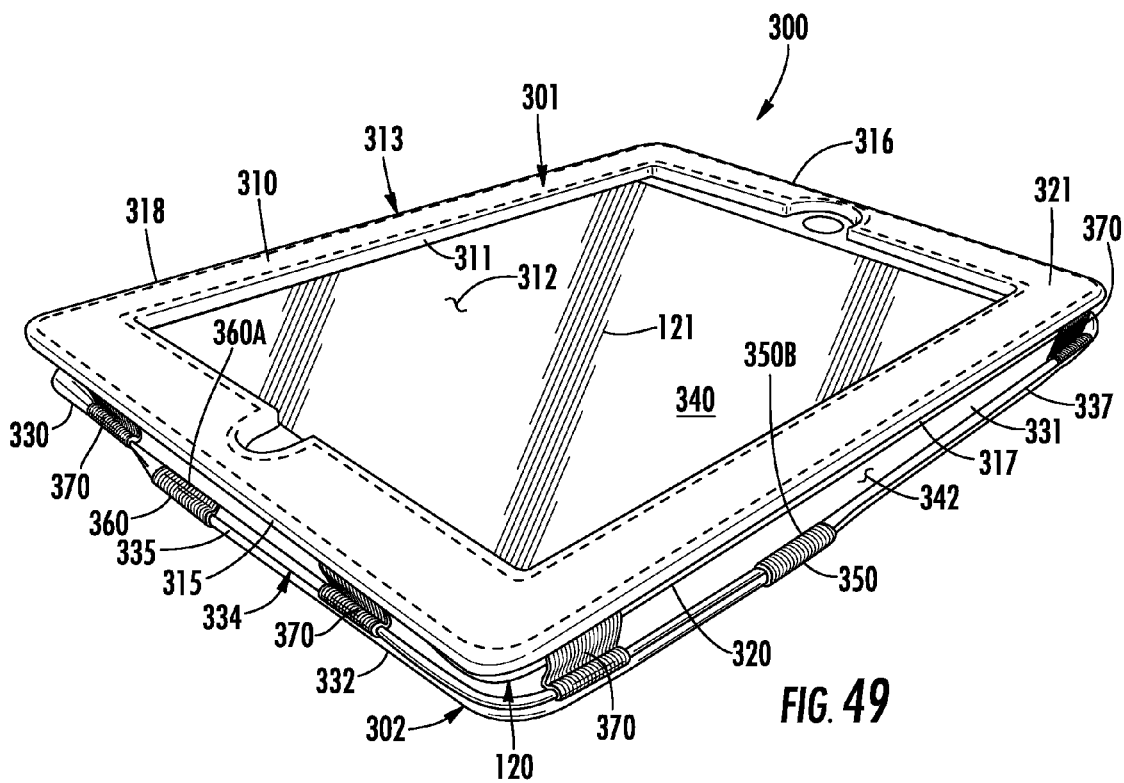
FIGS. 49-52 are perspective views of the cased tablet of FIG. 48.
Figure 50:
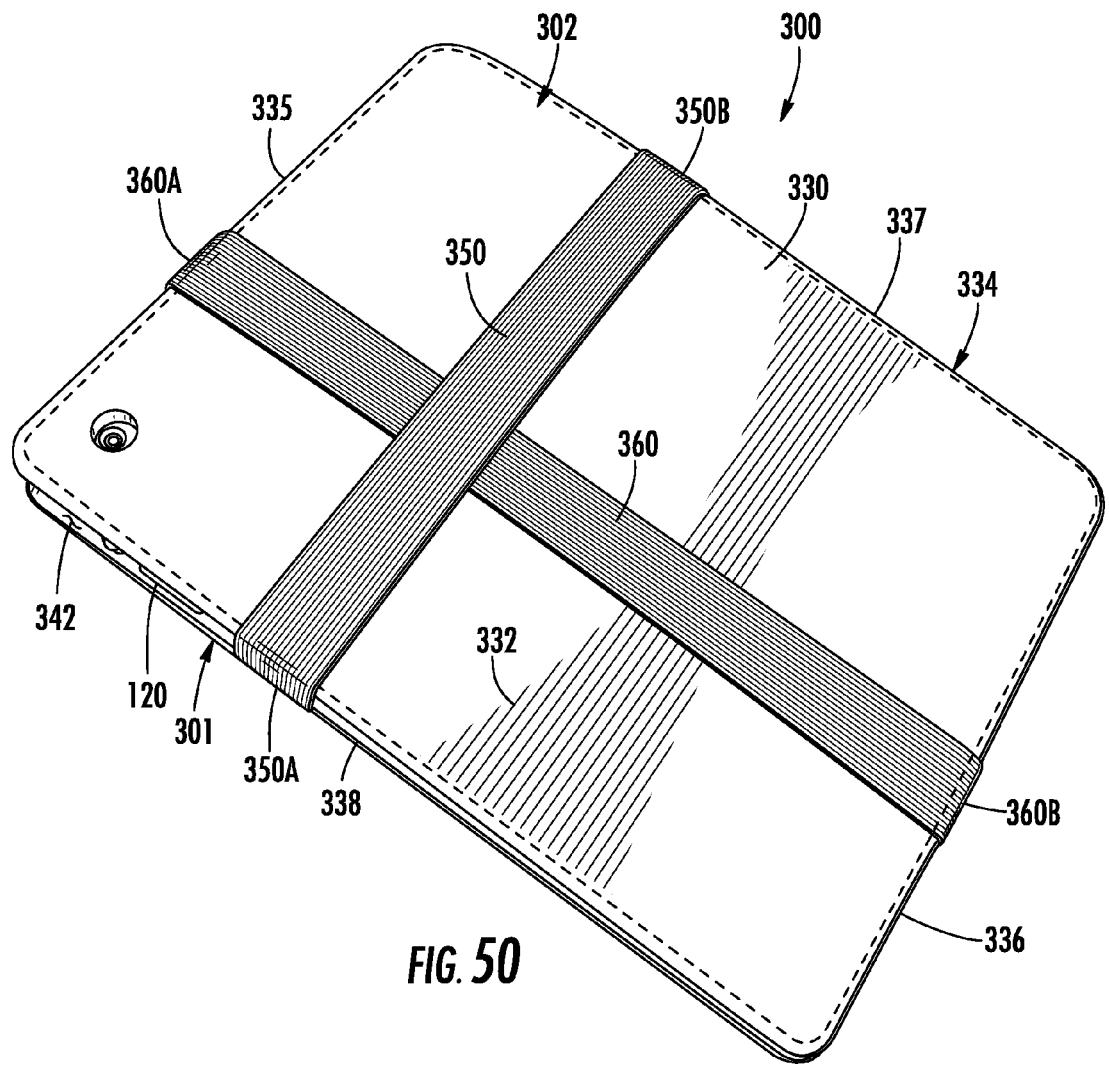
Figure 51:
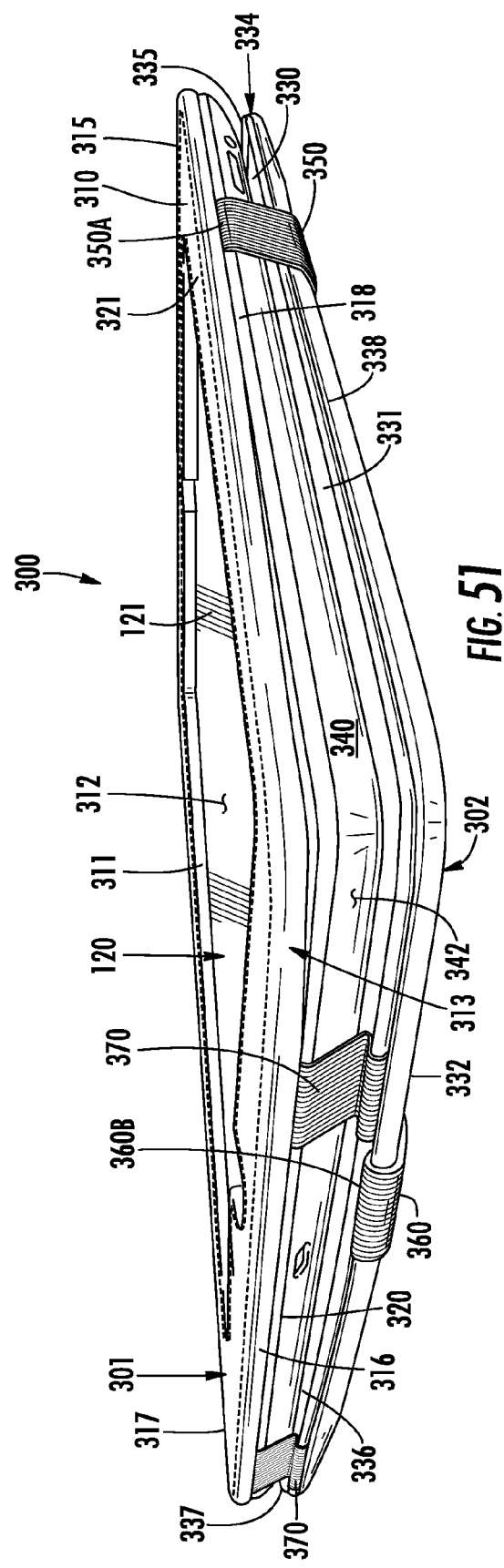
Figure 52:
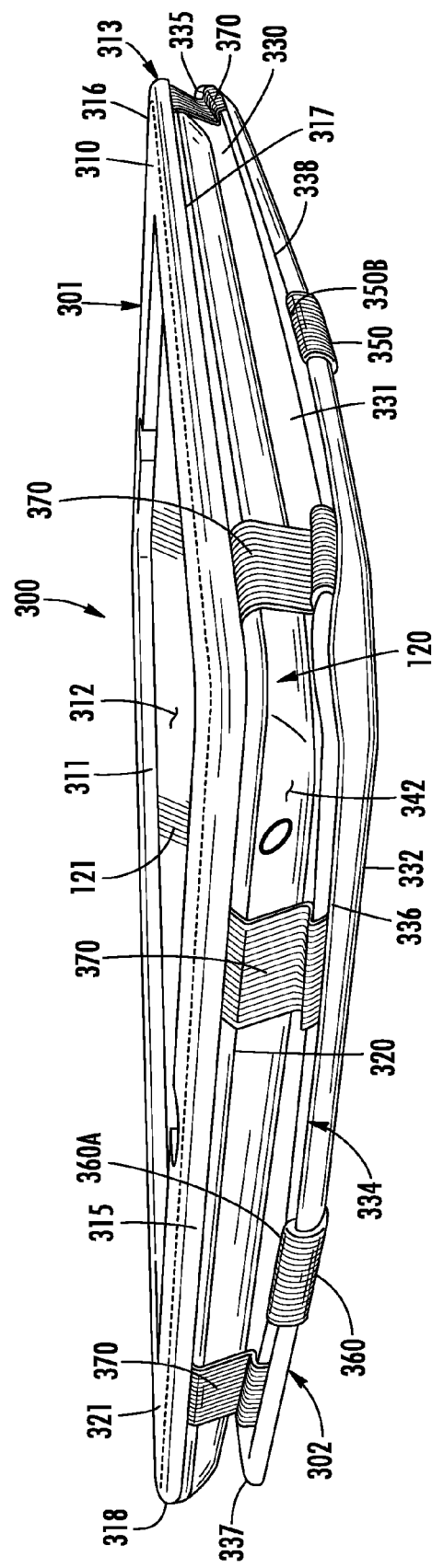

To employ case 300 with a tablet as the term is defined above, case 300 and tablet 120 with touchscreen 121 are taken up, such as by hand, and positioned side-by-side lengthwise as in FIG. 45 with touchscreen 121 and windowed front 301 facing up. Elastic strap 350 is taken up, such as by hand, and stretched and pulled over the end edge 315 at the top of windowed front 302 and across outer surface 321 of windowed front 301 opening and clearing perimeter gap 342 between side edges 318 and 338 of windowed front 301 and back 302, respectively, as shown in FIGS. 45 and 46 in preparation for inserting tablet 120 into receiving area 340 through perimeter gap 342 between side edges 318 and 338 of windowed front 301 and back 302. Receiving area 340 relates to tablet 120 and is sized to accept tablet 120. Tablet 120 is slid, outer edge first, into receiving area 340 in the direction of arrowed line C through perimeter gap 342 between side edges 318 and 338 until it is fully inserted into receiving area 340 in FIG. 47 and touchscreen 121 is framed by frame 310 of windowed front 301 and touchscreen 121 is juxtaposed at window 312 to permit the viewing and the touching of touchscreen 121 in the operation of tablet 120 at window 312 of windowed front 301. Case 300 and tablet 120 are commensurate in size, and window 312 is commensurate in size to touchscreen 121 so as to frame touchscreen when tablet 120 is inserted into receiving area 340. Connectors 370 elastically pull back 302 and windowed front 301 together retaining tablet 120 in receiving area 340 between the respective inner surfaces 320 and 331, and connectors 370 along the three sides of perimeter gap 342, the one between end edges 315 and 335, the one between end edges 316 and 336, and the one between side edges 317 and 337, interact directly with the upper edge, lower edge, and outer edge, respectively, of tablet 120 centering tablet 120 in receiving area 340, and preventing tablet 120 from sliding through either of said three sides of perimeter gap 342. To complete the assembly of case 300 and tablet 120, elastic strap 350 is taken up by hand and stretched and pulled back over end edge 315 at the top of windowed front 302 and then released, in which elastic band 350 constricts to its original position shown in FIGS. 48-52. Back to its original position, elastic strap 350 extends across perimeter gap 342 from end 350A attached to side edge 318 of frame 310 of windowed front 31 to and over side edge 338 of back 302 and then extends across outer surface 332 of back 302 to end 350B attached to side edge 337 of back 302. The portion of elastic strap 350 that extends across perimeter gap 342 from end 350A attached to side edge 318 of frame 310 of windowed front 31 to and over side edge 338 of back 302 interacts directly with the inner edge of tablet 120 preventing tablet 120 from falling out of receiving area 240 through the side of perimeter gap 342 between side edges 318 and 338 of windowed front 301 and back 302, respectively. So installed, tablet 120 is elastically retained in receiving area 340 between windowed front 301 and back 302, and is retained in receiving area 340 on all four sides of perimeter gap 342 by connectors 370 along the three sides of perimeter gap 342, the one between end edges 315 and 335, the one between end edges 316 and 336, and the one between side edges 317 and 337, and by strap 350 that extends across the fourth side of perimeter gap 342 from end 350A attached to side edge 318 of frame 310 of windowed front 31 to and over side edge 338 of back 302.

Once fully inserted into receiving area 340 of case 300, windowed front 301 and back 302 are separated from one another so as to enlarge receiving area 340 to permit the reception of tablet 120 between inner face/surface 320 of windowed front 301 and inner face/surface 331 of back 302. The elasticity of elastic strap 350 allows it to be stretched and moved out of the way to permit the reception of tablet 120 into receiving area 340 through perimeter gap 342 between side edges 318 and 338 of windowed front 301 and back 302, respectively. Touchscreen 121 and window 312 are juxtaposed permitting the viewing and touching of touchscreen 121 via window 312 in the operation of tablet 120 via window 312. More specifically, tablet 120 is oriented in place at receiving area 340 to orient the rectangular shape of tablet 120 to coincide or otherwise relate to the corresponding rectangular shapes of windowed front 301 and back 302 so as to juxtapose the upper and lower edges of tablet 120 with end edges 315 and 316 of windowed front 301 and end edges 335 and 336 of back 52 from within receiving area 340, to juxtapose the side edges of tablet 120 with side edges 317 and 318 of windowed front 301 and side edges 337 and 338 of back 302 from within receiving area 340, to juxtapose the back of tablet 120 with inner surface 320 of back 302 from within receiving area 340, and, of course, to juxtapose touchscreen 121 of tablet 120 with window 312 from within receiving area 200 to permit the viewing and the touching of touchscreen 121 in the operation of tablet 120 via window 312. All this means is that when tablet 120 and case 300 are assembled, they relate to one another so as to fit together, and the elasticity of connectors 370 and elastic strap 350 acts between windowed front 301 and back 302 to elastically pull widowed front 301 and back 302 against either face of tablet 120 constrictively capturing tablet 120 between inner face/surface 320 of windowed front 301 and inner face/surface 331 of back 302. The perimeter of tablet 120 is exposed at perimeter gap 342 along the areas not covered by connectors 370 or strap 350 for providing access to tablet 120 controls. Back 302 is formed with a conventional camera opening to relate to a camera lens of tablet 120, and there are cutouts in continuous inner edge 311 of windowed front 301 to permit access to the various tablet controls at the user interface or touchscreen 121 side of tablet 120. To remove tablet 120 from case 300, the foregoing operation for installing tablet 120 into case 300 need only be reversed. If desired, window 312 can be fashioned with a sheet of transparent material, such as sheet 172 of transparent material of windowed panel 151 of case 150 previously discussed.

Figure 53:
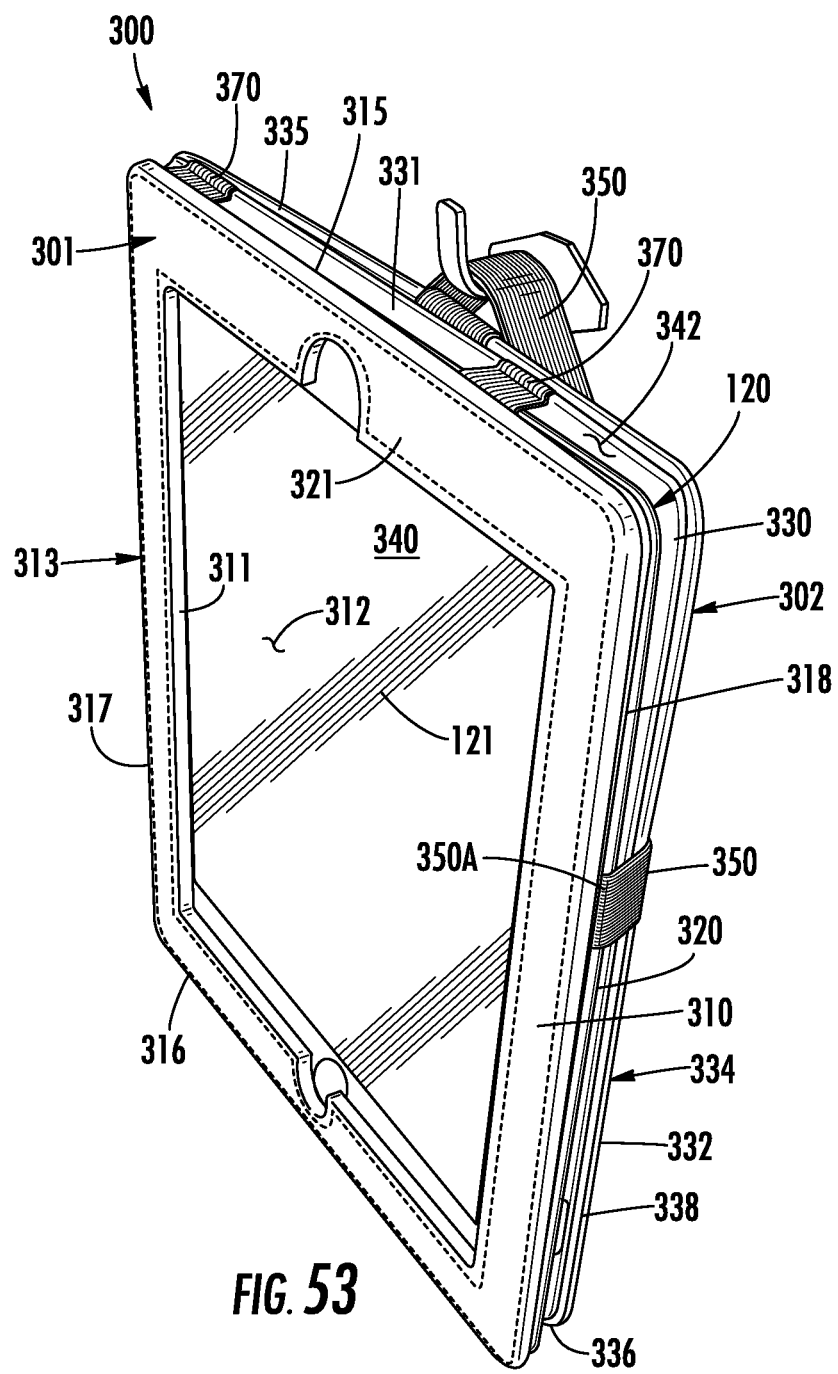
FIGS. 53 and 54 are perspective views illustrating the cased tablet of FIG. 48 as it would appear suspended in a portrait orientation.
Figure 54:
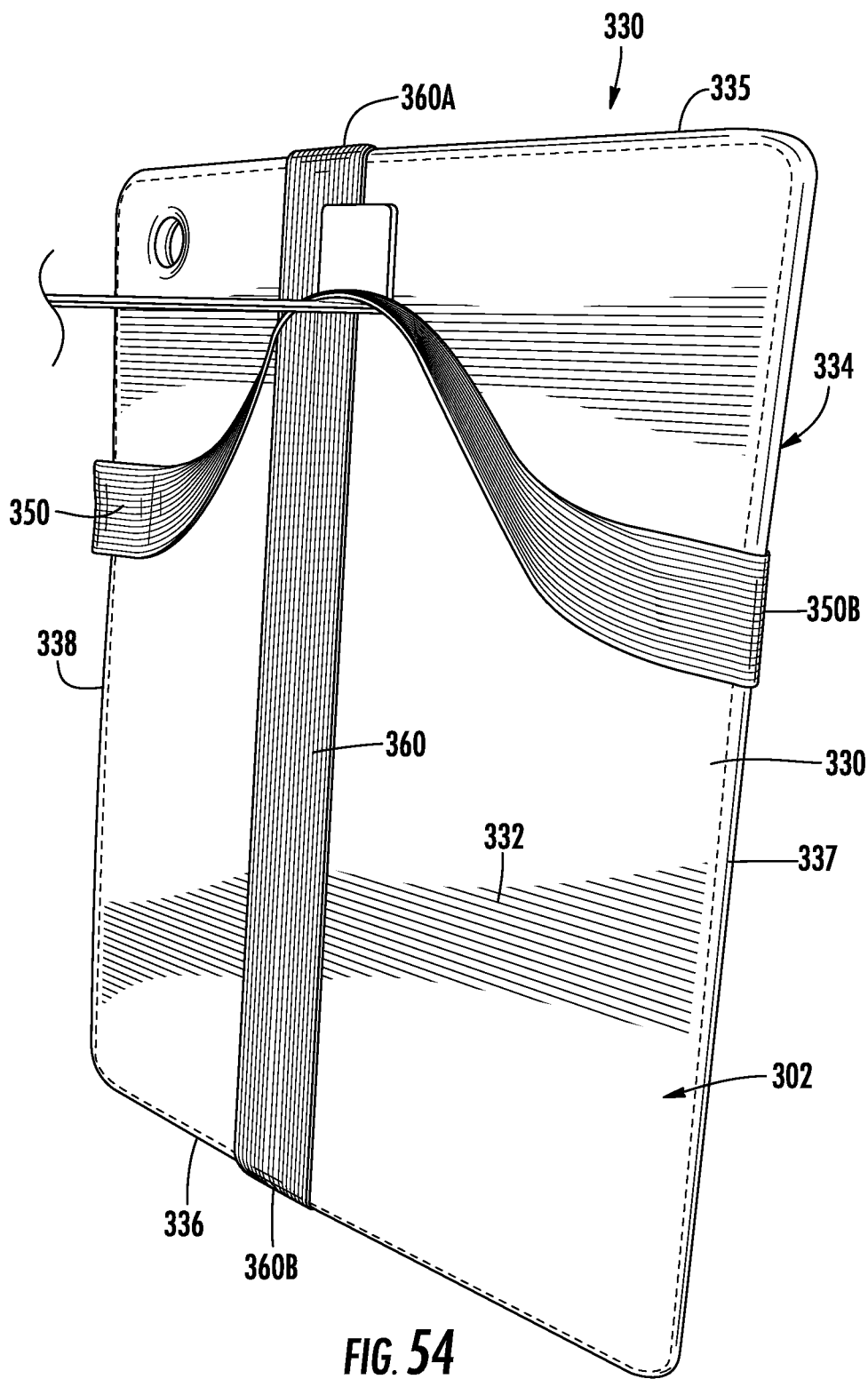
Figure 55:
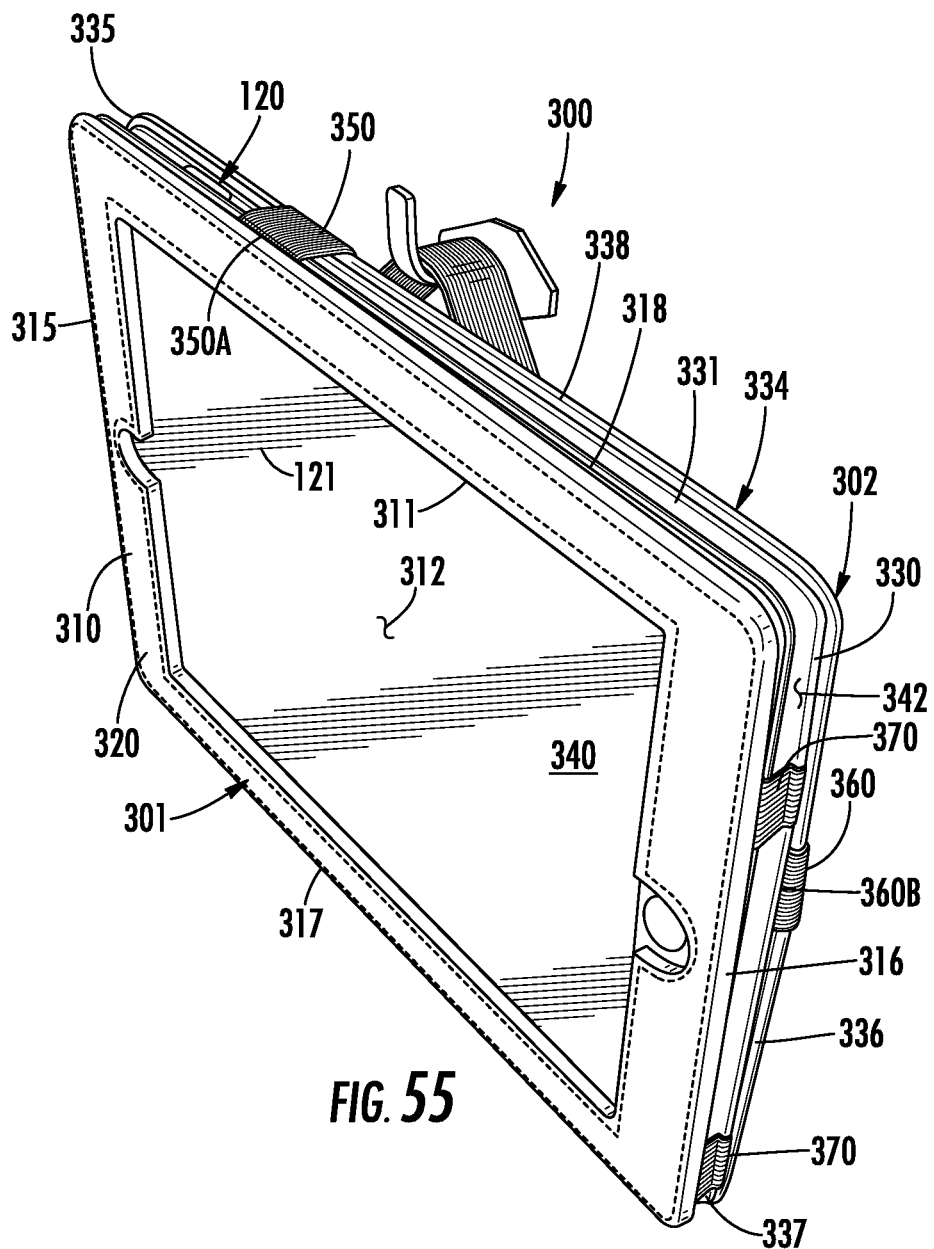
FIGS. 55 and 56 are perspective views illustrating the cased tablet of FIG. 48 as it would appear suspended in a landscape orientation.
Figure 56:
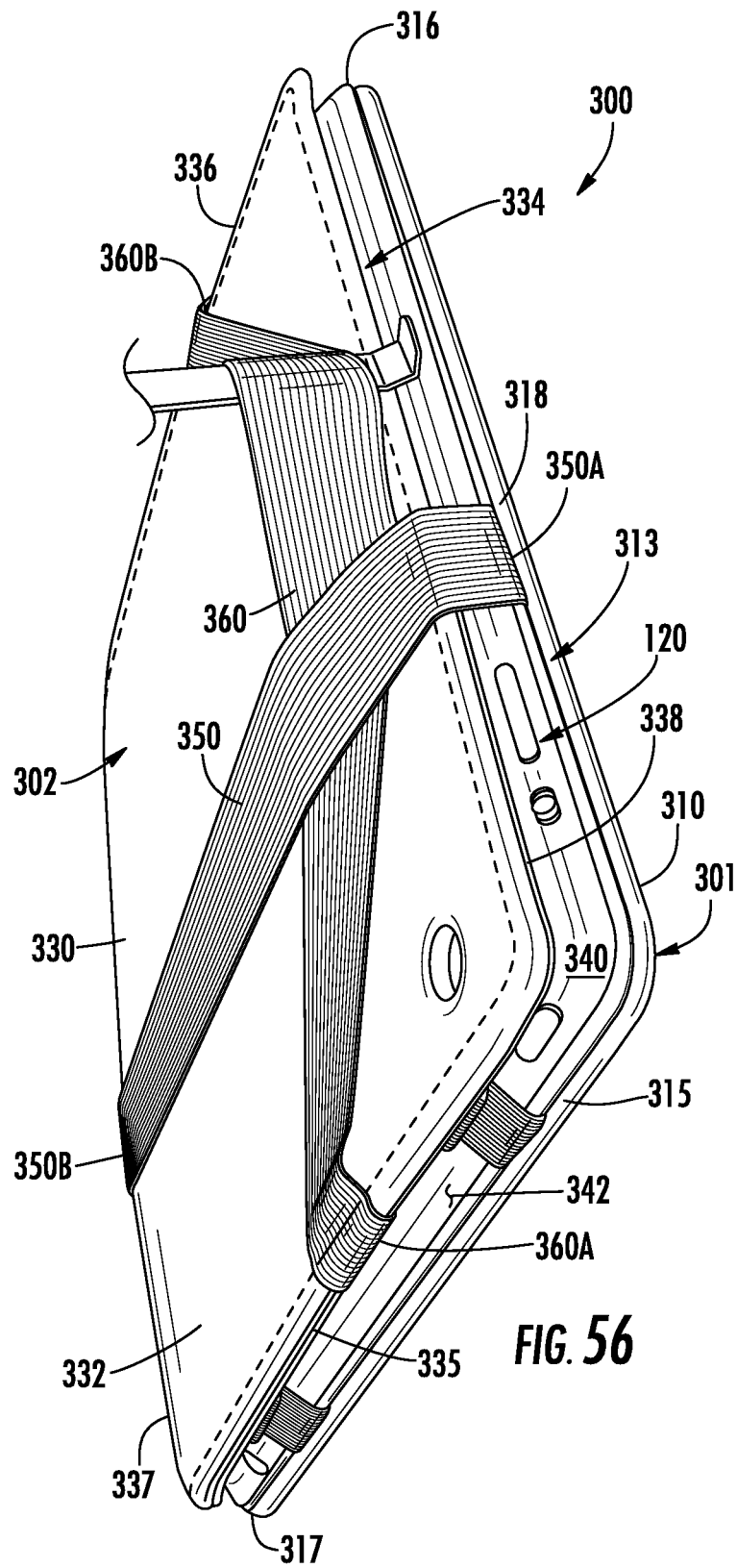

And so case 300 is useful for holding and containing tablet 120, as for carrying or safekeeping. Elastic strap 350 is useful for suspending case 300, and tablet 120 contained therein, in a vertical/upright direction as in FIGS. 53 and 54 from end edges 316 and 336 of windowed front 301 and back 302, respectively, at the bottom of case 300 to end edges 315 and 335 of windowed front 301 and back 302, respectively, at the top of case 300 for narrow or vertical screen operation/viewing of tablet 120. Elastic strap 360 is useful for suspending case 300, and tablet 120 contained therein, in a vertical/upright direction as in FIGS. 55 and 56 from side edges 317 and 337 of windowed front 301 and back 302, respectively, at one side of case 300 to side edges 318 and 338 of windowed front 301 and back 302, respectively, at the opposed side of case 300 for horizontal or widescreen operation/viewing of tablet 120. This provides for convenient use and viewing of tablet 120 held in case 300 while so suspended in either the narrow or vertical screen orientation in FIGS. 53 and 54 or the horizontal or widescreen orientation in FIGS. 55 and 56. Touchscreen 121 of tablet 120, like conventional tablets, is configured to adjust or rotate the display for viewing in response to rotation of the tablet between a narrow screen orientation of the display, and a widescreen orientation viewing of the display. Again, this is a common feature among tablet devices. Depending on which way a user desires to view the touchscreen of tablet 120 held by case 300 in the use of tablet 120, elastic strap 350 is useful for suspending case 300 in a vertical direction of the tablet touchscreen from end edges 316 and 336 of windowed front 301 and back 302, respectively, at the bottom of case 300 to end edges 315 and 335 of windowed front 301 and back 302, respectively, at the top of case 300 for portrait or narrow screen viewing, and elastic strap 360 is useful for suspending case 300 in a vertical direction of the tablet touchscreen from side edges 317 and 337 of windowed front 301 and back 302, respectively, at one side of case 300 to side edges 318 and 338 of windowed front 301 and back 302, respectively, at the opposed side of case 300 for landscape or widescreen viewing.

In the portrait orientation of case 300, the length of case 300 extends vertically upright from end edges 316 and 336 of windowed front 301 and back 302, respectively, at the bottom of case 300 to end edges 315 and 335 of windowed front 301 and back 302, respectively, at the top of case 300, and elastic strap 350 is used to suspend case 300 in this vertical direction simply by taking up elastic strap 350 by hand and hooking it over the object from which case 300 is to be suspended. The stretchability of elastic strap 350 allows it to be stretched as needed to facilitate the application of elastic strap 350 over an object or thing from which one desires to suspend case 300. In the landscape orientation of case 300, the width of case 300 extends vertically upright from side edges 317 and 337 of windowed front 301 and back 302, respectively, at one side of case 300 to side edges 318 and 338 of windowed front 301 and back 302, respectively, at the other side of case 300, and elastic strap 360 is used to suspend case 300 in this vertical direction simply by taking up elastic strap 360 by hand and hooking it over the object from which case 300 is to be suspended. The stretchability of elastic strap 360 allows it to be stretched as needed to facilitate the application of elastic strap 360 over an object or thing from which one desires to suspend case 300.

The juxtaposition of elastic strap 350 near end edges 315 and 335 of windowed front 301 and back 302, respectively, ensures that when elastic strap 350 is used to suspend case 300 in the portrait orientation that case 300 will naturally tend to hang downwardly in a vertical direction from end edges 315 and 335 of windowed front 301 and back 302, respectively, to end edges 316 and 336 of windowed front 301 and back 302, respectively. Moreover, the juxtaposition of elastic strap 360 near side edges 318 and 338 of windowed front 301 and back 302, respectively, ensures that when elastic strap 360 is used to suspend case 300 in the landscape orientation that case 300 will naturally tend to hang downwardly in a vertical direction from side edges 318 and 338 of windowed front 301 and back 302, respectively, to side edges 317 and 337 of windowed front 301 and back 302, respectively.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A tablet accessory for receiving and holding a tablet, the tablet accessory comprising:
    a windowed front;
    a back;
    the windowed front includes an inner surface and an opposed outer surface, and a perimeter defined by a first end edge and an opposed second end edge, and a first end edge and an opposed second end edge that extend from the first edge to the second edge of the windowed front;
    the back includes an inner surface and an opposed outer surface, and a perimeter defined by a first end edge and an opposed second end edge, and a first side edge and an opposed second side edge that extend from the first end edge to the second end edge of the back;
    the windowed front is superimposed atop the back defining a receiving area between the inner surface of the windowed front and the inner surface of the back for receiving a tablet having a touchscreen so as to juxtapose the touchscreen with the windowed front to permit viewing and touching of the touchscreen in the operation of the tablet from the windowed front, the first end edge of the windowed front is axially spaced from the first end edge of the back, the second end edge of the windowed front is axially spaced from the second end edge of the back, the first side edge of the windowed front is axially spaced from the first side edge of the back, the second side edge of the windowed front is axially spaced from the second side edge of the back, and a perimeter gap to the receiving area between the perimeter of the windowed front and the perimeter of the back;
    a first elastic strap is attached to the second side edge of the windowed front and to the first side edge of the back, the first elastic strap extends across the perimeter gap from the second side edge of the windowed front to and over the second side edge of the back and across the outer surface of the back to the first side edge of the back; and
    at least one first connector extends across the perimeter gap between the first end edge of the windowed front and the first end edge of the back and connects the first end edge of the windowed front to the first end edge of the back, at least one second connector extends across the perimeter gap between the second end edge of the windowed front and the second end edge of the back and connects the second end edge of the windowed front to the second end edge of the back, and at least one third connector extends across the perimeter gap between the first side edge of the windowed front and the first side edge of the back and connects the first side edge of the windowed front to the first side edge of the back.

2. The tablet accessory according to claim 1, wherein each of the at least one first connector, the at least one second connector, and the at least one third connector is an elastic strap.

3. The tablet accessory according to claim 2, further comprising a second elastic strap attached to the first end edge of the back and to the second end edge of the back, the second elastic strap extends from the first end edge of the back across the outer surface of the back and to the second end edge of the back.

4. The tablet accessory according to claim 3, wherein the first elastic strap is perpendicular relative to the second elastic strap.

5. The tablet accessory according to claim 4, wherein the first elastic strap is closer to the first end edge of each of said windowed front and said back than to the second end edge of each of said windowed front and said back.

6. The tablet accessory according to claim 5, wherein the second elastic strap is closer to the first side edge of each of said windowed front and said back than to the second side edge of each of said windowed front and said back.

7. The tablet accessory according to claim 6, wherein the first elastic strap is parallel with respect to the first end edge and the second end edge of each of said windowed front and said back, and is perpendicular with respect to the first side edge and the second side edge of each of said windowed front and said back.

8. The tablet accessory according to claim 7, wherein the second elastic strap is perpendicular with respect to the first end edge and the second end edge of each of said windowed front and said back, and is parallel with respect to the first side edge and the second side edge of each of said windowed front and said back.

9. A tablet accessory for receiving and holding a tablet, the tablet accessory comprising:
a windowed front;
a back;
the windowed front includes an inner surface and an opposed outer surface, and a perimeter defined by a first end edge and an opposed second end edge, and a first end edge and an opposed second end edge that extend from the first edge to the second edge of the windowed front;
the back includes an inner surface and an opposed outer surface, and a perimeter defined by a first end edge and an opposed second end edge, and a first side edge and an opposed second side edge that extend from the first end edge to the second end edge of the back;
the windowed front is superimposed atop the back defining a receiving area between the inner surface of the windowed front and the inner surface of the back for receiving a tablet having a touchscreen so as to juxtapose the touchscreen with the windowed front to permit viewing and touching of the touchscreen in the operation of the tablet from the windowed front, the first end edge of the windowed front is axially spaced from the first end edge of the back, the second end edge of the windowed front is axially spaced from the second end edge of the back, the first side edge of the windowed front is axially spaced from the first side edge of the back, the second side edge of the windowed front is axially spaced from the second side edge of the back, and a perimeter gap to the receiving area between the perimeter of the windowed front and the perimeter of the back;
a first elastic strap is attached to the second side edge of the windowed front and to the first side edge of the back, the first elastic strap extends across the perimeter gap from the second side edge of the windowed front to and over the second side edge of the back and across the outer surface of the back to the first side edge of the back; and
spaced apart first connectors extend across the perimeter gap between the first end edge of the windowed front and the first end edge of the back and connect the first end edge of the windowed front to the first end edge of the back, spaced apart second connectors extend across the perimeter gap between the second end edge of the windowed front and the second end edge of the back and connect the second end edge of the windowed front to the second end edge of the back, and spaced apart third connectors extend across the perimeter gap between the first side edge of the windowed front and the first side edge of the back and connect the first side edge of the windowed front to the first side edge of the back.

10. The tablet accessory according to claim 9, wherein each of the first connectors, the second connectors, and the third connectors is an elastic strap.

11. The tablet accessory according to claim 10, further comprising a second elastic strap attached to the first end edge of the back and to the second end edge of the back, the second elastic strap extends from the first end edge of the back across the outer surface of the back and to the second end edge of the back.

12. The tablet accessory according to claim 11, wherein the first elastic strap is perpendicular relative to the second elastic strap.

13. The tablet accessory according to claim 12, wherein the first elastic strap is closer to the first end edge of each of said windowed front and said back than to the second end edge of each of said windowed front and said back.

14. The tablet accessory according to claim 13, wherein the second elastic strap is closer to the first side edge of each of said windowed front and said back than to the second side edge of each of said windowed front and said back.

15. The tablet accessory according to claim 14, wherein the first elastic strap is parallel with respect to the first end edge and the second end edge of each of said windowed front and said back, and is perpendicular with respect to the first side edge and the second side edge of each of said windowed front and said back.

16. The tablet accessory according to claim 15, wherein the second elastic strap is perpendicular with respect to the first end edge and the second end edge of each of said windowed front and said back, and is parallel with respect to the first side edge and the second side edge of each of said windowed front and said back.

* * * * *